US007200394B2

(12) United States Patent
Aoki et al.

(10) Patent No.: US 7,200,394 B2
(45) Date of Patent: Apr. 3, 2007

(54) INFORMATION DISTRIBUTION SERVICE SYSTEM BASED ON PREDICTED CHANGES IN LOCATION OF MOBILE INFORMATION TERMINAL

(75) Inventors: Hideyuki Aoki, Kawasaki (JP); Norio Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 10/644,305

(22) Filed: Aug. 20, 2003

(65) Prior Publication Data

US 2004/0127217 A1 Jul. 1, 2004

(30) Foreign Application Priority Data

Sep. 3, 2002 (JP) ............................. 2002-257813

(51) Int. Cl.
*H04Q 7/20* (2006.01)
(52) U.S. Cl. ............................... 455/435.1; 455/404.2; 455/456.1
(58) Field of Classification Search ............. 455/435.1, 455/404.2, 456.1
See application file for complete search history.

(56) References Cited

U.S. PATENT DOCUMENTS 5,230,061 A * 7/1993 Welch .......................... 706/46

6,728,545 B1 * 4/2004 Belcea ....................... 455/456.2
2002/0111154 A1 * 8/2002 Eldering et al. ............ 455/414
2005/0075119 A1 * 4/2005 Sheha et al. ............... 455/456.6

FOREIGN PATENT DOCUMENTS

JP 2000-215211 8/2000
JP 2001-331590 11/2001

* cited by examiner

*Primary Examiner*—Jean Gelin
*Assistant Examiner*—Pierre-Louis Desir
(74) *Attorney, Agent, or Firm*—Katten Muchin Rosenman LLP

(57) ABSTRACT

In an information distribution service system comprising a plurality of mobile information terminals, a computer system and a plurality of information-provider terminals, the computer system is provided with a user-information database for registration information categories provided for the mobile information terminals' users each serving as a recipient of an information distribution service rendered by the information distribution service system, an information-provider database for registering locations of the information-provider terminals and information to be distributed by the information-provider terminals as notifications, and a location management unit provided for the purpose of inferring changes in location of each mobile information terminal in a time series by using an inference formula provided in advance for predicting the particular mobile information terminal's moving direction and location on the basis of information on locations of the particular mobile information terminal.

13 Claims, 73 Drawing Sheets

GW:Gate away
ASP:Application service provider

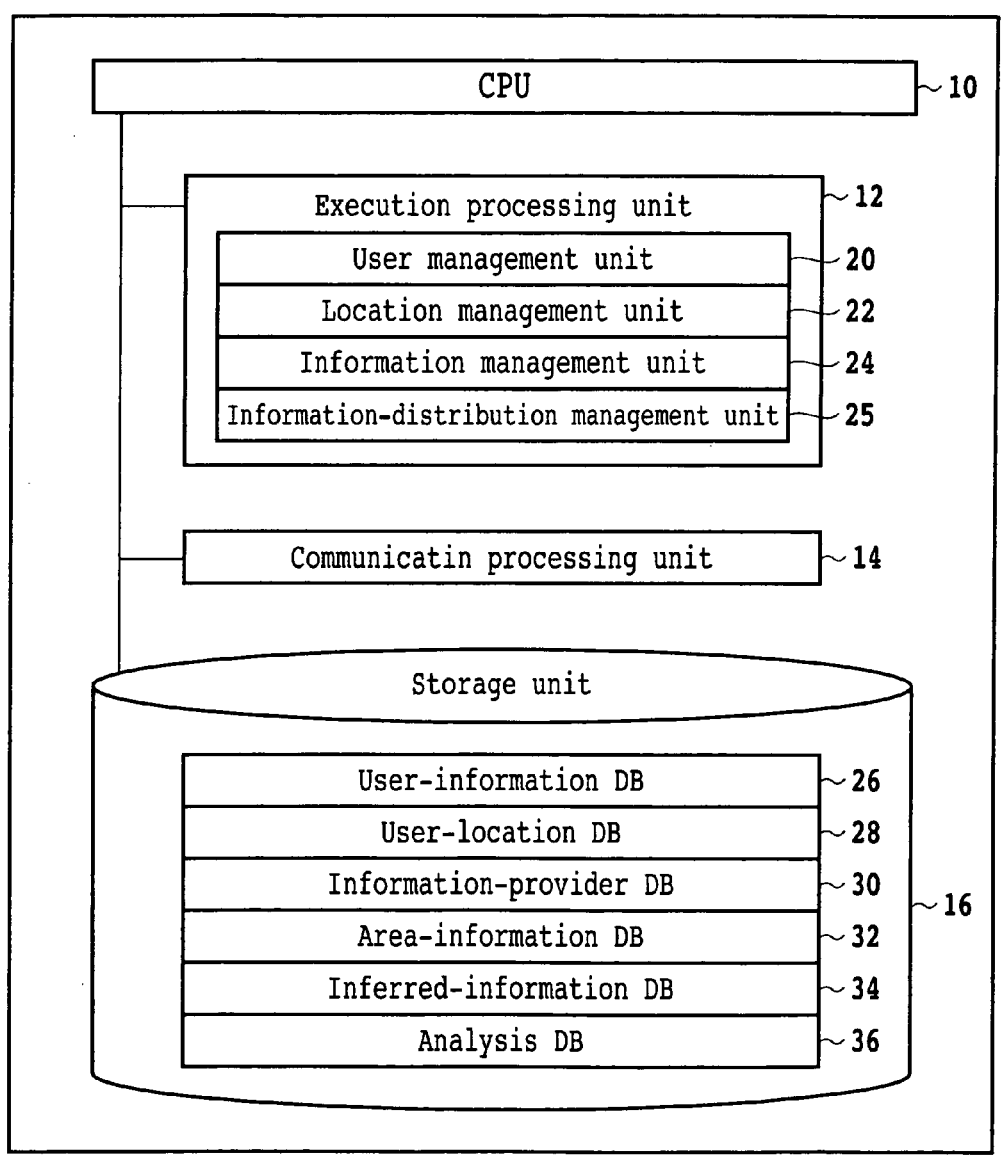

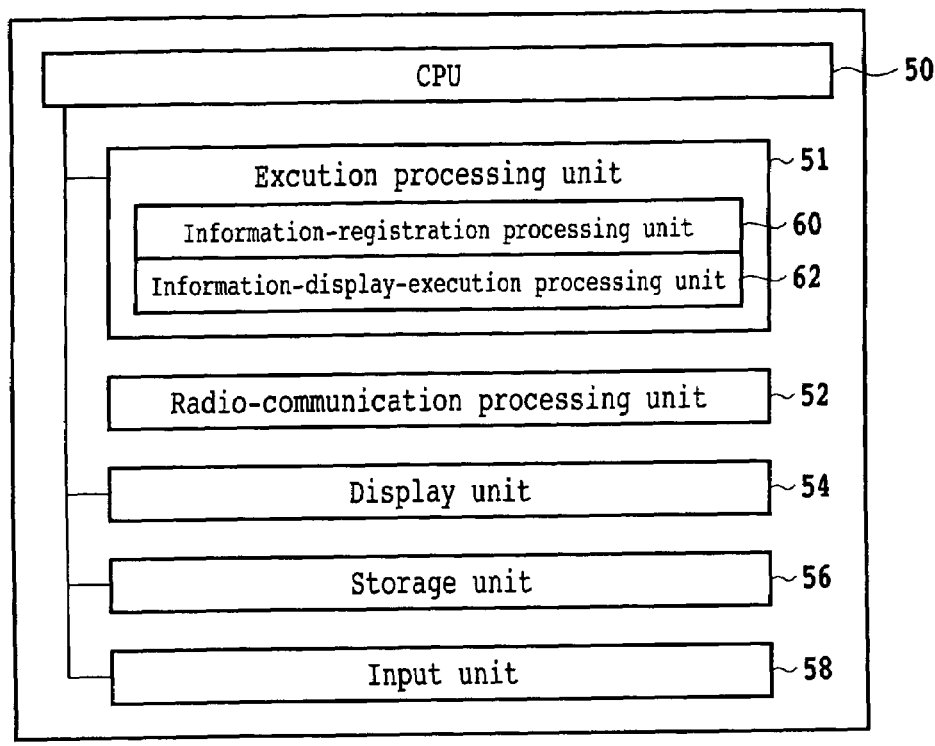
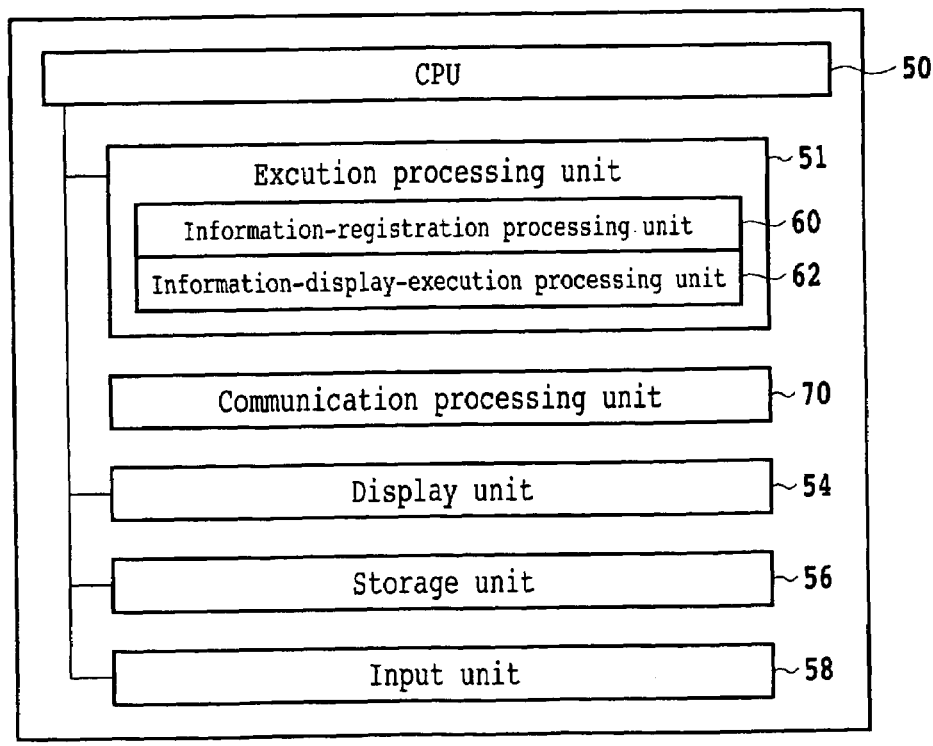

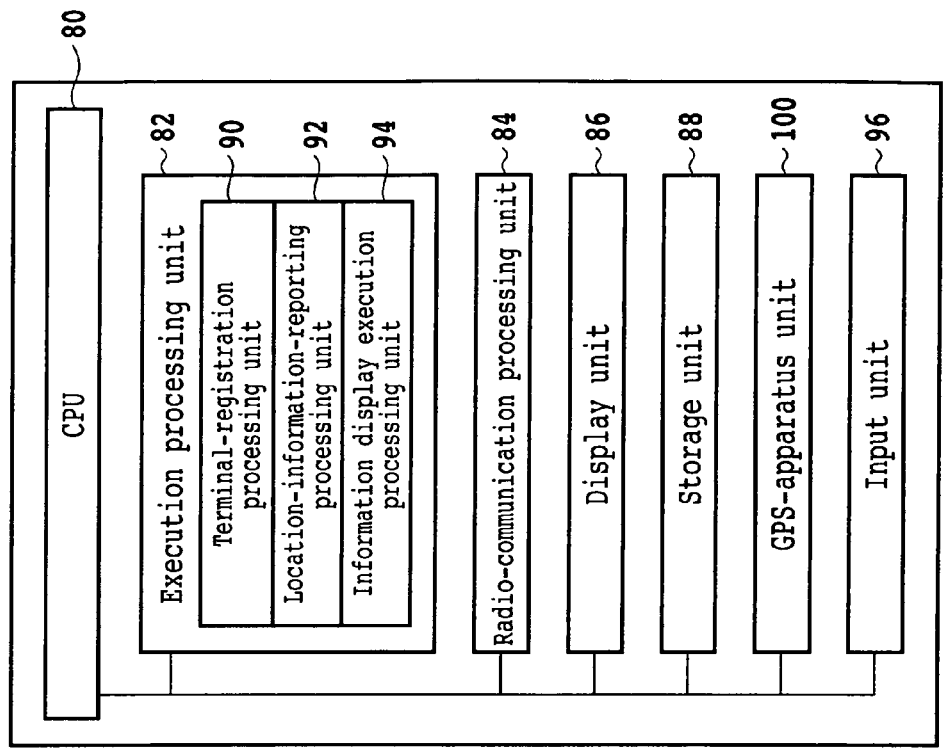
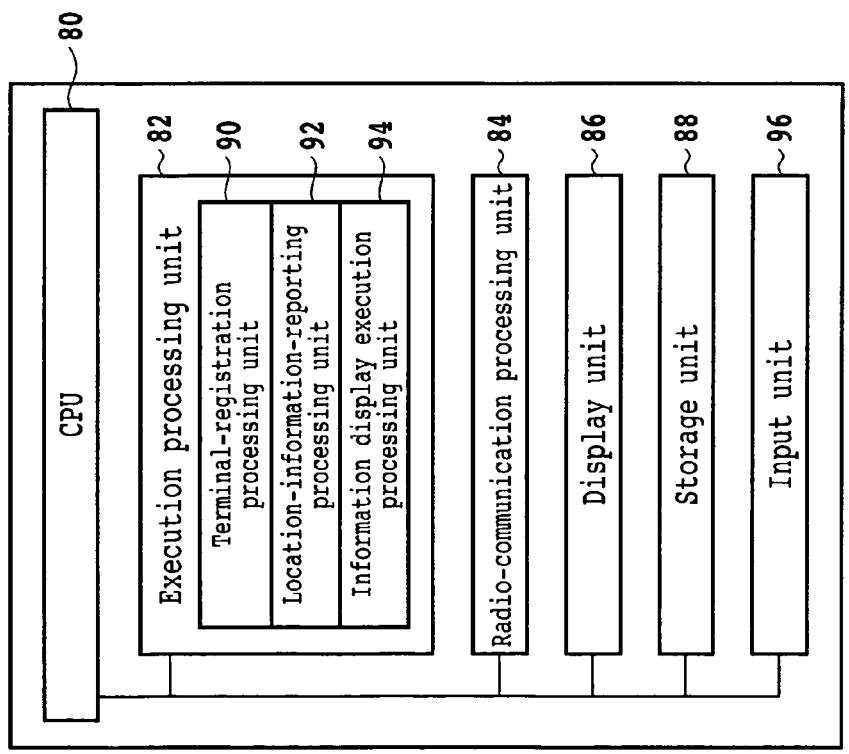

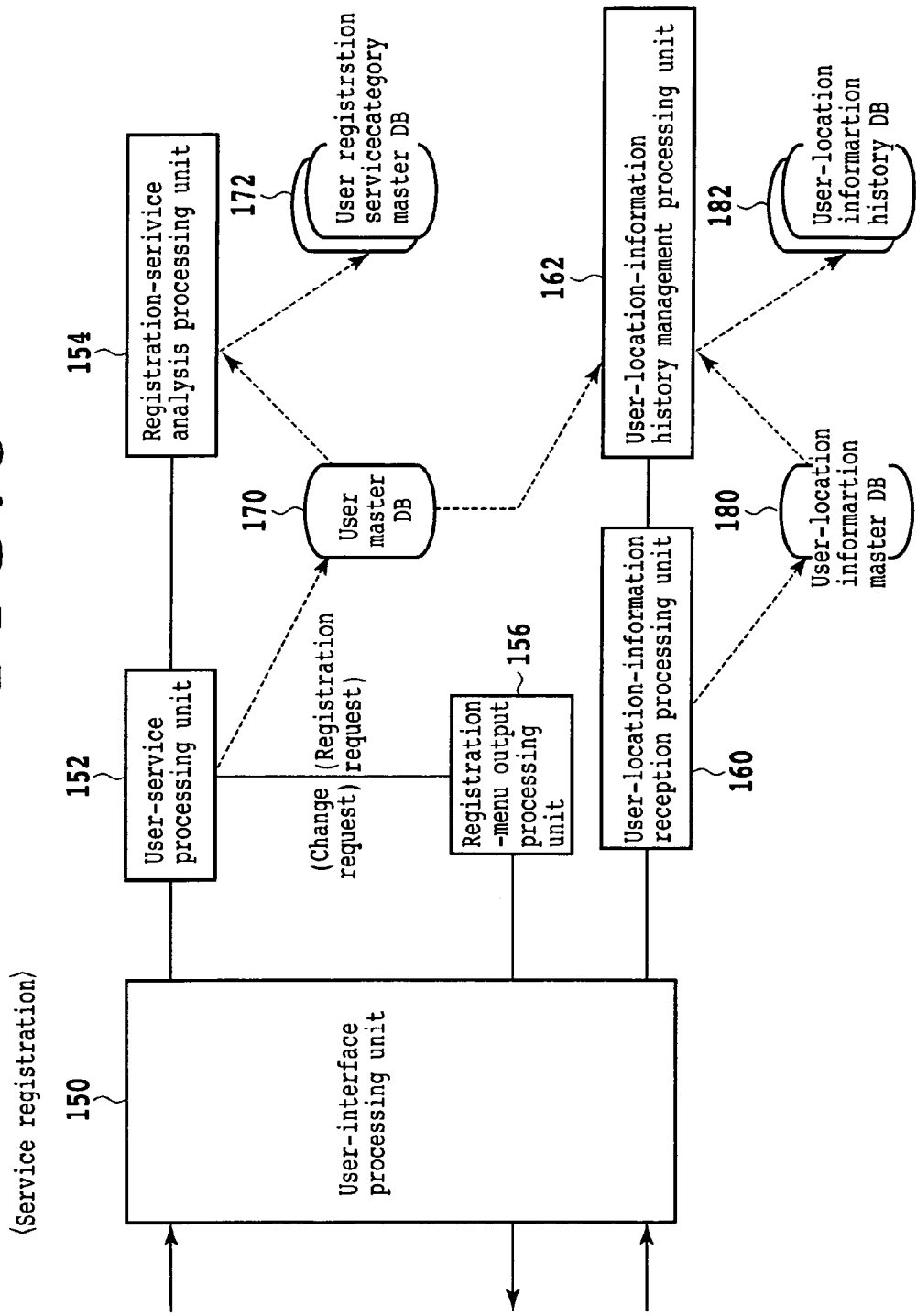

FIG. 24A

| Identification number (1) | IP address or phone number | User-registation menu |
|---|---|---|

FIG. 24B

| Identification number (2) | IP address or phone number | Completion information |
|---|---|---|

{ 0: Normal completion
1: Abnormal completion

FIG. 24C

| Identification number (3) | IP address or phone number | Information menu |
|---|---|---|

FIG. 24D

| Identification number (4) | IP address or phone number | Detailed information |
|---|---|---|

FIG. 24E

| Identification number (5) | IP address or phone number | Moving-destination information |
|---|---|---|

FIG. 25A

| Requested identification number (1) | IP address or phone number |
|---|---|

FIG. 25B

| Requested identification number (2) | IP address or phone number | Password | Category information |
|---|---|---|---|

FIG. 25C

| Requested identification number (3) | IP address or phone number | Location information (Longitude and latitude) | Time information |
|---|---|---|---|

FIG. 25D

| Requested identification number (4) | IP address or phone number | Selection number |
|---|---|---|

FIG. 25E

| Requested identification number (5) | IP address or phone number |
|---|---|

FIG. 25F

| Requested identification number (6) | IP address or phone number | Start/stop identification | Service-request level |
|---|---|---|---|

Start/stop identification:
0: Register
1: Start
2: Change
3: Stop
4: Release

Service-request level:
0: Normal
1: Urgent

FIG.26A

| Identification number (11) | IP address or phone number | Information-registration menu |

FIG.26B

| Identification number (12) | IP address or phone number | Completion information |

Completion information: 0:Normal completion, 1:Abnormal completion

FIG.26C

| Identification number (13) | IP address or phone number | Category information | Detailed information |

FIG.26D

| Identification number (14) | IP address or phone number | Completion information |

Completion information: 0:Normal completion, 1:Abnormal completion

FIG.26E

| Identification number (15) | IP address or phone number | Completion information |

Completion information: 0:Normal completion, 1:Abnormal completion

FIG.26F

| Identification number (16) | IP address or phone number | Information-display-changing menu |

FIG.26G

| Identification number (17) | IP address or phone number | Information-deleting menu |

FIG.27A

| Requested identification number (11) | IP address or phone number |
|---|---|

FIG.27B

| Requested identification number (12) | IP address or phone number | Password | Category information | Detailed information |
|---|---|---|---|---|

FIG.27C

| Requested identification number (13) | IP address or phone number | Password | Category information | Detailed information |
|---|---|---|---|---|

FIG.27D

| Requested identification number (14) | IP address or phone number | Password | Category information | Information No. |
|---|---|---|---|---|

| Requested identification number (15) | IP address or phone number | Password | Category information | Deletion No. |
|---|---|---|---|---|

0: Complete deletion
1 to 999: Information No.

FIG.27F

| Requested identification number (16) | IP address or phone number |
|---|---|

FIG.27G

| Requested identification number (17) | IP address or phone number |
|---|---|

FIG.34

《User-registration menu》

| User name | ABC |
| --- | --- |
| Password | ******** |

☑ Traffic information

☑ Shopping information

☑ Event information

☐ Restaurant information

⇦ ⇨ ⇧ ⇩ [LIST] [URGENT]

[REGISTER] [CANCEL] [SERVICE] [HELP]

Screen after user registration

Select menu screen

FIG.37

《Information-registration menu》

| User name | ABC |
| --- | --- |
| Password | ******* |

☐ Traffic information

☑ Shopping information

☐ Event information

☐ Restaurant information

⇦ ⇨ ⇧ ⇩ [LIST]

[REGISTER] [CANCEL]    [SERVICE] [HELP]

Information-registration menu screen
(Category inputting)

FIG.38

《information menu》

1. Traffic information
2. Train and bus information
3. Shopping information
4. Event information
5. Entertainment information

SERVICE   HELP

Information-registration menu screen
(Detailed-information inputting)

FIG.40

∗∗information registration has been completed.

SERVICE  HELP

Screen after information registration

Information-displaying screen
(Category selection)

FIG.42
《Information-display changing menu》
Shopping information
No.1
Today, at ○○ shopping center,
×× products are put on sales only for
100 customers on first-come, first-served
basis.
Address: 1-1-1 □□town, △△city
Phone: xxx-yyy-zzzz
    LIST
CHANGE  CANCEL  SERVICE  HELP
Information-displaying screen
(Detailed-information display)

FIG.43

```
**information modification has been completed.
```

[SERVICE]  [HELP]

Screen after information modification

Information-deletion screen
(Category selection)

FIG.45

《information deletion menu》

Shopping information

No.1

Today, at ○○ shopping center,
×× products are put on sales only for
100 customers on first-come, first-served
basis.
Address: 1-1-1 □□town, △△city
Phone: xxx-yyy-zzzz

⇐  ⇒  ⇑  ⇓  LIST

DELETE  CANCEL  SERVICE  HELP

Information deletion screen
(Detailed-information deletion)

FIG.46

《information deletion menu》

Shopping information

No.1

Today, at ○○ shopping center,
×× products are put on sales only for
100 customers on first-come, first-served
basis.
Address: 1-1-1 □□town, △△city
Phone: xxx-yyy-zzzz ◉ Deletion of No.1
○ Deletion of all

← → ↑ ↓   LIST

DELETE   CANCEL   SERVICE   HELP

Information deletion screen
(Detailed-information deletion)

FIG.47

∗∗information deletion has been completed.

| SERVICE | HELP |

Screen after information deletion

FIG.54

《Detailed shopping information》

Nakahara department store

1. Today's buying at bargain

2. Seasonal-bargain information

3. Coupons

SERVICE   HELP

Detailed-information screen

FIG.55

《Detailed traffic information》

Traffic jam at distance of 5 km from Youga

SERVICE    HELP

Detailed-information screen

FIG.63

《Detailed information on trains and buses》

The next station is Musashi Nakahara.

Will arrive at Kawasaki terminal at 12:00.

1. information on change to another train at Kawasaki station 2. infromation on change to another train at Musashi Kosugi station.

SERVICE    HELP

Detailed-information screen

Detailed-information screen

INFORMATION DISTRIBUTION SERVICE SYSTEM BASED ON PREDICTED CHANGES IN LOCATION OF MOBILE INFORMATION TERMINAL

BACKGROUND OF THE INVENTION

1. Field of the Invention

The present invention relates a technique of rendering an information distribution service to provide a user of a mobile information terminal with information such as area information optimum for a predicted location of the user in advance.

2. Description of the Related Art

Up to this time, a service and/or a function based on information on location of the conventional mobile information terminal allow information on the vicinity of the present location (the current location) of the mobile information terminal to be obtained by determining or inputting the present location. That is to say, the information on the vicinity of the present location of the mobile information terminal can be obtained only on condition that the mobile information terminal is currently located at the present location. In addition, there are also cases in which the mobile information terminal is provided with obsolete information no longer required by the user of the mobile information terminal. An example of such information is information about an area already left by the mobile information terminal. Furthermore, there is no means for distributing information to mobile information terminals moving to a specific direction by adoption of a multi-casting or broadcasting technique.

However, the conventional information distribution service has the following problems. If a user carrying a mobile information terminal does not enter information on a destination of the movement of the user to the terminal, the existence of information on the destination of the movement or information on an area on the way in the direction of the movement is not known. In general, only information on the vicinity of the present location of the mobile information terminal can be obtained and distributed information includes obsolete information not required by the user. In addition, the obsolete information not required by the user is displayed in some cases. Furthermore, information on accidents at a destination of a mobile information terminal moving to a specific direction, and disaster or urgent information cannot be transmitted to the mobile information terminal as a notification whereas congestions cannot be controlled either.

SUMMARY OF THE INVENTION

It is thus an object of the present invention to provide a user of a mobile information terminal with information such as advance area information suitable for a predicted moving destination (or a predicted moving direction) of the user and to control a mobile information terminal located at the same moving destination (or at a location on the way to the same moving direction).

In accordance with an aspect of the present invention, there is provided an information distribution service system comprising a plurality of mobile information terminals, a computer system and a plurality of information-provider terminals wherein said mobile information terminals, said computer system and said information-provider terminals are connected to each other by a communication network, said information distribution service system characterized in that: said computer system predicts a mobile information terminal's moving destination and moving direction by inferring said mobile-information terminal's location displacements along the time series on the basis of information on locations of said mobile information terminal including a pre-registered information category whose information distribution service, distribution and notification are desired, and on the basis of an inference formula provided in advance with said mobile information terminal's moving direction and location; and said computer system determines an information-provider terminal predicted to exist at said predicted moving destination of said mobile information terminal on the basis of locations of information-provider terminals pre-recording plans to distribute information as a notification, and determines distributed and reported information corresponding to an information category registered in advance by said mobile information terminal among pieces of information to be provided by said selected information-provider terminal.

It is desirable to provide an implementation of said information distribution service system wherein, if it is impossible to determine an inference formula for predicting said mobile information terminal's moving direction and location from location displacements of said mobile information terminal with each geographical position used as an origin on the basis of map information, said computer system finds an inference formula for predicting said mobile information terminal's most recent moving destination and most recent moving direction each time most recent information on a location of said mobile information terminal is obtained.

It is also desirable to provide another implementation of said information distribution service system wherein, if an inference formula, which is found as an equation for predicting said mobile information terminal's moving destination and moving direction each time most recent information on a location of said mobile information terminal is obtained, changes very frequently in a time series, said computer system predicts a polarity of a movement of said mobile information terminal by application of a partial derivative and on the basis of said mobile information terminal's location information accumulated in the past.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2 is a diagram showing the configuration of a computer system employed in the information distribution system shown in FIG. 1;

FIGS. 3A–3B are block diagrams each showing functions of an information-provider terminal employed in the information distribution system shown in FIG. 1;

FIGS. 4A–4B are block diagrams each showing functions of a user terminal employed in the information distribution system shown in FIG. 1;

FIG. 5 is a block diagram showing functions relevant to user management and location management;

FIGS. 24A–24E are diagrams showing structures of data transmitted by the computer system to a user terminal;

FIGS. 25A–25F are diagrams showing structures of data transmitted to the computer system by a user terminal;

FIGS. 26A–26G are diagrams showing structures of data transmitted by the computer system to an information-provider terminal;

FIGS. 27A–27G are diagrams showing structures of data transmitted to the computer system by an information-provider terminal;

FIG. 34 is a diagram showing a user-registration screen of a user terminal;

FIG. 37 is a diagram showing an information-registration screen for an information provider;

FIG. 38 is a diagram showing an information menu screen of a user terminal;

FIG. 40 is a diagram showing a user-registration completion screen for an information provider;

FIG. 42 is a diagram showing an information-display-changing screen (displaying detailed information) for an information provider;

FIG. 43 is a diagram showing an information-changing completion screen for an information provider;

FIG. 45 is a diagram showing an information-deletion screen (displaying detailed information deletion) for an information provider;

FIG. 46 is a diagram showing an information-deletion screen (displaying detailed information deletion) for an information provider;

FIG. 47 is a diagram showing an information-deletion completion screen for an information provider;

FIG. 54 is a diagram showing a screen displaying detailed information;

FIG. 55 is a diagram showing a screen displaying detailed information;

FIG. 63 is a diagram showing a screen displaying detailed information;

DESCRIPTION OF THE PREFERRED EMBODIMENTS

Figure 1:
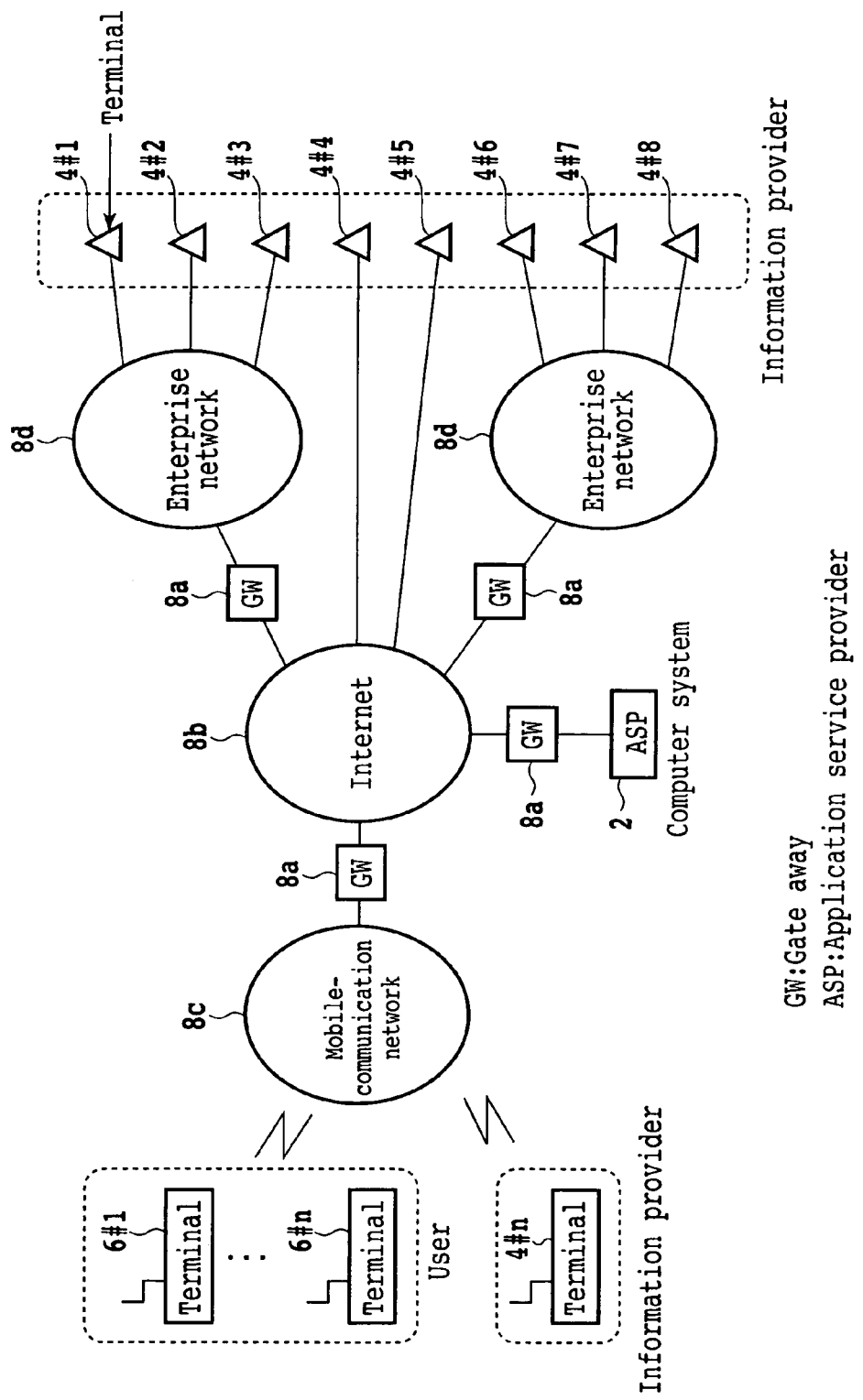
FIG. 1 is a diagram showing the basic configuration of an information distribution system provided by the present invention.

Before embodiments of the present invention are explained, the principle of the present invention is described. FIG. 1 is a diagram showing the basic configuration of an information distribution service system. The information distribution service system includes a computer system 2, a plurality of information-provider terminals 4#i where i=1 to n and a plurality of user terminals 6#i where i=1 to m. The computer system 2 is an application service provider (ASP) connected to the information-provider terminals 4#i and the user terminals 6#i by a network typically comprising gateways (GWs) 8a, the Internet 8b, a mobile-communication network 8c and enterprise networks (NW) 8d. The information-provider terminals 4#i are each a terminal owned by a provider supplying information to users. Examples of the information-provider terminals 4#i are an enterprise terminal connected to the enterprise NW 8d, a personal-business terminal such as SOHO and a mobile terminal. On the other hand, the user terminals 6#i are each a mobile terminal owned by a recipient of the provided information. An example of the user terminal 6#i is a mobile phone.

The computer system 2 has the following functions:

(i): Register the location of an information provider and information provided to users as well as their categories for each of the information-provider terminals 4#i.

(ii): Register the category of user information and the category of desired information to be provided to a user for each of the user terminals 6#i.

(iii): Infer the next location of a moving user from the present and previous locations of the user terminal 6#i by using an inference formula.

(iv): Determine an information provider from an inferred location of the user terminal 6#i.

(v): Distribute information to the user terminals 6#i.

(vi): Analyze users' responses to distributed information.

The information-provider terminal 4#i has a function of requesting the computer system 2 to register a location thereof and information provided thereby in the computer system 2. The information-provider terminal 4#i can be a fixed or mobile terminal.

The user terminal 6#i has the following functions:

(i): Request the computer system 2 to register the category of user information and the category of desired information to be provided to the user in the computer system 2.

(ii): Inform the computer system 2 of a location of the user terminal 6#i in case the user terminal 6#i is a GPS (Global Positioning System)-function terminal. Request a mobile-communication operator to inform the computer system 2 of a location of the user terminal 6#i in case the user terminal 6#i is a non-GPS-function terminal.

(iii): Display information received from the computer system 2 and transmits a response to the information to the computer system 2.

FIG. 2 is a diagram showing the configuration of the computer system 2. As shown in FIG. 2, the computer system 2 includes a CPU 10, an execution processing unit 12, a communication processing unit 14 and a storage unit 16. The execution processing unit 12 includes a user management unit 20, a location management unit 22, an information management unit 24 and an information-distribution management unit 25. The communication processing unit 14 communicates with the information-provider terminals 4#i and the user terminals 6#i through gateways (GWs) 8a, the Internet 8b, the mobile-communication network 8c and enterprise networks (NW) 8d. The storage unit 16 is used for storing a user-information database 26, a user-location database 28, an information-provider database 30, an area-information database 32, an inferred-information database 34 and an analysis database 36.

FIG. 3 is block diagrams each showing functions of the information-provider terminal 4#i. To be more specific, FIG. 3(a) is a block diagram showing functions of a mobile information-provider terminal while FIG. 3(b) is a block diagram showing functions of a fixed information-provider terminal. The mobile information-provider terminal's configuration elements essentially identical to those of the fixed information-provider terminal are denoted by the same reference numerals as their counterparts in the fixed information-provider terminal. As shown in FIG. 3(a), the mobile information-provider terminal comprises a CPU 50, an execution processing unit 51, a radio-communication processing unit 52, a display unit 54, a storage unit 56 and an input unit 58. The execution processing unit 51 includes an information-registration processing unit 60, an information-display-execution processing unit 62. On the other hand, the fixed information-provider terminal comprises a CPU 50, an execution processing unit 51, a communication processing unit 70, a display unit 54, a storage unit 56 and an input unit 58 as shown in FIG. 3(b).

FIG. 4 is block diagrams each showing functions of the user terminal 6#i. To be more specific, FIG. 4(a) is a block diagram showing functions of a non-GPS user information terminal while FIG. 4(b) is a block diagram showing functions of a GPS user information terminal. The non-GPS user terminal's configuration elements essentially identical to those of the GPS user terminal are denoted by the same reference numerals as their counterparts in the GPS user terminal. As shown in FIG. 4(a), the non-GPS user information terminal comprises a CPU 80, an execution processing unit 82, a radio-communication processing unit 84, a display unit 86, a storage unit 88 and an input unit 96. The execution processing unit 82 includes a terminal-registration processing unit 90, a location-information-reporting processing unit 92 and an information display execution processing unit 94. On the other hand, the GPS user information terminal comprises a GPS-apparatus unit 100 in addition to the non-GPS user information terminal as shown in FIG. 4(b).

Figure 6:
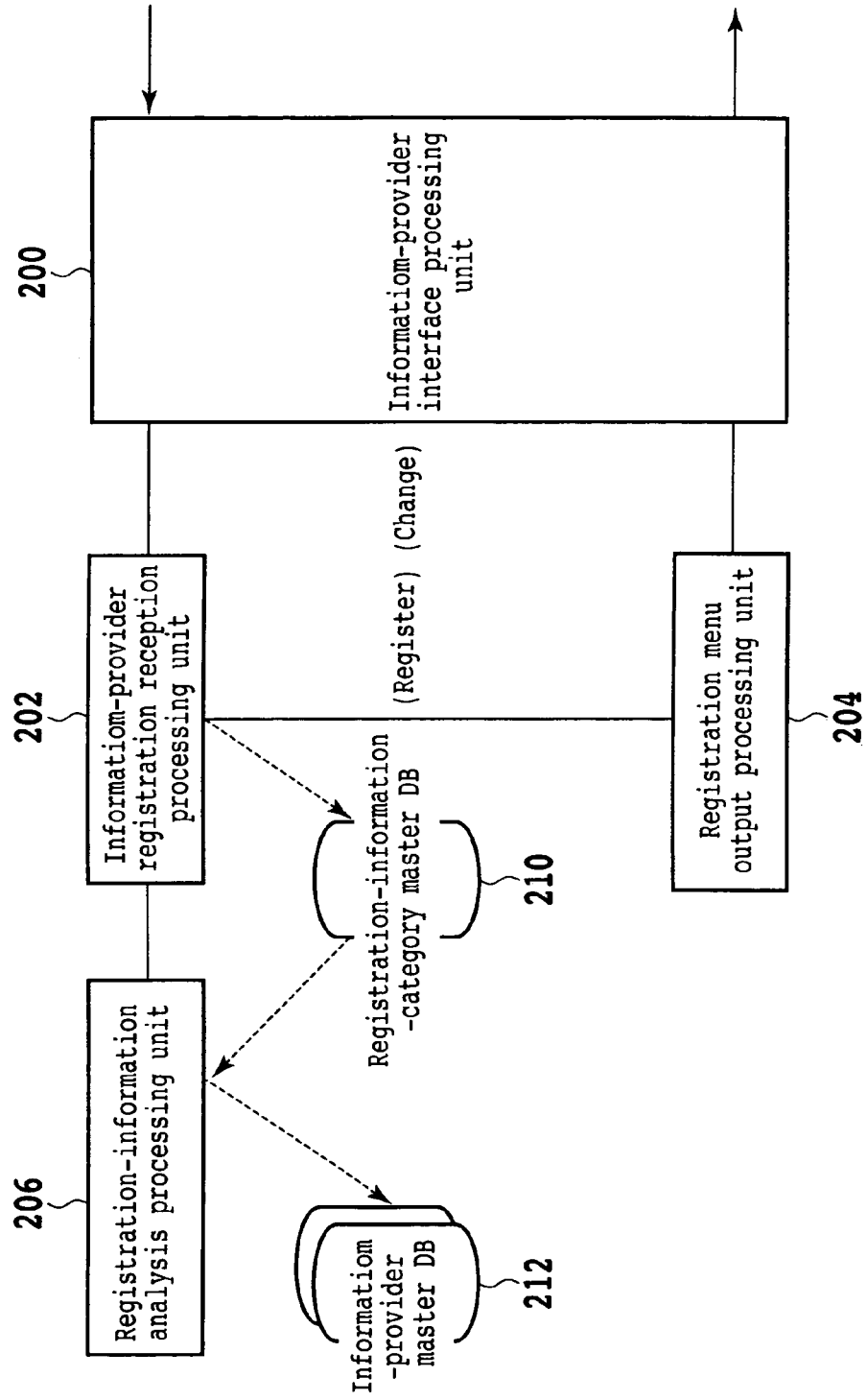
FIG. 6 is a block diagram showing functions relevant to information management.
Figure 7:
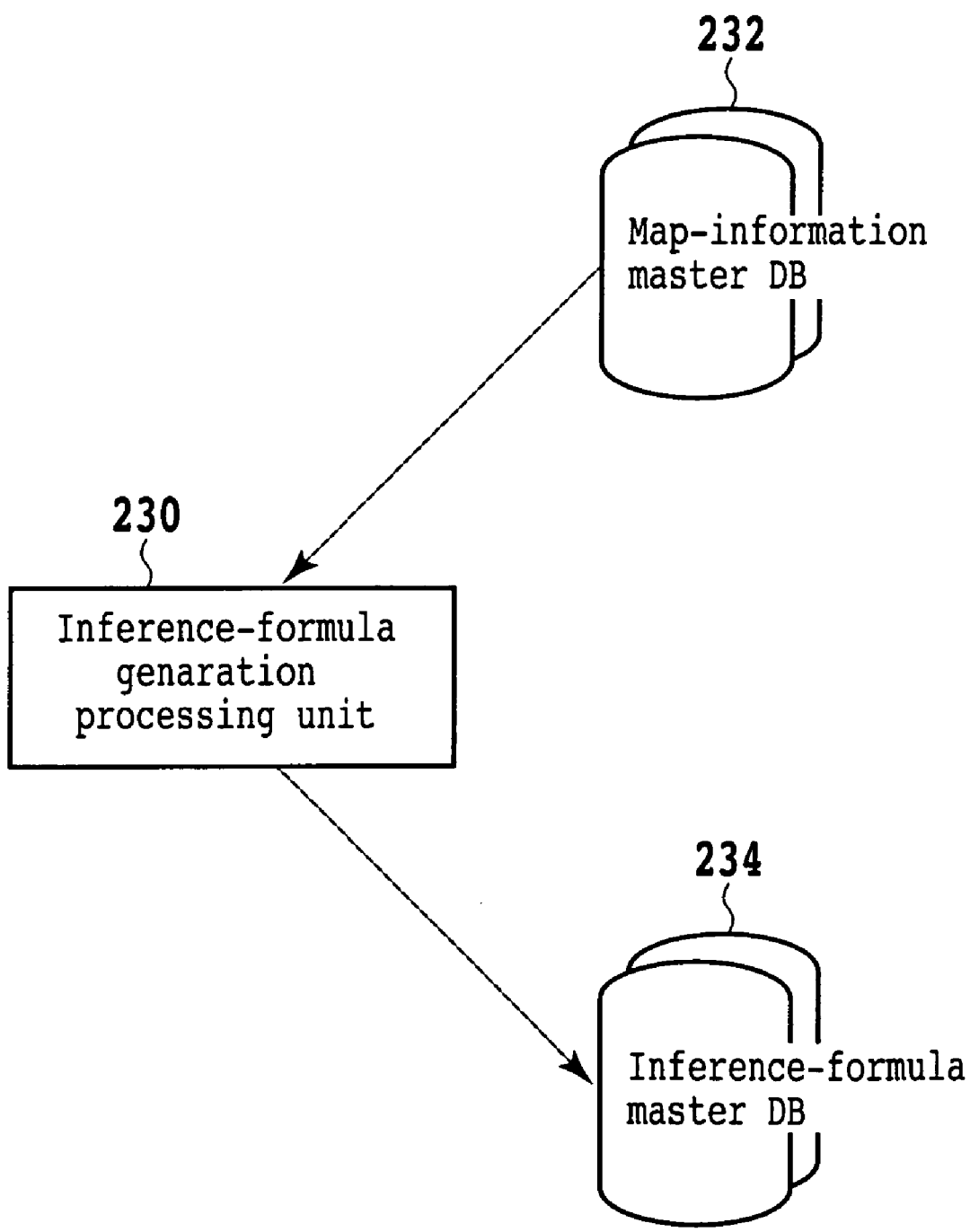
FIG. 7 is a block diagram showing functions relevant to location management.
Figure 8:
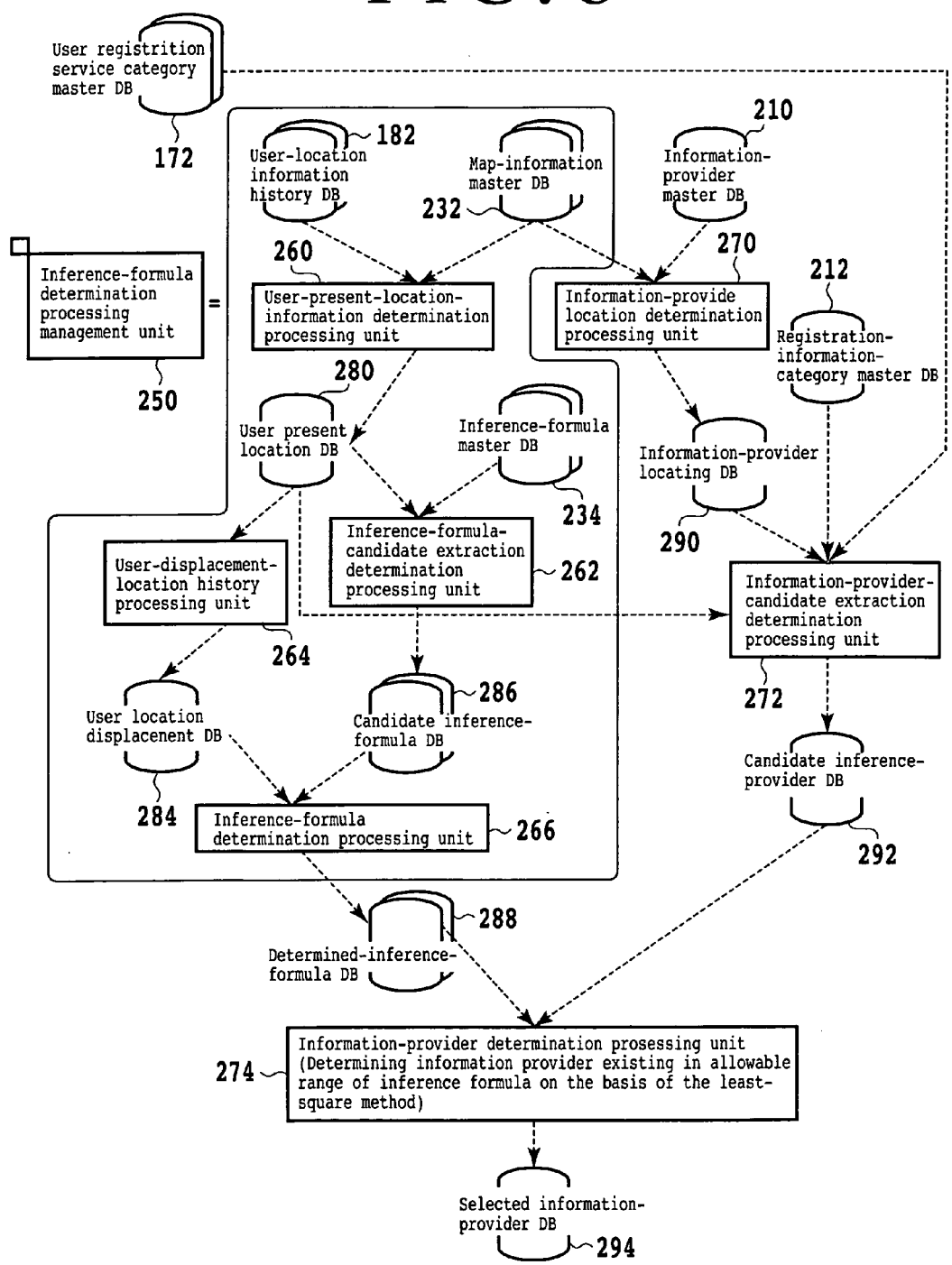
FIG. 8 is a block diagram showing other functions relevant to location management.
Figure 9:
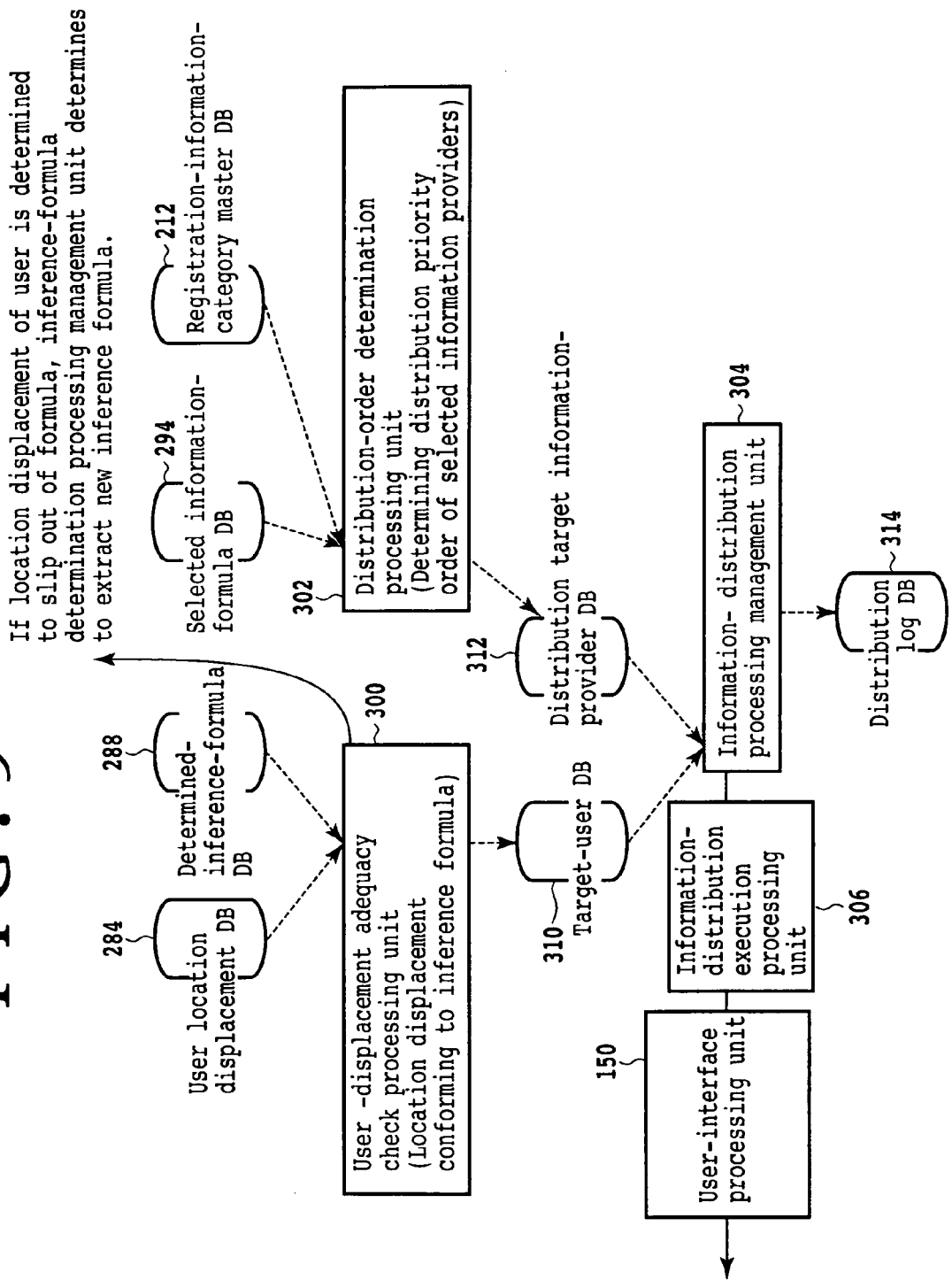
FIG. 9 is a block diagram showing further functions relevant to location management.
Figure 10:
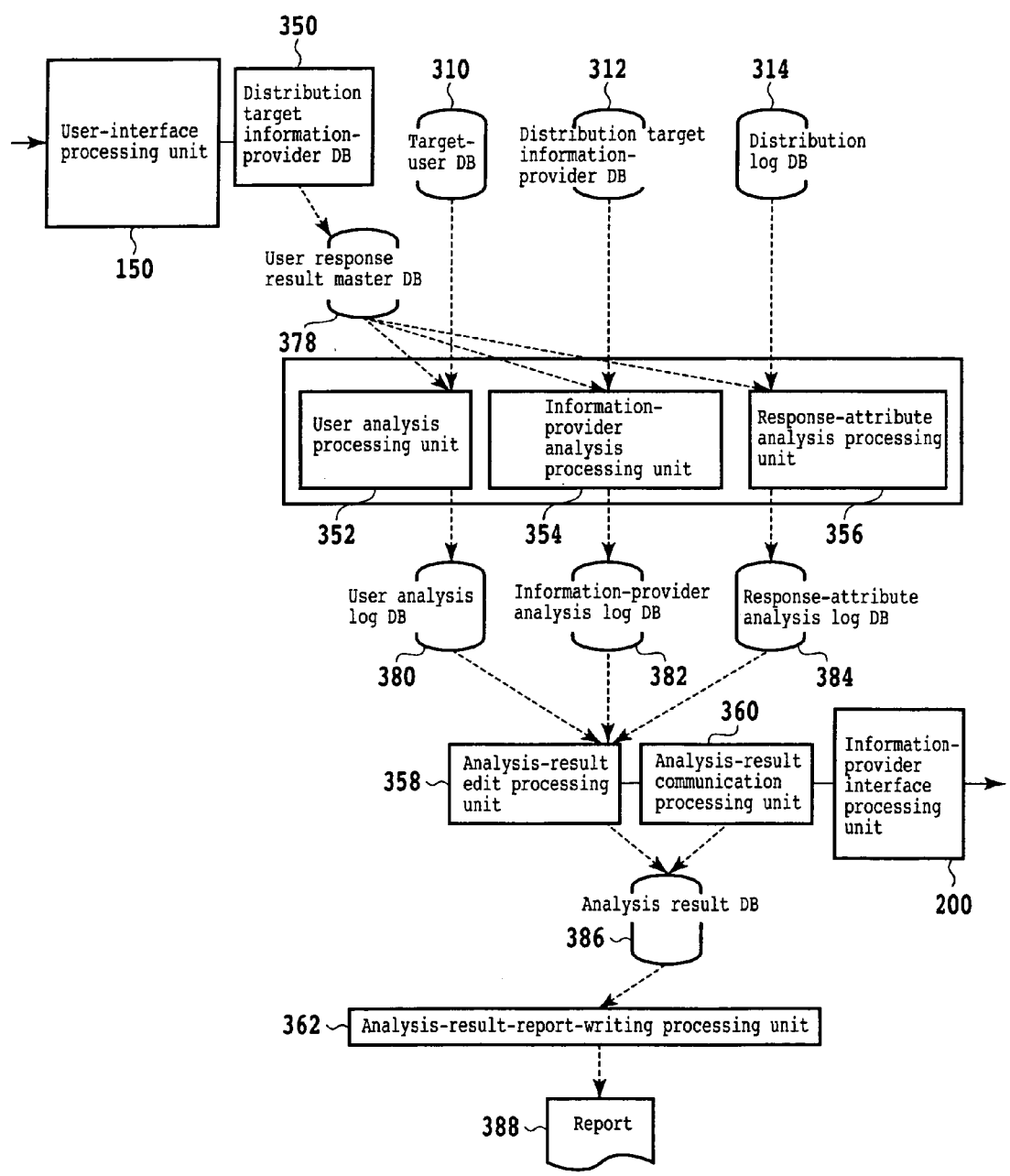
FIG. 10 is a block diagram showing functions relevant to information-provider management.

FIG. 5 is a block diagram showing functions relevant to user management and location management. A user management unit 20 comprises a user-interface processing unit 150, a user-service-reception processing unit 152, a registration-service analysis processing unit 154 and a registration-menu output processing unit 156. FIG. 6 is a block diagram showing functions relevant to information management. FIGS. 7 to 9 are each a block diagram showing functions relevant to location management control. FIG. 10 is a block diagram showing functions relevant to information distribution management.

The location management unit 22 comprises the user-interface processing unit 150, a user-location information reception processing unit 160 and the user-location information history management processing unit 162, which are shown in FIG. 5, an inference-formula generation processing unit 230 shown in FIG. 7, a user-present-location information determination processing unit 260, an inference-formula-candidate extraction determination processing unit 262, a user-displacement-location history processing unit 264, an inference-formula determination processing unit 266, an information-provider-location determination processing unit 270, an information-provider-candidate extraction determination processing unit 272 and an information-provider determination processing unit 274, which are shown in FIG. 8, a user-displacement adequacy check processing unit 300, a distribution-order determination processing unit 302, an Information-distribution processing management unit 304 and an Information-distribution execution processing unit 306, which are shown in FIG. 9.

The information management unit 24 includes an information-provider interface processing unit 200, an information-provider registration reception processing unit 202, a registration menu output processing unit 204 and a registration-information analysis processing unit 206, which are shown in FIG. 6. The information-provider management unit 25 comprises a user-interface processing unit 150, a distributed-information user-response reception processing unit 350, a user analysis processing unit 352, an information-provider analysis processing unit 354, a response-attribute analysis processing unit 356, an analysis-result edit processing unit 358, an analysis-result communication processing unit 360, the information-provider interface processing unit 200 and an analysis-result-report-writing processing unit 362, which are shown in FIG. 10.

The user-information database 26 is a database for storing information on users. The user-information database 26 has a user master database 170 and a user registration service category master database 172, which are shown in FIG. 5. The user-location database 28 is a database for storing information on locations of users. The user-location database 28 comprises a user-location master database 180 and a user-location information history database 182. The information-provider database 30 is a database for storing information on information providers. The information-provider database 30 includes an information-provider master database 210 and a registration-information category master database 212, which are shown in FIG. 6.

The area-information database 32 is a database for storing information on areas such as traffic information in areas, information on trunks and train schedules. The inferred-information database 34 is a database for storing information required for inferring the location of a user. The inferred-information database 34 has a map-information master database 232 and an inference-formula master database 234, which are shown in FIG. 7, a user present location database 280, a user location displacement database 284, a candidate inference-formula database 286, a determined-inference-formula database 288, an information-provider location database 290, a candidate information-provider database 292 and an information-provider database 294, which are shown in FIG. 8, and a target-user database 310, a distribution target information-provider database 312 and a distribution log database 314, which are shown in FIG. 9. The analysis database 36 is a database for storing data required in analyses of responses of users to the information given by the information provider. The analysis database 36 comprises a user response result master database 378, a user analysis log database 380, an information-provider analysis log database 382, a response-attribute analysis log database 384 and an analysis result database 386, which are shown in FIG. 10.

Figure 11:
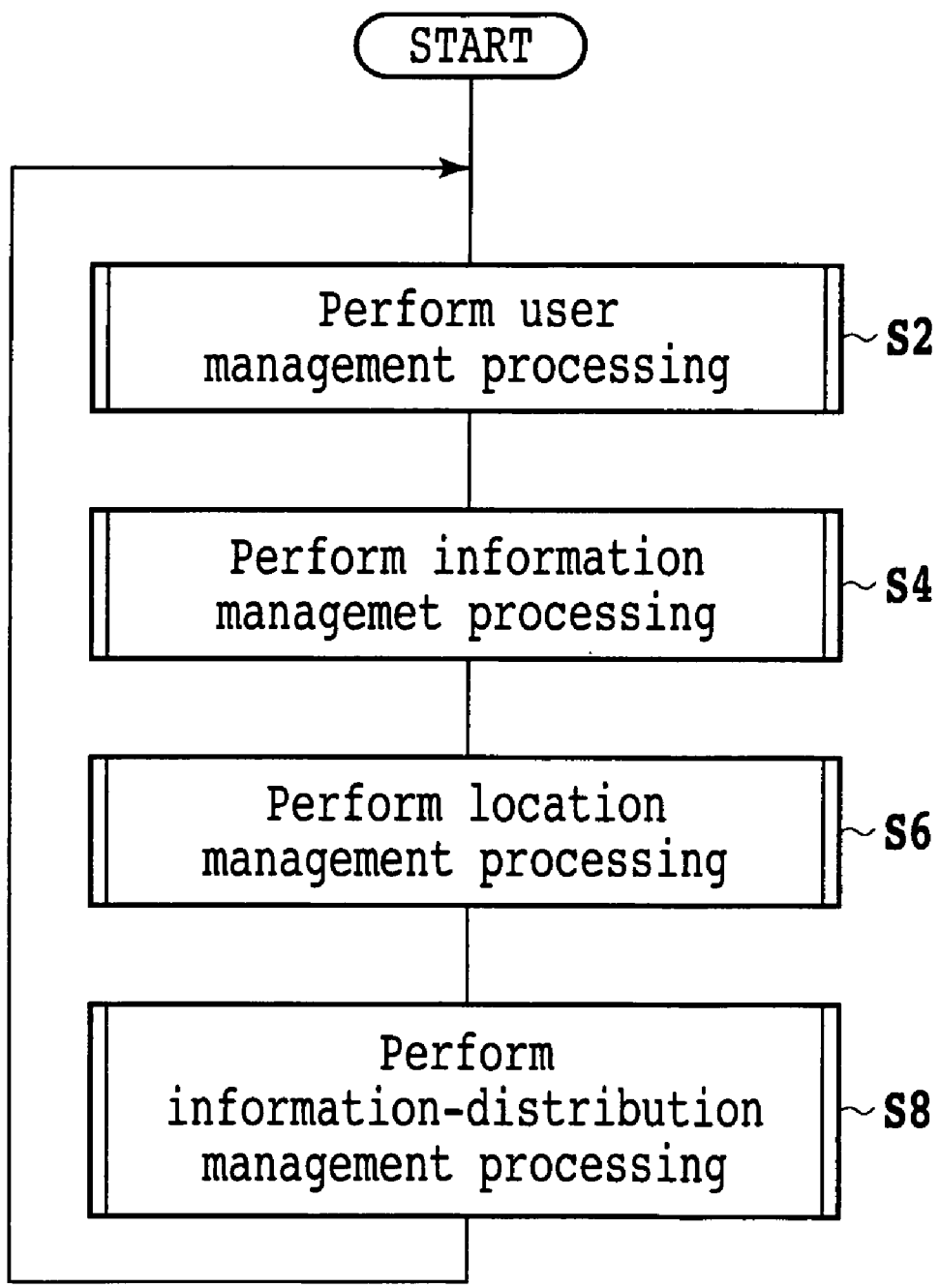
FIG. 11 shows a flowchart representing processing carried out by the computer system.
Figure 12:
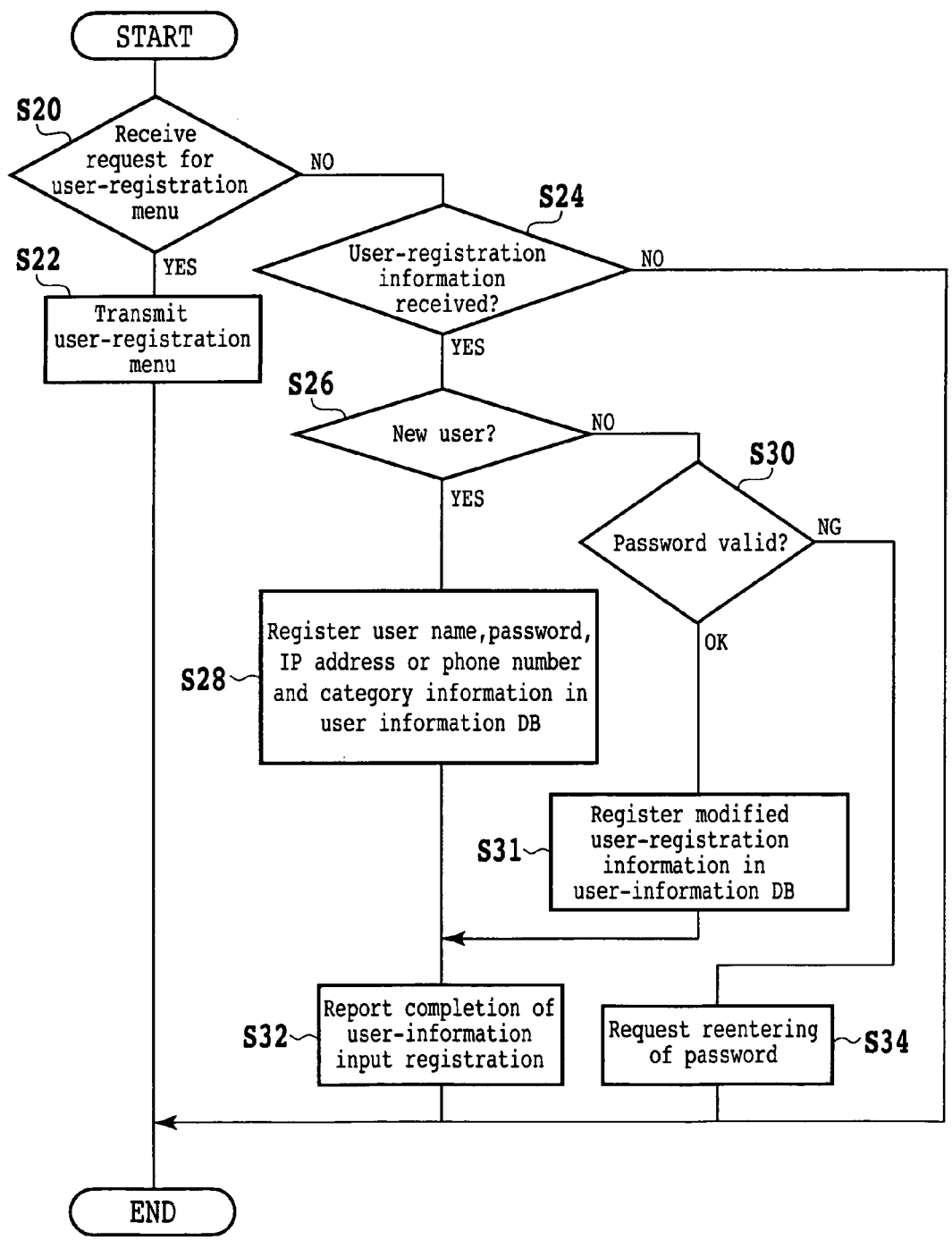
FIG. 12 shows a flowchart representing processing of user management.
Figure 13:
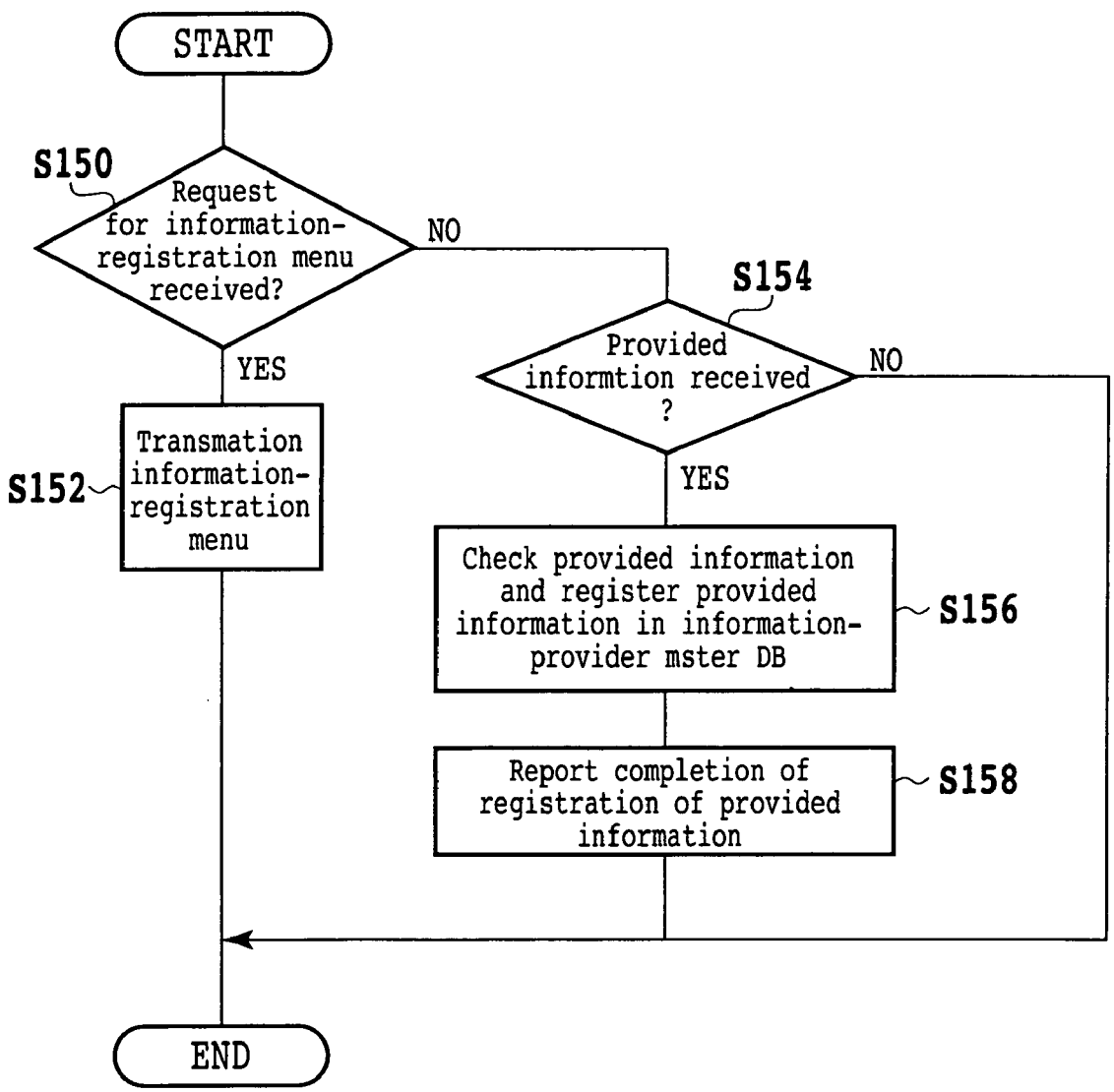
FIG. 13 shows a flowchart representing processing of information management.
Figure 14:
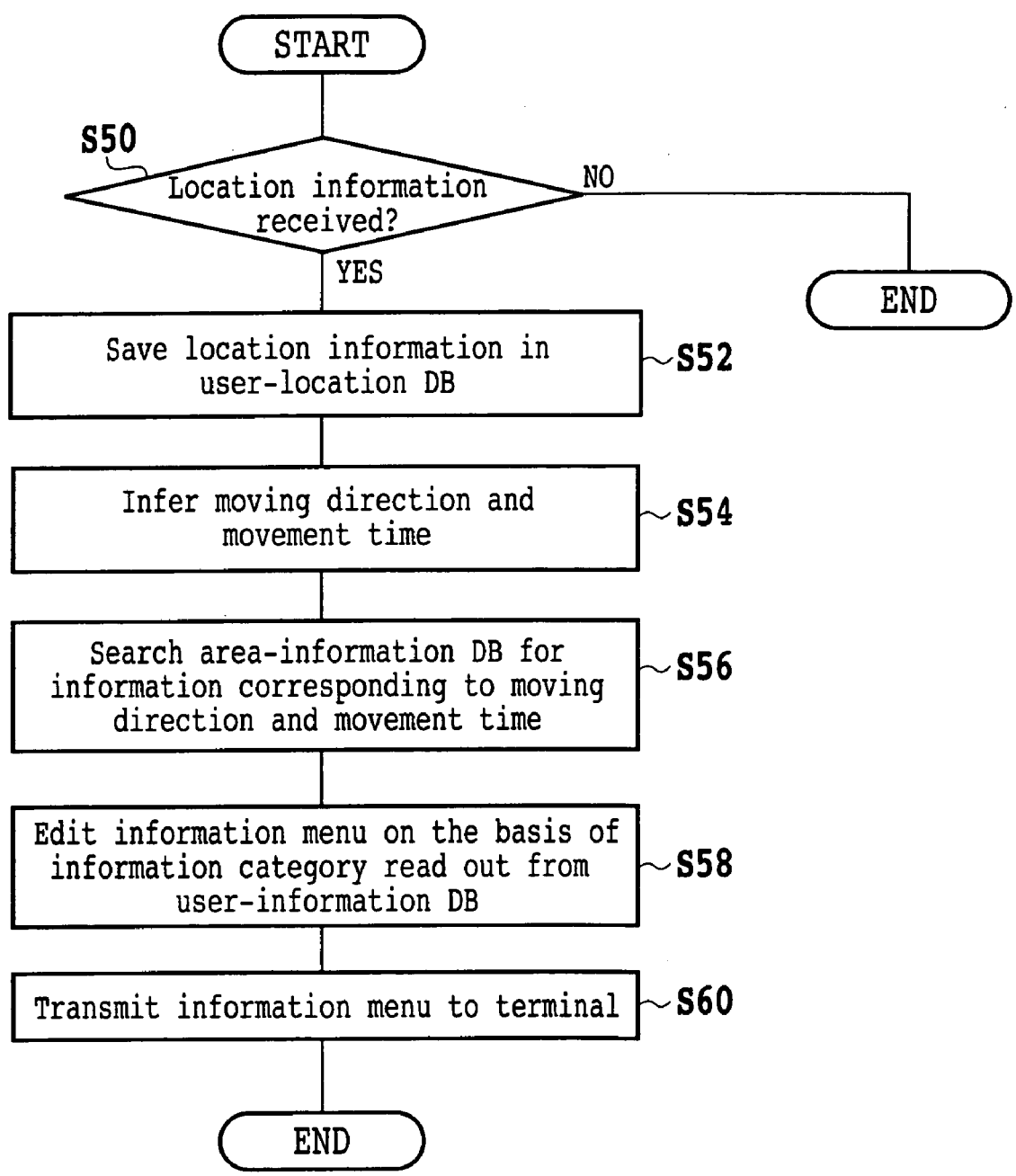
FIG. 14 shows a flowchart representing processing of location management.
Figure 15:
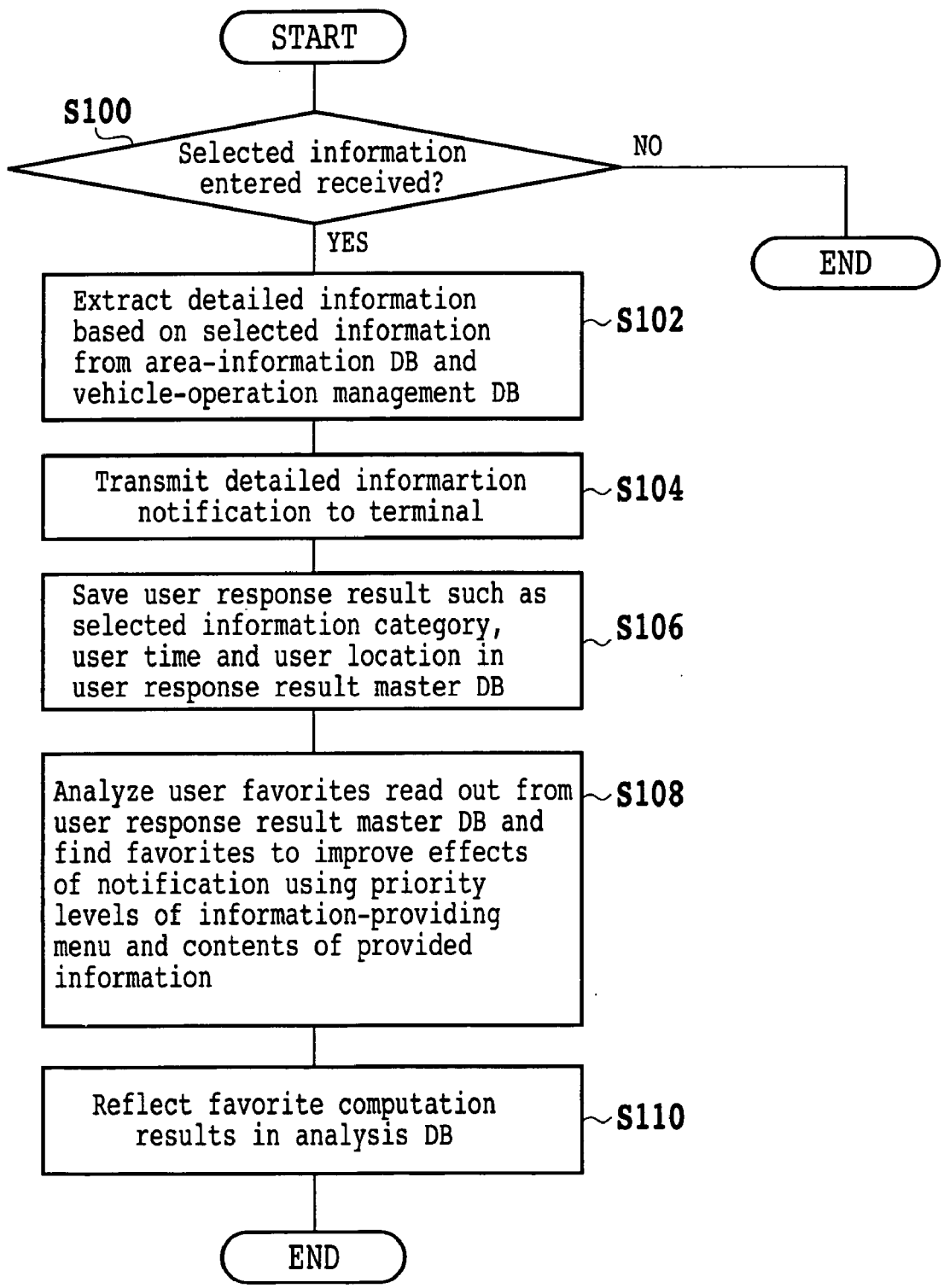
FIG. 15 shows a flowchart representing processing of information-provider management.
Figure 16:
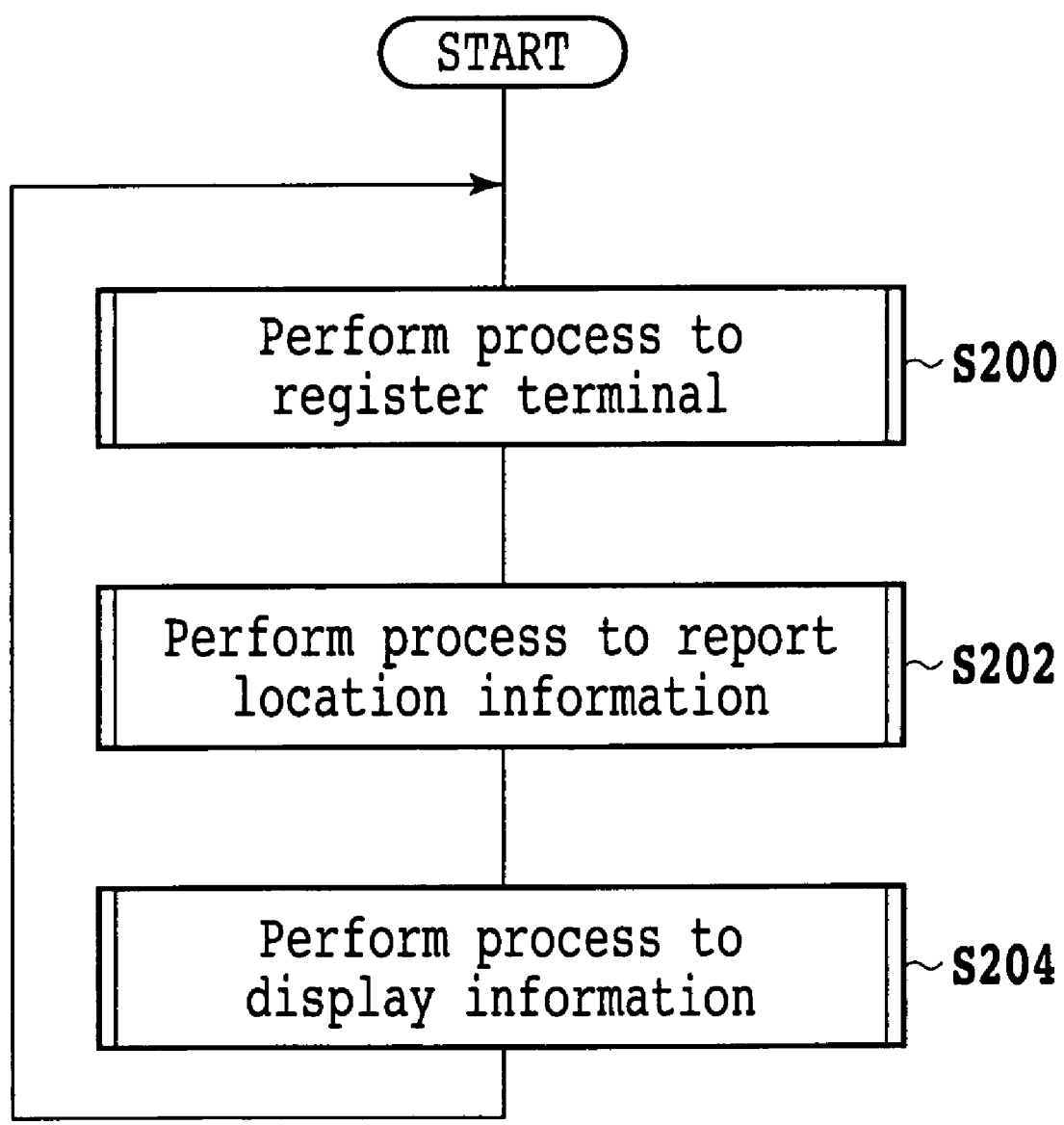
FIG. 16 shows a flowchart representing processing carried out by a user terminal.
Figure 17:
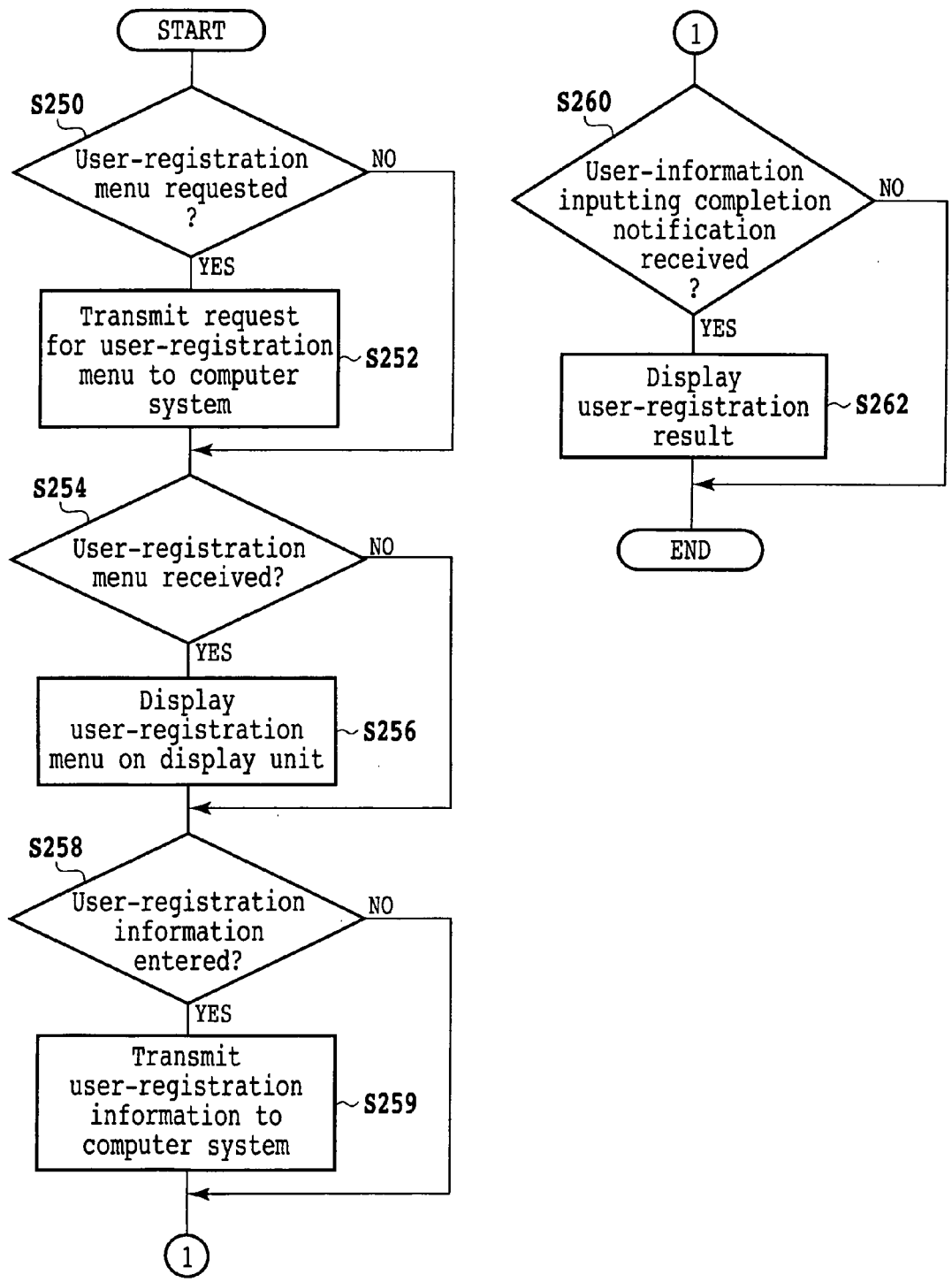
FIG. 17 shows a flowchart representing a process to register a user terminal.
Figure 18:
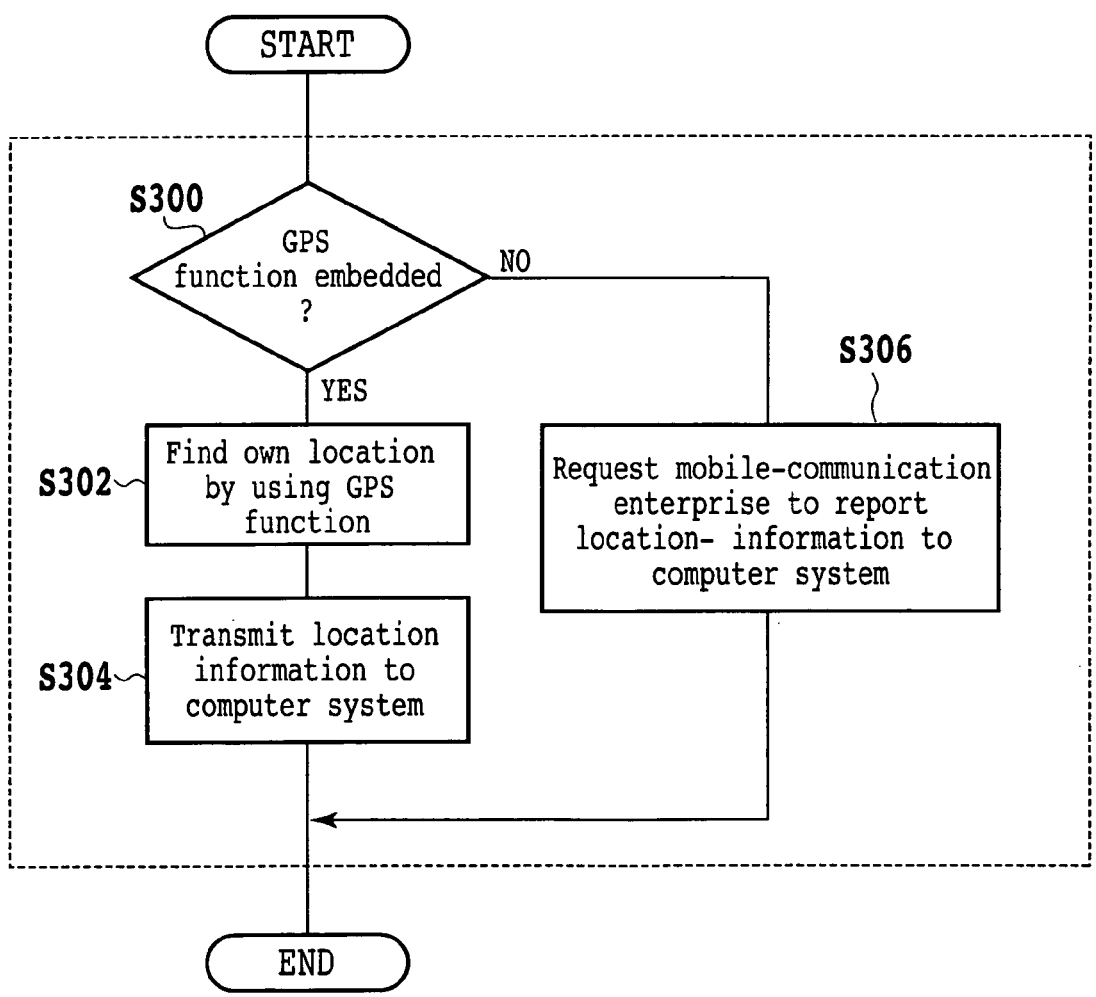
FIG. 18 shows a flowchart representing a process to report information on a location.
Figure 19:
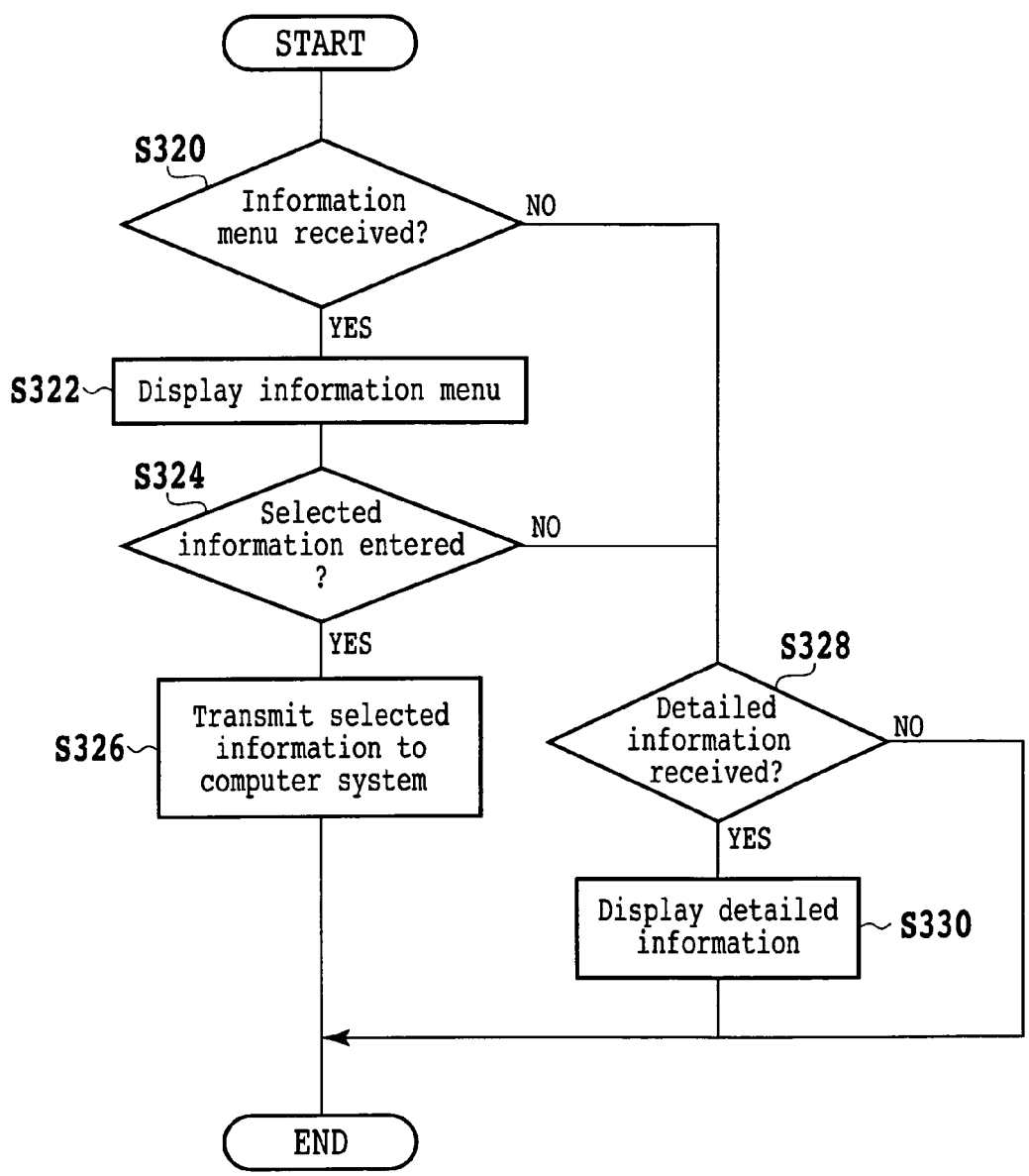
FIG. 19 shows a flowchart representing information-display execution processing.
Figure 20:
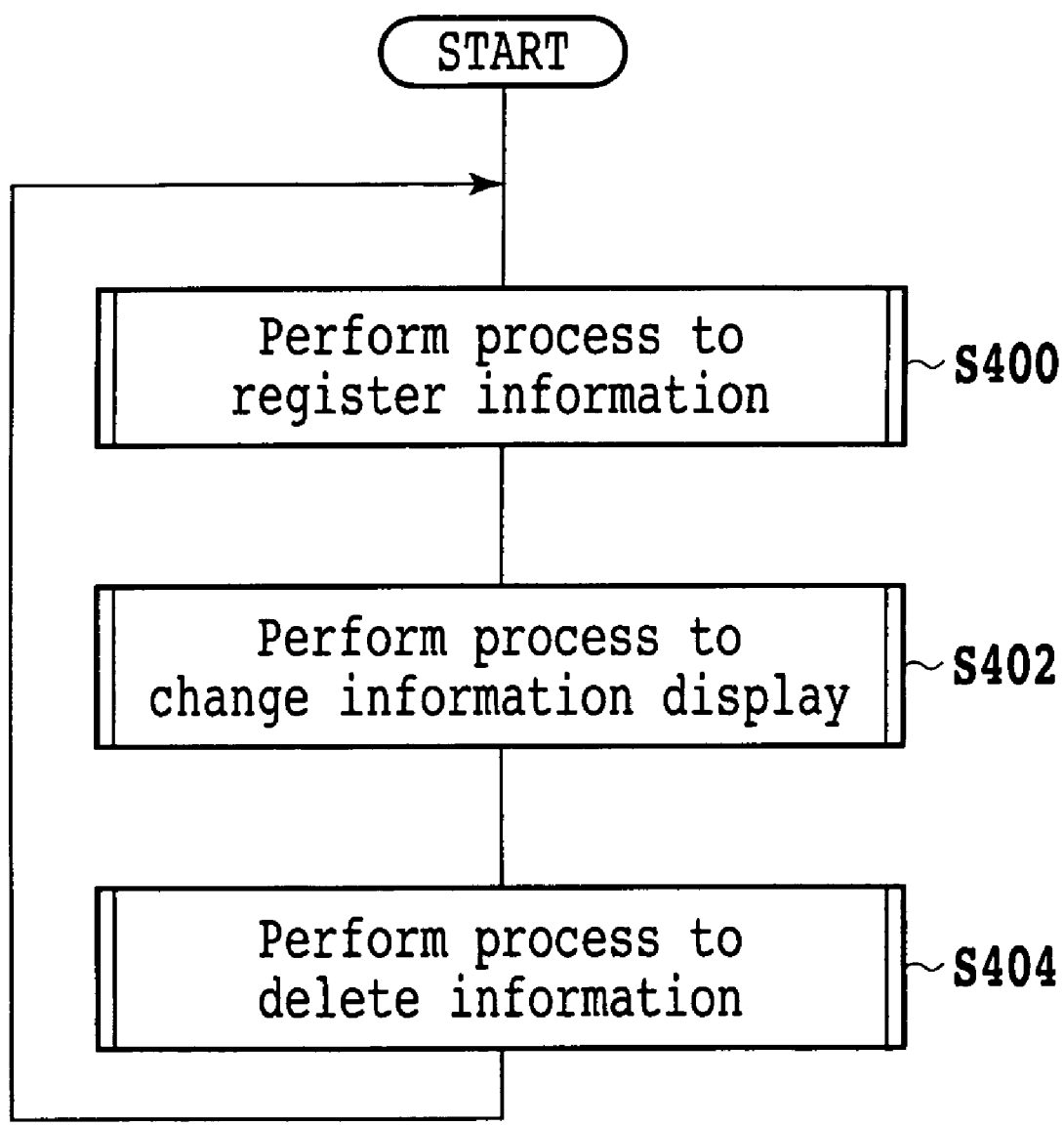
FIG. 20 shows a flowchart representing processing carried out by the information-provider terminal.
Figure 21:
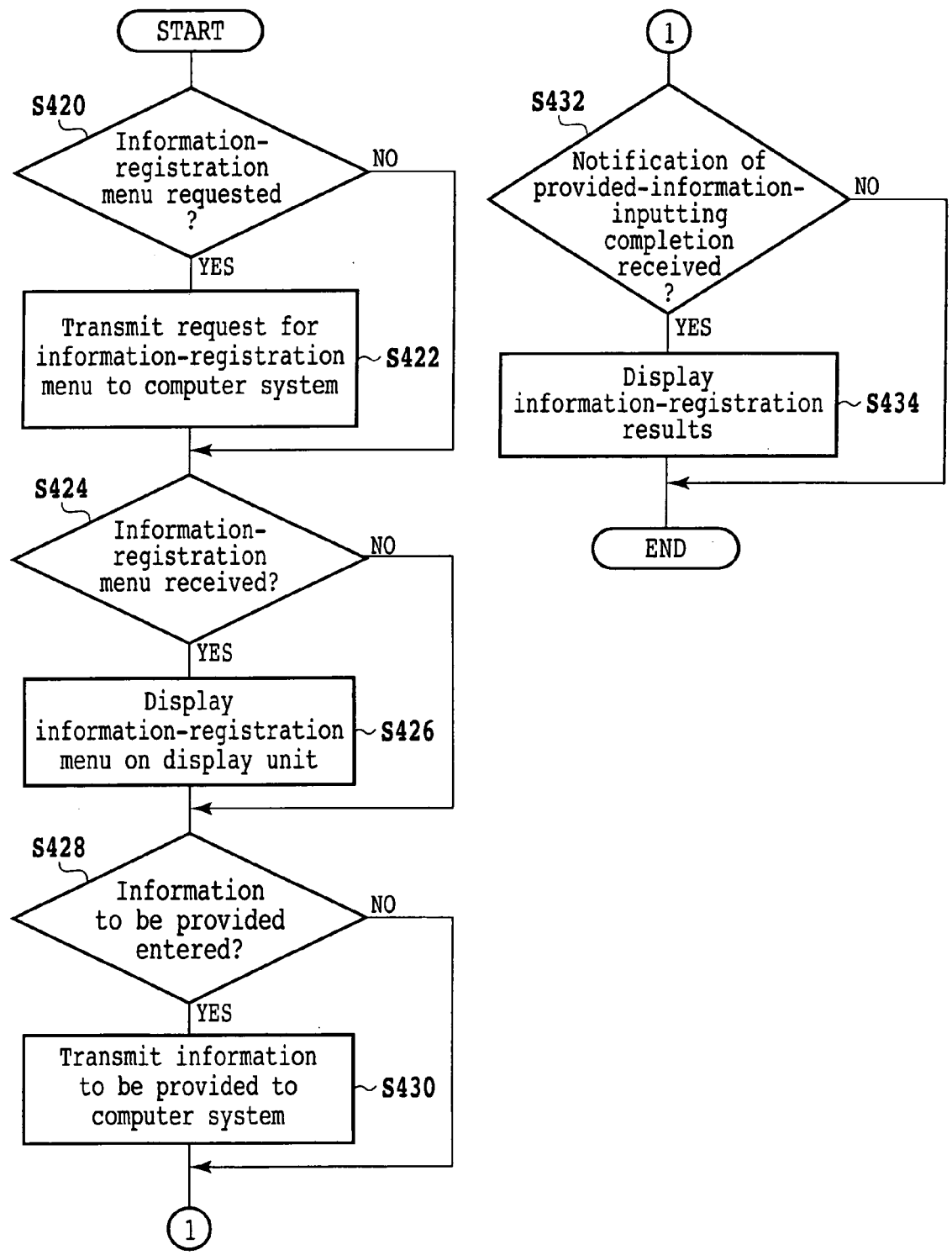
FIG. 21 shows a flowchart representing a process to register information.
Figure 22:
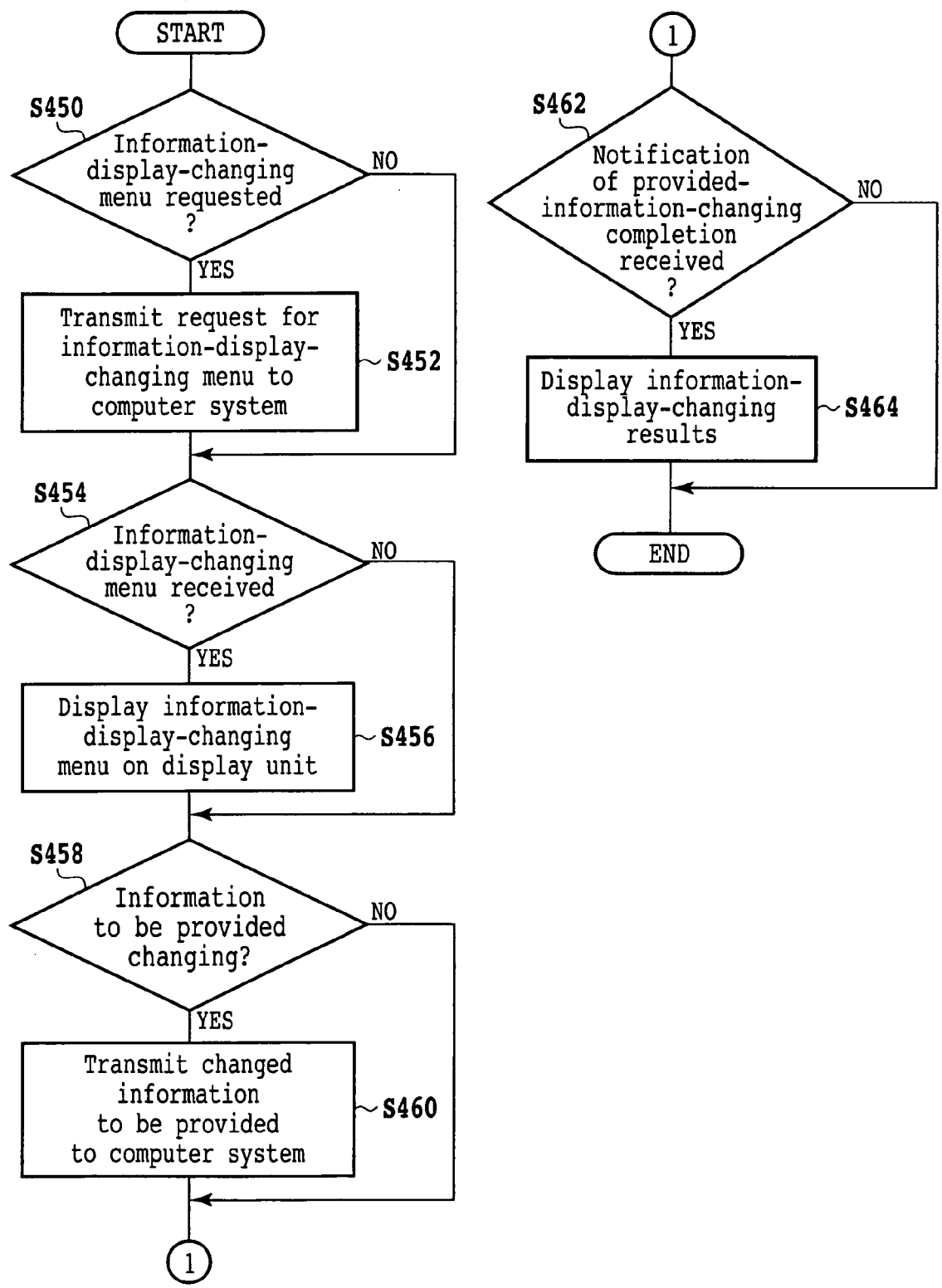
FIG. 22 shows a flowchart representing a process to change an information display.
Figure 23:
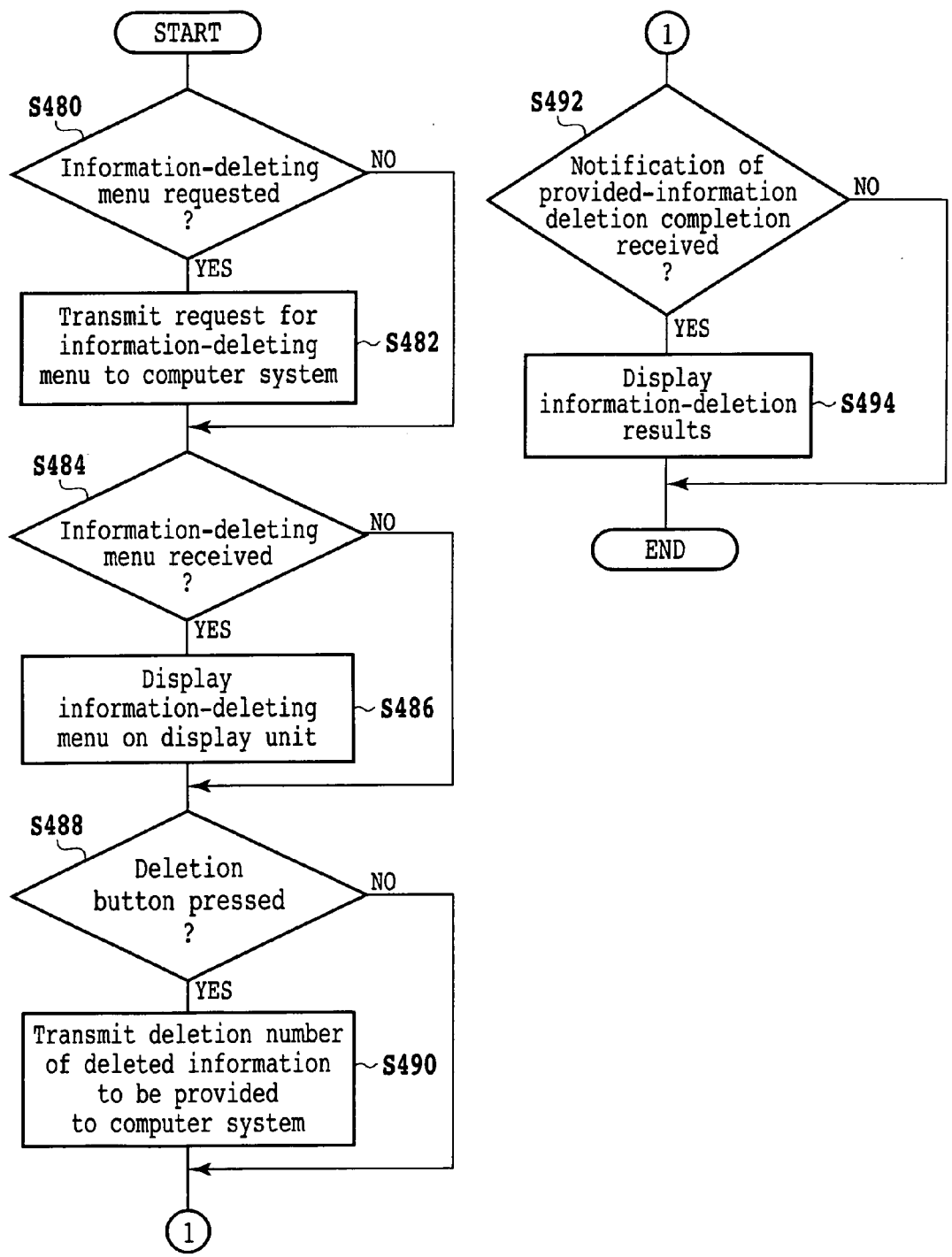
FIG. 23 shows a flowchart representing a process to delete information.

FIG. 11 shows a flowchart representing processing carried out by the computer system 2. FIG. 12 shows a flowchart representing user management processing. FIG. 13 shows a flowchart representing information management processing. FIG. 14 shows a flowchart representing location management processing. FIG. 15 shows a flowchart representing information-provider management processing. FIG. 16 shows a flowchart representing processing carried out by a user terminal. FIG. 17 shows a flowchart representing processing to register a user terminal. FIG. 18 shows a flowchart representing processing to report location information. FIG. 19 shows a flowchart representing information-display execution processing. FIG. 20 shows a flowchart representing processing carried out by the information-provider terminal. FIG. 21 shows a flowchart representing a process to register information. FIG. 22 shows a flowchart representing processing to change an information display. FIG. 23 shows a flowchart representing processing to delete information.

FIG. 24 is a diagram showing structures of data transmitted by the computer system to a user terminal. FIG. 25 is a diagram showing structures of data transmitted by a user terminal to the computer system. FIG. 26 is a diagram showing structures of data transmitted by the computer system to an information-provider terminal. FIG. 27 is a diagram showing structures of data transmitted by an information-provider terminal to the computer system.

Figure 28:
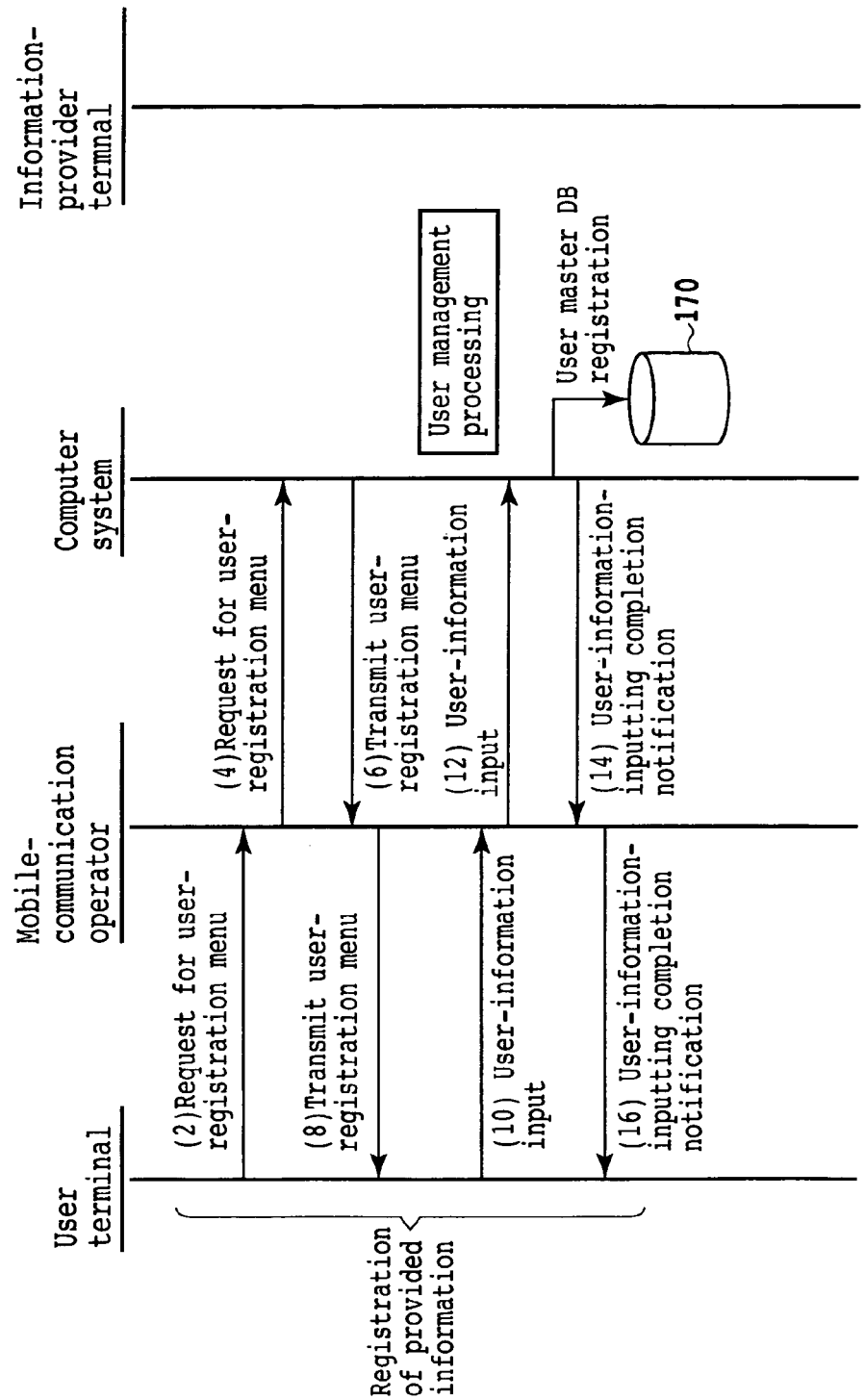
FIG. 28 is a diagram showing a basic sequence shown in a process to register user information.
Figure 29:
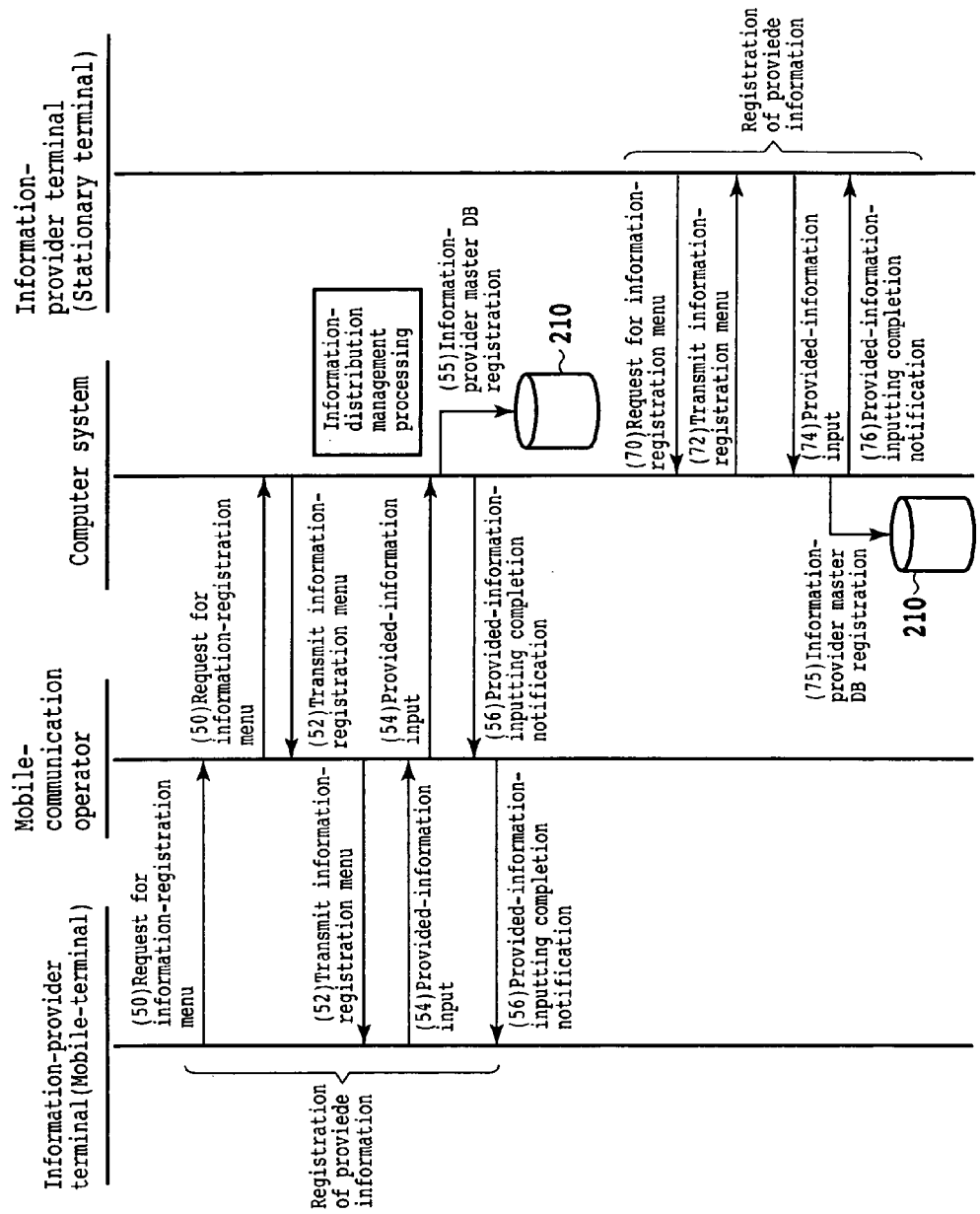
FIG. 29 is a diagram showing a basic sequence shown in a process to register provided information.
Figure 30:
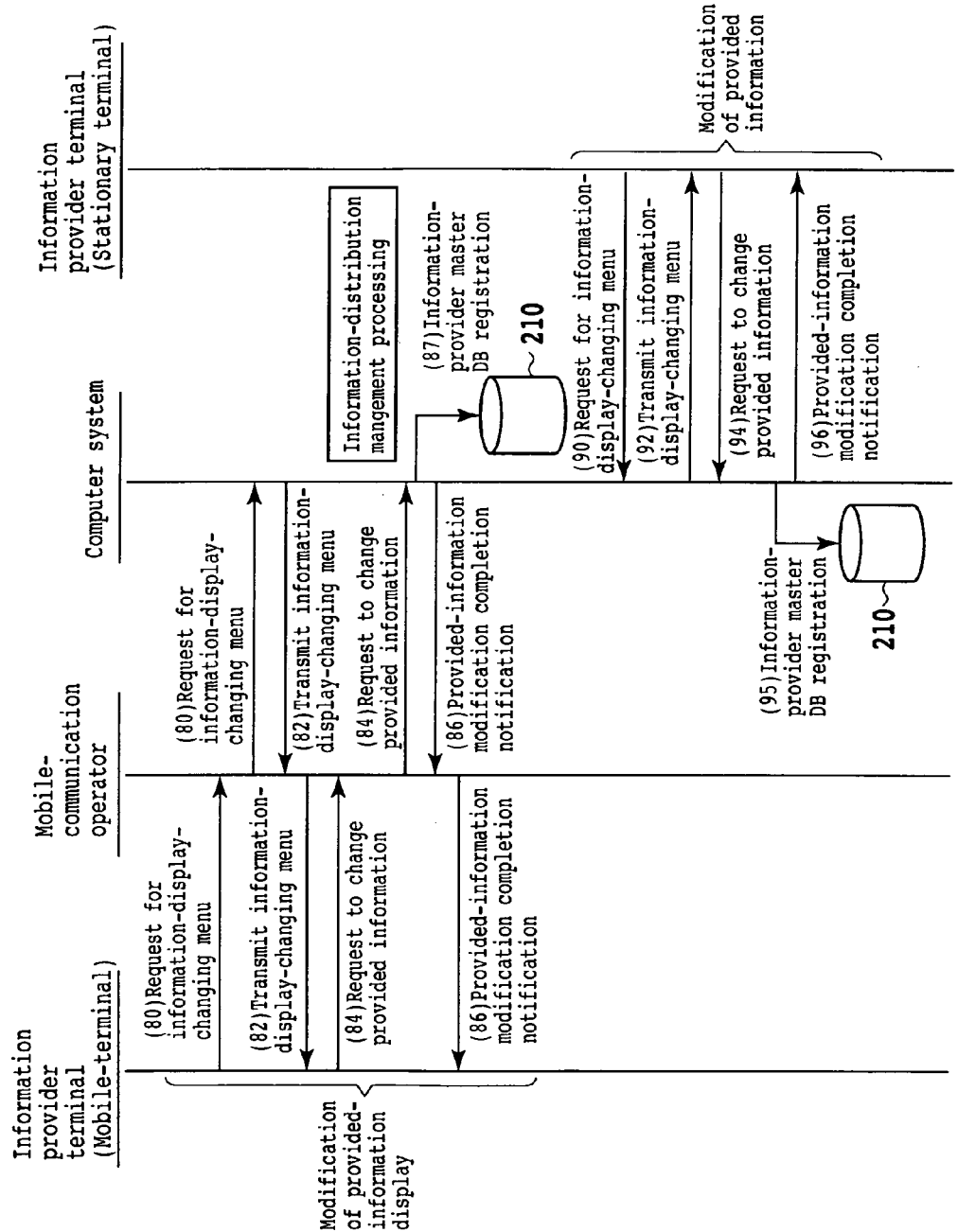
FIG. 30 is a diagram showing a basic sequence shown in a process to modify a display of provided information.
Figure 31:
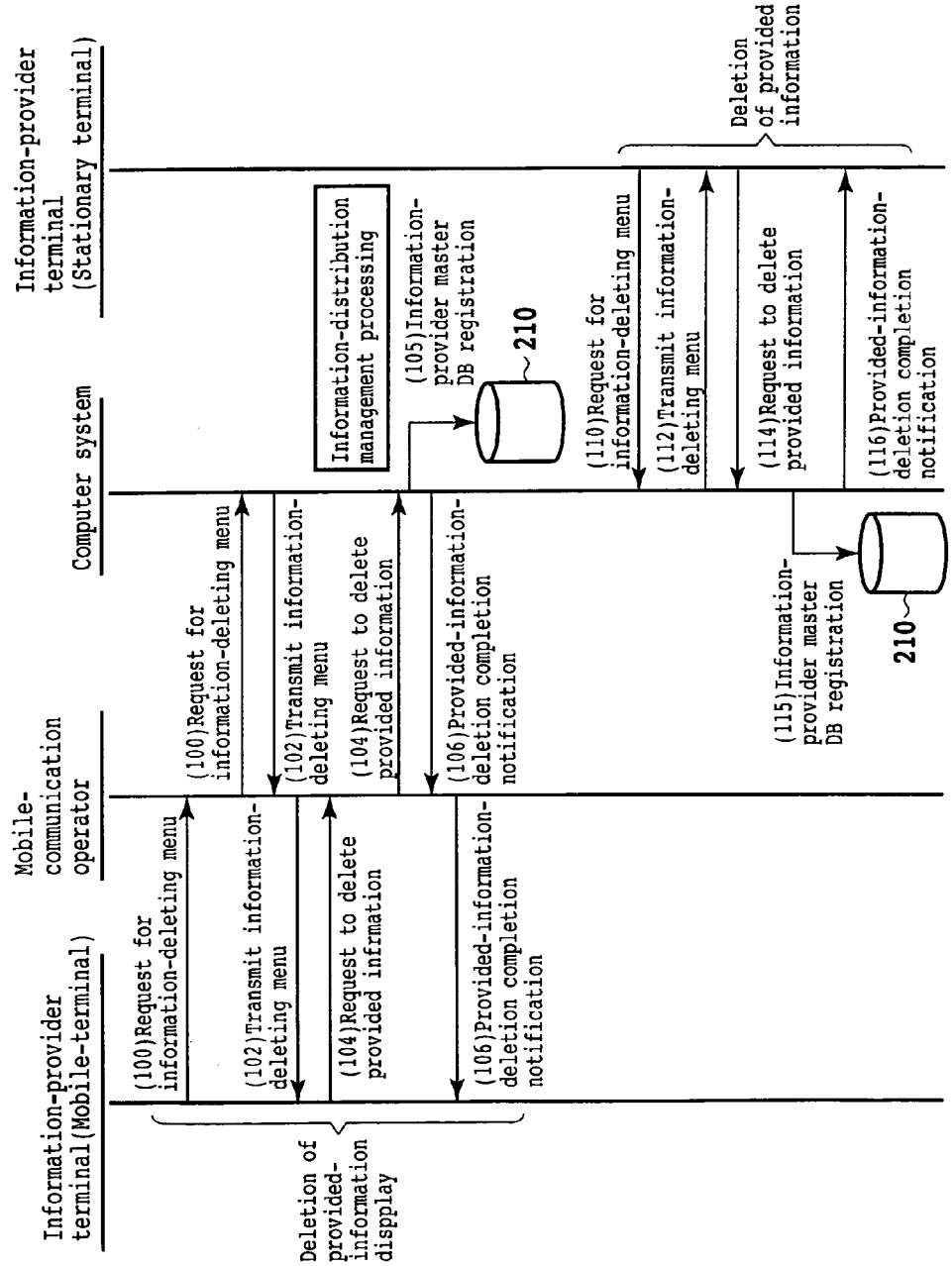
FIG. 31 is a diagram showing a basic sequence shown in a process to delete provided information.
Figure 32:
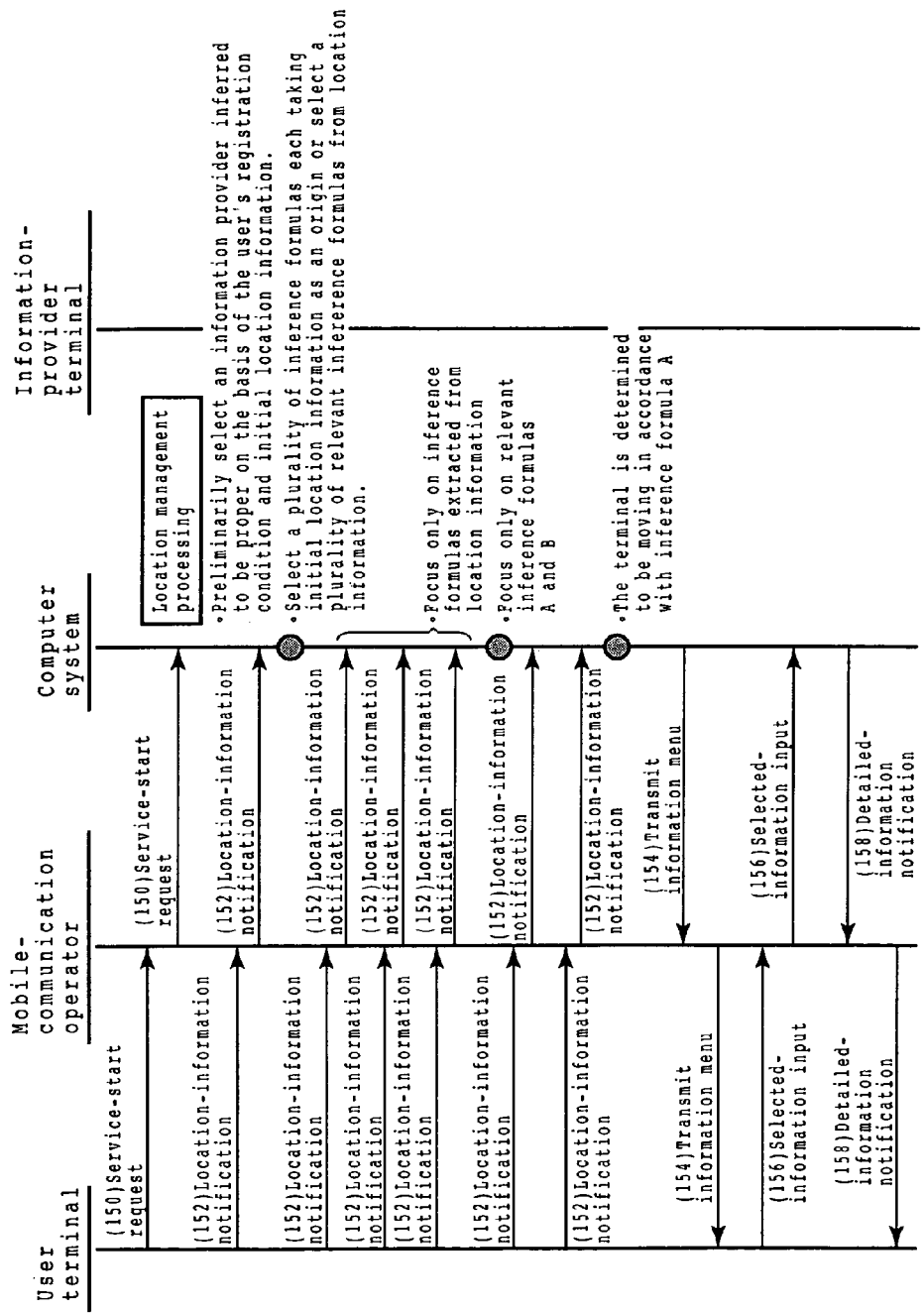
FIG. 32 is a diagram showing a basic sequence shown in an information-providing service for a user terminal functioning as a GPS terminal.
Figure 33:
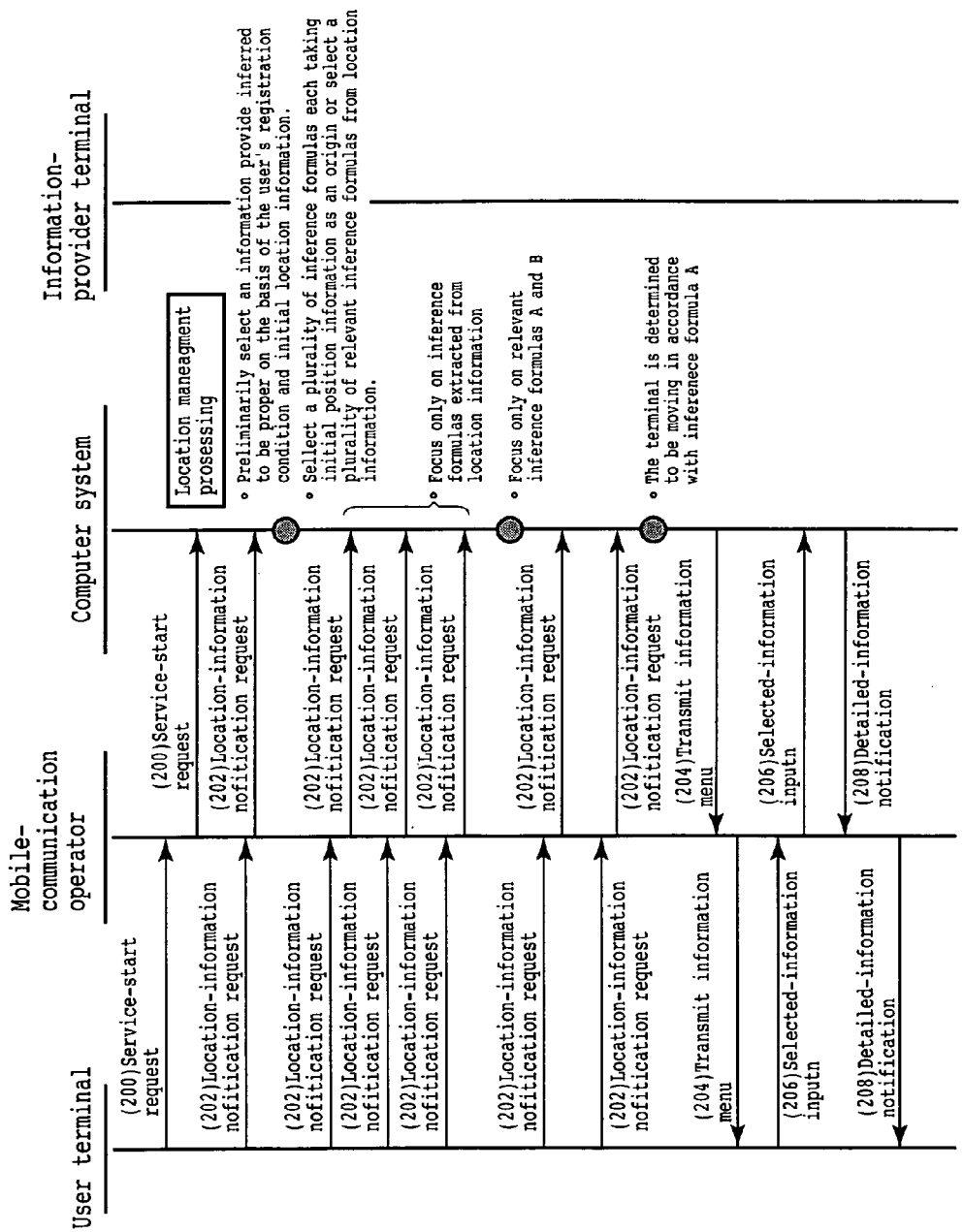
FIG. 33 is a diagram showing a basic sequence shown in an information-providing service for a user terminal functioning as a non-GPS terminal.

FIG. 28 is a diagram showing a basic sequence shown in processing to register user information. FIG. 29 is a diagram showing a basic sequence shown in processing to register provided information. FIG. 30 is a diagram showing a basic sequence shown in processing to modify a display of provided information. FIG. 31 is a diagram showing a basic sequence shown in processing to delete provided information. FIG. 32 is a diagram showing a basic sequence shown in an information-providing service for a user terminal functioning as a GPS terminal. FIG. 33 is a diagram showing a basic sequence shown in an information-providing service for a user terminal functioning as a non-GPS terminal.

Figure 35:
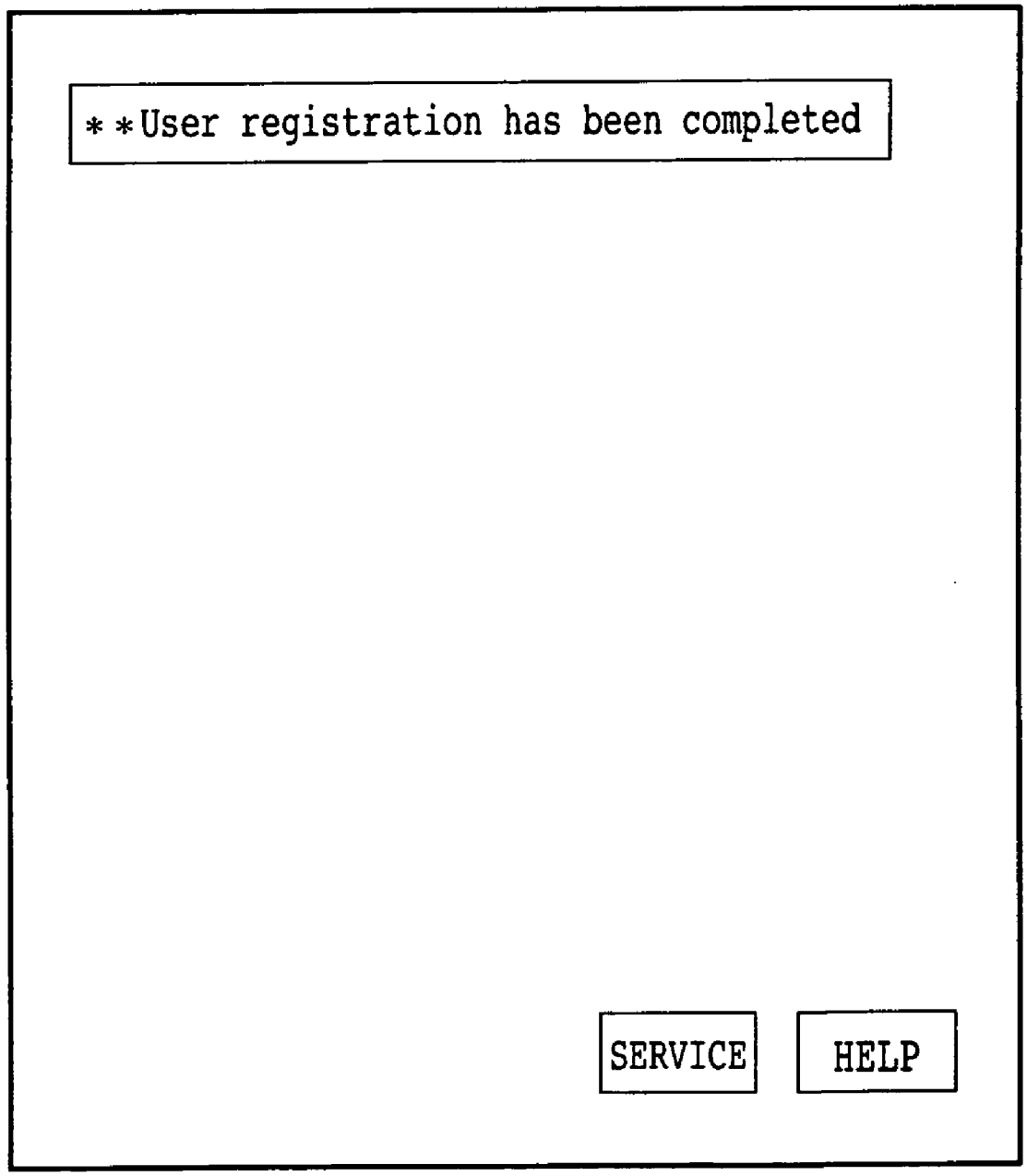
FIG. 35 is a diagram showing a user-registration completion screen of a user terminal.
Figure 36:
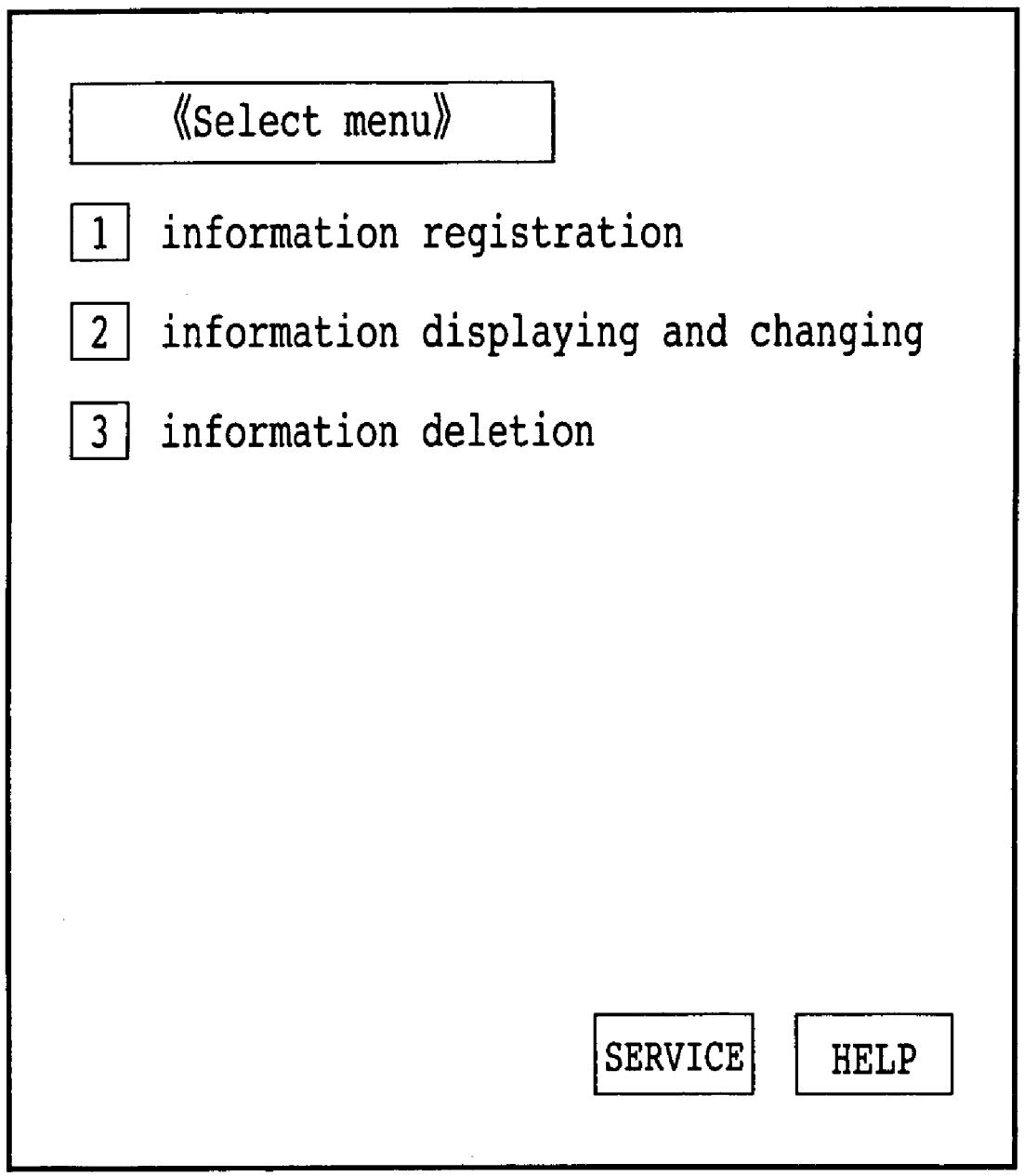
FIG. 36 is a diagram showing a selection menu screen for an information provider.
Figure 39:
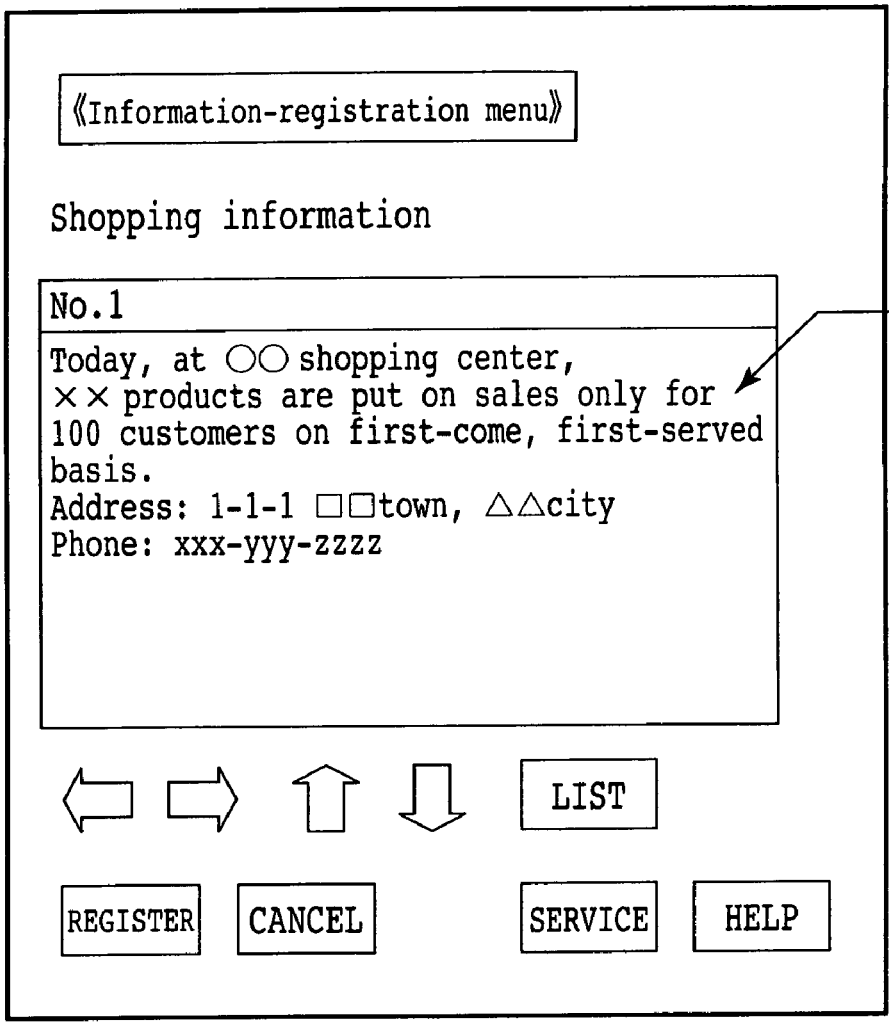
FIG. 39 is a diagram showing an information-registration screen for an information provider.
Figure 41:
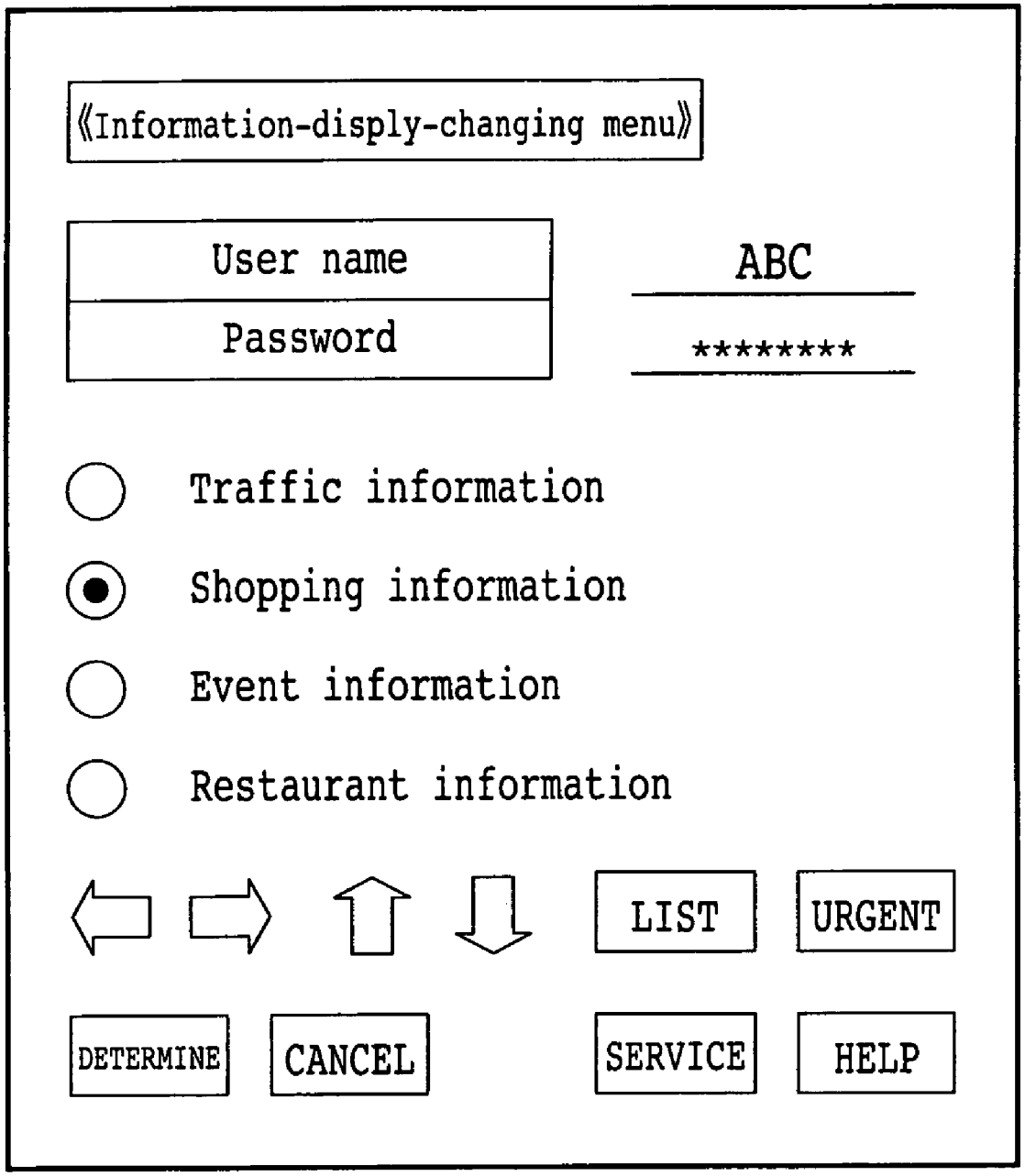
FIG. 41 is a diagram showing an information-display-changing screen (category selection) for an information provider.
Figure 44:
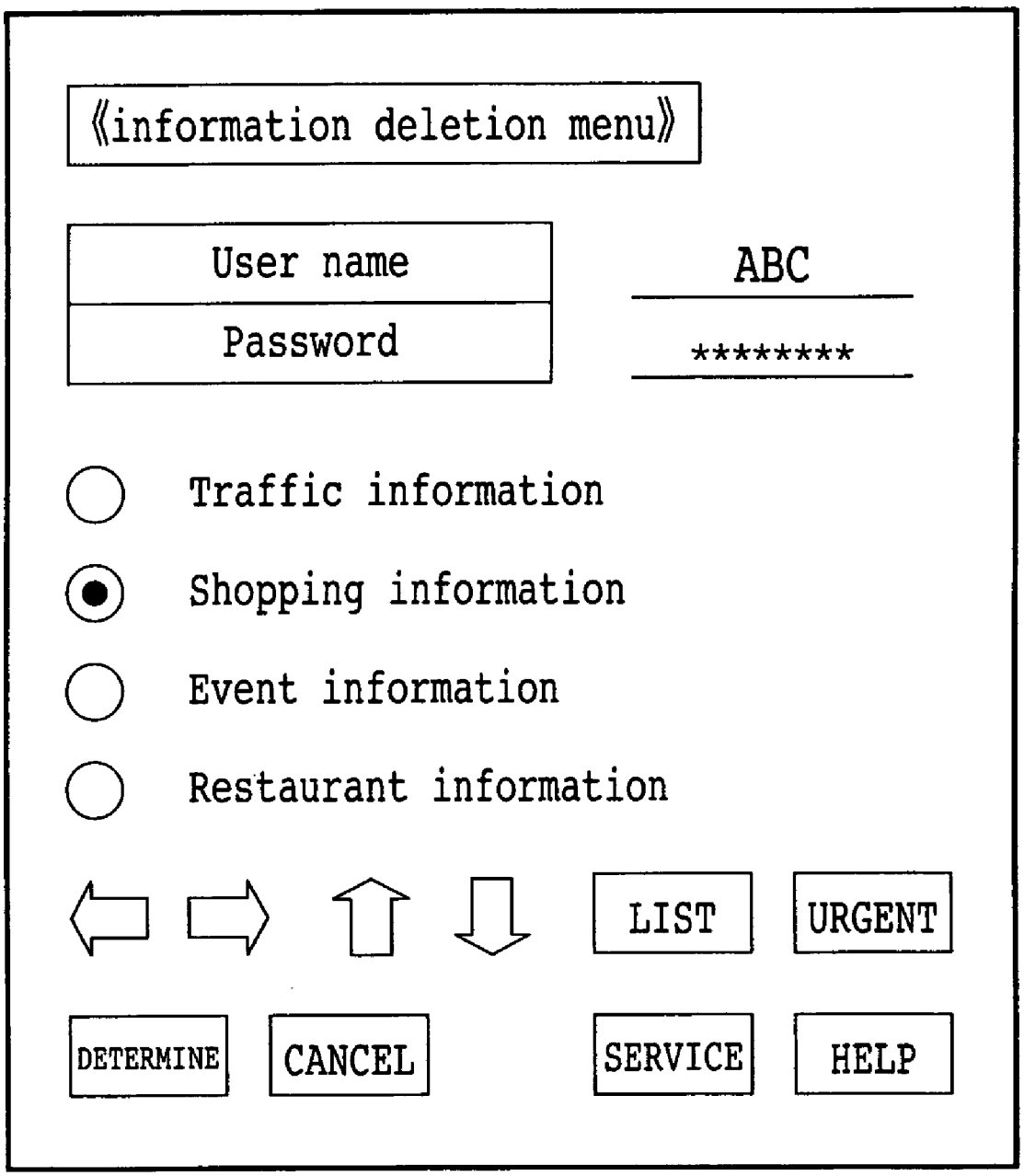
FIG. 44 is a diagram showing an information-deletion screen (category selection) for an information provider.
Figure 48:
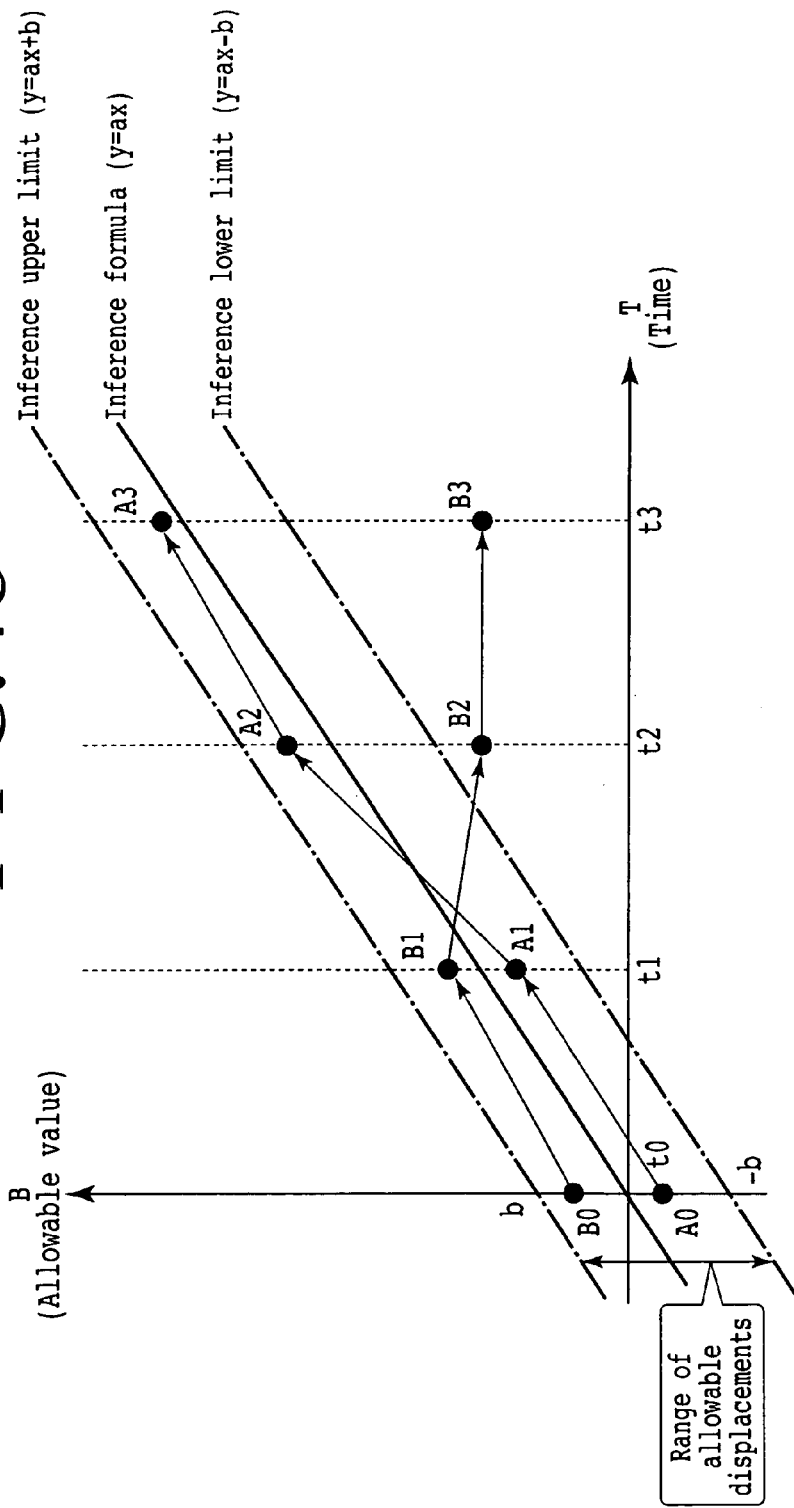
FIG. 48 is a diagram showing an inference mechanism.
Figure 49:
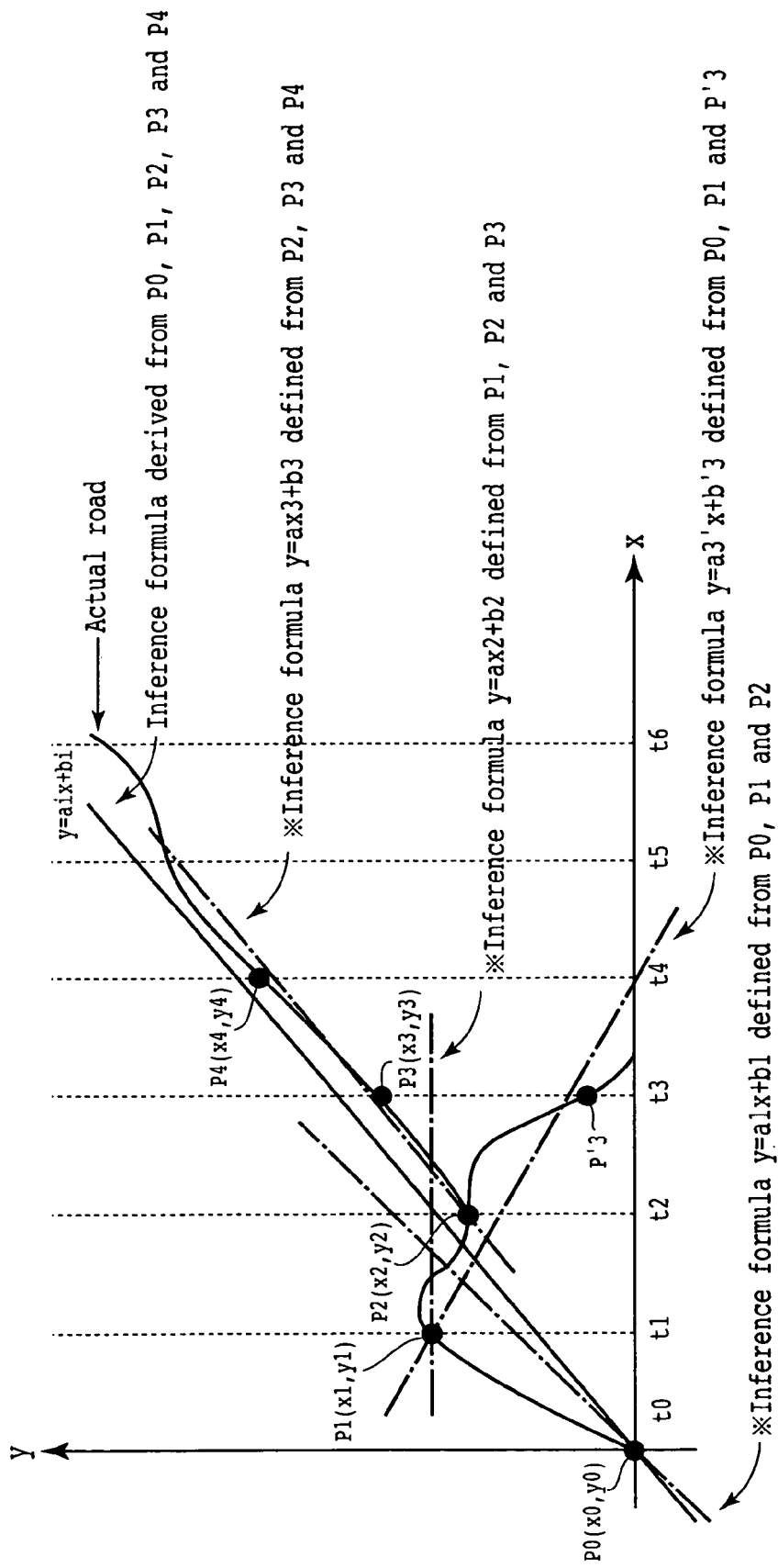
FIG. 49 is a diagram showing an inference mechanism for a curved road.
Figure 50:
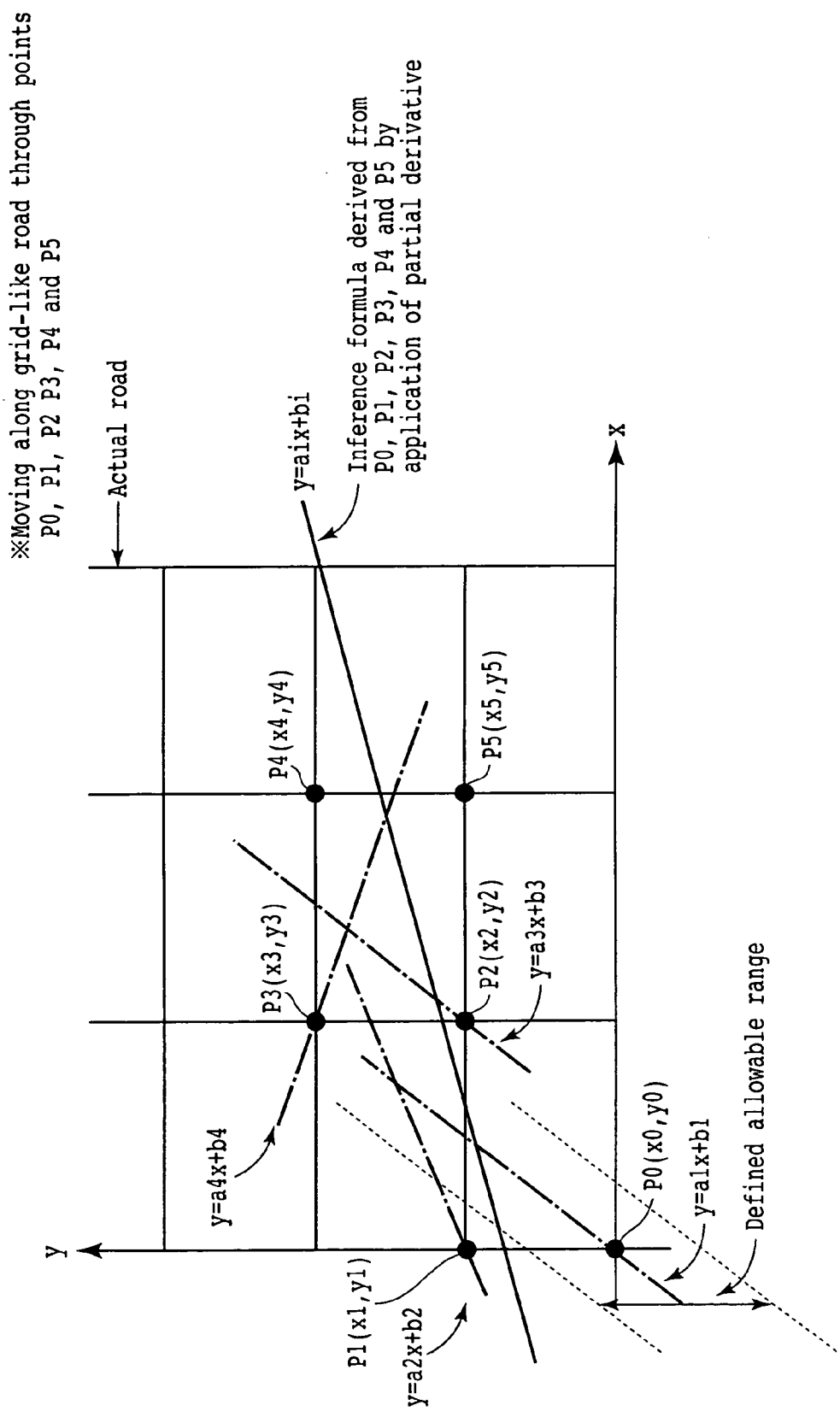
FIG. 50 is a diagram showing an inference mechanism for a grid-like road.

FIG. 34 is a diagram showing a user-registration screen of a user terminal. FIG. 35 is a diagram showing a user-registration completion screen of a user terminal. FIG. 36 is a diagram showing a selection menu screen for an information provider. FIG. 37 is a diagram showing an information-registration screen for an information provider. FIG. 38 is a diagram showing an information menu screen of a user terminal. FIG. 39 is a diagram showing an information-registration screen for an information provider. FIG. 40 is a diagram showing a user-registration completion screen for an information provider. FIG. 41 is a diagram showing an information-display-changing screen (category selection) for an information provider. FIG. 42 is a diagram showing an information-display-changing screen (displaying detailed information) for an information provider. FIG. 43 is a diagram showing an information-changing completion screen for an information provider. FIG. 44 is a diagram showing an information-deletion screen (category selection) for an information provider. FIGS. 45 and 46 are each a diagram showing an information-deletion screen (displaying detailed information deletion) for an information provider. FIG. 47 is a diagram showing an information-deletion completion screen for an information provider. FIGS. 48 to 50 are each a diagram showing an inference mechanism.

(1): Registration of User Information

At a step S200 of the flowchart shown in FIG. 16, the terminal-registration processing unit 90 carries out a process to register a user terminal as follows. The user makes a request for a user-registration menu by entering a special number or the like via a keyboard. At a step S250 of the flowchart shown in FIG. 17, the terminal-registration processing unit 90 forms a judgment as to whether or not a request for a user-registration menu has been received. If a request for a user-registration menu has been received, the flow of the processing goes on to a step S252. If a request for a user-registration menu has not been received, on the other hand, the flow of the processing goes on to a step S254. Since the user has made a request for a user-registration menu, in this case, the flow of the processing goes on to the step S252. At the step S252, the request for a user-registration menu is transmitted to the computer system 2 as indicated by an arrow (2) of the basis sequence shown in FIG. 28. As shown in FIG. 25(a), the request for a user-registration menu includes a request identification number and the IP address of the user terminal 6#i or the phone number of the user terminal 6#i.

At a step S2 of the flowchart shown in FIG. 11, the user management unit 20 carries out the following processing. The request for a user-registration menu is received by the user service reception processing unit 152 by way of the user-interface processing unit 150 shown in FIG. 5. At a step S20 of the flowchart shown in FIG. 12, the user-interface processing unit 150 forms a judgment as to whether or not the request for a user-registration menu has been received. If the request for a user-registration menu has been received, the flow of the processing goes on to a step S22. If the request for a user-registration menu has not been received, on the other hand, the flow of the processing goes on to a step S24.

Since the request for a user-registration menu has been received, in this case, the flow of the processing goes on to the step S22. At the step S22, the registration-menu output processing unit 156 shown in FIG. 5 transmits a user-registration menu to the user terminal 6#i by way of the user-interface processing unit 150 as indicated by an arrow (6) of the basic sequence shown in FIG. 28. As indicated by an arrow (8) of the basic sequence shown in FIG. 28, the user-registration menu is transmitted to the user terminal 6#i by way of a mobile-communication operator. As shown in FIG. 24(a), a packet of the user-registration menu includes an identification number, the IP address of the user terminal 6#i or the phone number of the user terminal 6#i and the user-registration menu itself. The IP address or the telephone number is included in a packet used for making a request for the user-registration menu.

At a step S254 of the flowchart shown in FIG. 17, the terminal-registration processing unit 90 forms a judgment as to whether or not a user-registration menu has been received. If a user-registration menu has been received, the flow of the processing goes on to a step S256. If a user-registration menu has not been received, on the other hand, the flow of the processing goes on to a step S258. At the step S256, the terminal-registration processing unit 90 displays the user-registration menu on the display unit 86. As shown in FIG. 34, the user-registration menu displays information on the user, categories of information to be provided to the user as desired by the user and a menu operation portion. The information on the user includes a user name and a password. The categories of information to be provided to the user as desired by the user include information on traffic, information on shopping, information on events and information on restaurants. The menu operation portion includes REGISTER, CANCEL, URGENT, LIST and HELP buttons. The URGENT button is operated to indicate that the desired information is needed now. The LIST button is operated to display detailed information for checking registered information. The HELP button is operated to display guidance information.

The user enters user-registration information including a user name, a password and an information category in accordance with a user-registration menu appearing on the display unit 86 and then presses the REGISTER button. At the step S258 of the flowchart shown in FIG. 17, a judgment is formed to determine whether or not the user-registration information has been entered. If the user-registration information has been entered, the flow of the processing goes on to a step S259. If the user-registration information has not been entered, on the other hand, the flow of the processing goes on to a step S260. Since the user-registration information has been entered, in this case, the flow of the processing goes on to the step S259. At the step S259, a user-information input packet shown in FIG. 25(b) is transmitted to the computer system 2 as indicated by an arrow (10) of the basic sequence shown in FIG. 28. The user-information input packet typically includes a request identification number, the IP address of the user terminal 6#i or the phone number of the user terminal 6#i, the password, the user name and the information category. As indicated by an arrow (12) of the basic sequence shown in FIG. 28, the user-information input packet is transmitted to the computer system 2 by way of the mobile-communication operator.

At the step S24 of the flowchart shown in FIG. 12, a judgment is formed to determine whether or not the user-registration information has been received. If the user-registration information has been received, the flow of the processing goes on to a step S26. If the user-registration information has not been received, on the other hand, the processing is ended. Since the user-registration information has been received, in this case, the flow of the processing goes on to the step S26. At the step S26, the registration-service analysis processing unit 154 shown in FIG. 5 forms a judgment as to whether or not the user is a new user. If the user is a new user, the flow of the processing goes on to a step S28. If the user is not a new user, on the other hand, the flow of the processing goes on to a step S30. The judgment as to whether or not the user is a new user is formed by finding out whether or not the same user name has been registered in the user master database 170 of the user-information database 26.

At the step S28 of the flowchart shown in FIG. 12, the user name, the password and the IP address or the phone number are registered in the user master database 170. The user name and the information category are registered in the user registration service category master database 172 for the category. At the step S30, the password included in the user-registration information is compared with a password already registered in the user-information database 26 to determine whether or not the password included in the user-registration information is valid. If the password included in the user-registration information is found valid, the flow of the processing goes on to a step S31 at which the modified user-registration information is registered in the user-information database 26. Then, the flow of the processing goes on to a step S32. If the password included in the user-registration information is found invalid, on the other hand, the flow of the processing goes on to a step S34.

At the step S32, a packet containing a user-information-inputting operation completion notification including an identification number, an IP address or a phone number and completion information as shown in FIG. 24(b) is transmitted to the user terminal 6#i as indicated by an arrow (14) of the basic sequence shown in FIG. 28. The notification of user-information-inputting operation completion is transmitted as indicated by an arrow (16) of the basic sequence shown in FIG. 28 to the user terminal 6#i by way of the mobile-communication operator. In the case of an invalid password, however, the user is requested to reenter a password at the step S34 of the flowchart shown in FIG. 12. At a step S260 of the flowchart shown in FIG. 17, a judgment is formed to determine whether or not a notification of user-information-inputting operation completion has been received. If a notification of user-information-inputting operation completion has been received, the flow of the processing goes on to a step S262. If a notification of user-information-inputting operation completion has not been received, on the other hand, the processing is finished. At the step S262, a user-registration result like the one show in FIG. 35 is displayed on the display unit 86.

(2): Information Registration

At a step S400 of the flowchart shown in FIG. 20, the information-registration processing unit 60 employed in the information-provider terminal 4#i carries out processing to register information as follows. The following description explains the processing to register information for a case in which the information-provider terminal is a mobile terminal. A selection menu shown in FIG. 36 is transmitted by the computer system 2 and displayed on a screen by the information-registration processing unit 60. The user is allowed to select one of operations to register, display, change and delete information. Assume that the user selects the operation to register information. At a step S420 of the flowchart shown in FIG. 21, the information-registration processing unit 60 forms a judgment as to whether or not a request for an information-registration menu has been made. If a request for an information-registration menu has been made, the flow of the processing goes on to a step S422. If a request for an information-registration menu has not been made, on the other hand, the flow of the processing goes on to a step S424. Since a request for an information-registration menu has been made, in this case, the flow of the processing goes on to the step S422. At the step S422, the request for an information-registration menu shown in FIG. 27(a) is transmitted to the computer system 2 as indicated by an arrow (50) of the basic sequence shown in FIG. 29.

At a step S4 of the flowchart shown in FIG. 11, the information management unit 24 carries out the following processing. At a step S150 of the flowchart shown in FIG. 13, a judgment is formed to determine whether or not a request for an information-registration menu has been made. If a request for an information-registration menu has been made, the flow of the processing goes on to a step S152. If a request for an information-registration menu has not been made, on the other hand, the flow of the processing goes on to a step S154. At the step S152, a packet of the information-registration menu is transmitted to the information-provider terminal 4#i by way of the mobile-communication operator as indicated by an arrow (52) of the basic sequence shown in FIG. 29. As shown in FIG. 26(a), the packet of the information-registration menu includes an identification number, an IP address of or a phone number and the information-registration menu itself.

At a step S424 of the flowchart shown in FIG. 21, a judgment is formed to determine whether or not an information-registration menu has been received. If an information-registration menu has been received, the flow of the processing goes on to a step S426. If an information-registration menu has not been received, on the other hand, the flow of the processing goes on to a step S428. At the step S426, the information-registration menu shown in FIG. 37 is displayed on the display unit 54. The screen of the information-registration menu is identical to the screen of the user-registration menu. If information on shopping is entered as a category of information provided by the information provider, for example, an information menu shown in FIG. 38 is displayed. If category information in the information menu is entered, a detailed-information input screen shown in FIG. 39 is displayed.

The information provider enters detailed information like one shown in FIG. 39. As the operation to enter the detailed information is completed, the information provider clicks a REGISTER button. At a step S428 of the flowchart shown in FIG. 12, a judgment is formed to determine whether or not information to be provided has been entered. If information to be provided has been entered, the flow of the processing goes on to a step S430. If information to be provided has not been entered, on the other hand, the flow of the processing goes on to a step S432. At the step S430, the information-registration processing unit 60 transmits inform to be provided to the computer system 2 as indicated by an arrow (54) of the basic sequence shown in FIG. 29. As shown in FIG. 27(b), the information to be provided includes a password, category information and detailed information.

The provided information is transferred to the information-provider registration reception processing unit 202 by way of the information-provider interface processing unit 200 shown in FIG. 6. At a step S154 of the flowchart shown in FIG. 13, the information-provider registration reception processing unit 202 forms a judgment as to whether or not the provided information has been received. If the provided information has been received, the flow of the processing goes on to a step S156. If the provided information has not been received, on the other hand, the processing is ended. At the step S156, the registration-information analysis processing unit 206 shown in FIG. 6 checks the provided information, registers the information on the information provider in the information-provider master database 210 as indicated by an arrow (55) of the basic sequence shown in FIG. 29 and registers the provided information of the information provider in the registration-information category master database 212 for the category of the provided information. At a step S158 of the flowchart shown in FIG. 13, a provided-information-inputting completion notification shown in FIG. 26(b) is reported to the information-provider terminal 4#i by way of the mobile-communication operator as indicated by an arrow (56) of the basic sequence shown in FIG. 29.

At a step S432 of the flowchart shown in FIG. 21, a judgment is formed to determine whether or not the provided-information-inputting completion notification has been received. If the provided-information-inputting completion notification has been received, the flow of the processing goes on to a step S434. If the provided-information-inputting completion notification has not been received, on the other hand, the processing is ended. At the step S434, an information-registration result shown in FIG. 40 is displayed. If the information provider is a fixed terminal, operations indicated by arrows (70) to (76) are carried out. It is to be noted that, if the information-provider terminal 4#i is a mobile terminal, information on the location of the information-provider terminal 4#i is transmitted to the computer system 2 by execution of the same procedure as a procedure of transmitting information on the location of a user terminal 6#i. The procedure of transmitting information on the location of a user terminal 6#i to the computer system 2 will be described later. The location management unit 22 updates the information on the location of the information-provider terminal 4#i with the most recent information received as such. The information on the location of the information-provider terminal 4#i is stored in the information-provider master database 210.

(3): Modification of Information Display

The information provider is capable of changing provided information. At a step S402 of the flowchart shown in FIG. 20, a process to change an information display is carried out. Detailed operations of the process to change an information display are carried out at steps S450 to S464 of the flowchart shown in FIG. 22. If the information provider is a mobile terminal, the following processing is carried out. As indicated by an arrow (80) of the basic sequence shown in FIG. 30, the information-provider terminal 4#i transmits an information-display-changing menu request shown in FIG. 27(f) to the computer system 2. As indicated by an arrow (82), the computer system 2 transmits an information-display-changing menu shown in FIG. 26(f) to the information-provider terminal 4#i. The information-provider terminal 4#i displays an information-display-changing menu screen shown in FIG. 41. The information provider changes details of the provided information as shown in FIG. 42. As indicated by an arrow (84) of the basic sequence shown in FIG. 30, the information-provider terminal 4#i transmits a provided-information-change request shown in FIG. 27(d) to the computer system 2. As indicated by an arrow (86), the computer system 2 transmits a provided-information-completion notification shown in FIG. 26(d) to the information-provider terminal 4#i. The information-provider terminal 4#i displays a provided-information-change completion notification screen shown in FIG. 43. As indicated by an arrow (87), the computer system 2 updates the provided information stored in the information-provider master database 210 with the changes in provided information.

If the information provider is a fixed terminal, on the other hand, operations indicated by arrows (90) to (95) are carried out.

(4): Deletion of Information

The information provider is capable of deleting provided information. At a step S404 of the flowchart shown in FIG. 20, a process to delete provided information is carried out. Detailed operations of the process to delete provided information are carried out at steps S480 to S494 of the flowchart shown in FIG. 23. The process to delete provided information is similar to the process to change provided information. If the information provider is a mobile terminal, operations indicated by arrows (100) to (106) of the basic sequence shown in FIG. 31 are carried out. If the information provider is a fixed terminal, on the other hand, operations indicated by arrows (110) to (116) are carried out. In the case of the process to delete provided information, an information deletion screen shown in FIG. 44, detailed-information-deletion screens shown in FIGS. 45 to 46 and an information deletion completion screen shown in FIG. 47 are displayed.

(5): Location Inference (a): Location Inference for a GPS Terminal

When the user operates the user terminal 6#i to specify a SERVICE button appearing on the screen shown in FIG. 34, as indicated by an arrow (150) of the basic sequence shown in FIG. 32, the user terminal 6#i transmits a service-start request shown in FIG. 25(f) to the computer system 2. The user terminal 6#i carries out a process to register a location at a step S202 of the flowchart shown in FIG. 16 as follows. At a step S300 of the flowchart shown in FIG. 18, a judgment is formed to determine whether or not a GPS function is embedded. If a GPS function is embedded, the flow of the processing goes on to a step S302. If a GPS function is not embedded, on the other hand, the flow of the processing goes on to a step S306.

At the step S302, the GPS-apparatus unit 100 shown in FIG. 4 measures its own location. Then, at the next step S304, a location information notification message shown in FIG. 25(c) is transmitted to the computer system 2 as indicated by an arrow (152) of the basic sequence shown in FIG. 32. The location information notification message includes a request identification number, an IP address or a phone number, location information comprising a latitude and a longitude and time information. The location information is supplied to the user-location information reception processing unit 160 by way of the user-interface processing unit 150 shown in FIG. 5. At a step S52 of the flowchart shown in FIG. 14, the user-location information reception processing unit 160 stores the location information in the user-location master database 180. The user-location information history management processing unit 162 reads out the location information from the user-location master database 180 and stores the information in the user-location information history database 182.

(b): Location Inference for Non-GPS Terminal

Much like a GPS terminal, a non-GPS terminal makes a request for a start of a service as indicated by an arrow (200) of the basic sequence shown in FIG. 33. In the case of a non-GPS terminal, however, location information is reported to the computer system 2 by requesting the mobile-communication operator to inform the computer system 2 of the location information at a step S306 of the flowchart shown in FIG. 18. As shown in FIG. 25(e), the location information includes a request identification number and an IP address or a phone number. The terminal's latitude and longitude included in the location information are passed on by the mobile-communication operator to the computer system 2.

At a step S54 of the flowchart shown in FIG. 14, a moving direction and a movement time are computed by inference as follows. The inference-formula generation processing unit 230 shown in FIG. 7 generates an inference formula from map information stored in the map-information master database 232 and stores the inference formula into the inference-formula master database 234. In the generation of the inference formula, the latitudes and the longitudes of a start point and an end point are quantized. The start point is regarded as an origin in a 2-dimensional space. Assume for example that the present location is in the vicinity of a station closest to a busy quarters. An inference formula predicting the user's movement from the present location serving as the start point of the movement is a formula stored in the inference-formula master database 234. If there are a plurality of candidates for the direction of the movement, a plurality of inference formulas should also have been stored in the inference-formula master database 234 as well. In addition, an inference formula is created in accordance with a plurality of pieces of map information with different reduced scales for each start point.

The inference formula is typically an equation expressing a relation between y and x with the start point taken as the origin (0, 0) where x and y are the coordinates of a measured position (x, y). In this case, the x-distance is the co-ordinates extending from the origin (0, 0) to the East direction whereas the y-distance is the co-ordinates extending from the origin (0, 0) to the North direction. An x coordinate of a location (x, y) is a distance from the origin (0, 0) to the location (x, y) along the x-distance whereas a y coordinate of a location (x, y) is a distance from the origin (0, 0) to the location (x, y) along the y-distance. In addition, the map information in use has a variety of scales ranging from a fine scale to a coarse one.

Assume for example that map information having a fine scale is used. In this case, an inference formula is provided for each branch point such as a point of intersection. If map information having a coarse scale is used, on the other hand, an inference formula is provided only for each big branch point such as a branch point on a trunk road as an inference formula expressing a rough direction. Map information having a relatively coarse scale is used for a high-speed movement of a car or a train. On the other hand, map information having a relatively fine scale is used for a low-speed movement such as a walk of a strolling user carrying a mobile terminal. In this way, the location of a mobile terminal can be inferred with a high degree of accuracy.

The user-present-location information determination processing unit 260 shown in FIG. 8 determines the next location of a user from the user-location information history database 182 and stores information on the location in the user present location database 280. The inference-formula-candidate extraction determination processing unit 262 extracts an inference formula or a plurality of inference formulas from the inference-formula master database 234 and user present location database 280, and stores the extracted inference formulas in the candidate inference-formula database 286. The extracted inference formulas are each a candidate inferred to be a candidate that will be probably used on the basis of information stored in the user present location database 280. A candidate inference formula is typically a formula, the origin of which coincides with the present location of the user, or a formula expressing points including one coinciding with the present location of the user. It is to be noted that, if a candidate inference formula is not found, an inference formula is derived from an inference algorithm to be described later.

The user-displacement-location history processing unit 264 shown in FIG. 8 computes a location displacement from the user's immediately preceding location to a next location on the basis of the user present location database 280 and stores the displacement in the user location displacement database 284. The inference-formula determination processing unit 266 finds information such as the polarity of a continuous location displacement representing changes in user location information from the location displacements stored in the user location displacement database 284. The inference-formula determination processing unit 266 then forms a judgment on validity of the candidate inference formula, determines a valid candidate inference formula and stores the determined candidate inference formula in the determined-inference-formula database 288. It is to be noted that, in order to determine an inference formula, at least 2 changes in location information are required.

In an inference mechanism shown in the diagram of FIG. 48, the abscissa represents the lapse of time (T) and the ordinate represents allowed values (B). Allowed values represent a range of allowed discrepancies relative to values given by an inference formula. That is to say, a pair of allowed values defines inference's allowable upper limit and allowable lower limit. The allowable upper limit is the upper limit of the range of allowed discrepancies and the allowable lower limit is the lower limit of the range of allowed discrepancies. If the displacement is between allowable upper limit and allowable lower limit of the inference formula, the movement of the user is inferred as a movement in a direction conforming to the inference formula.

To put it concretely, a judgment on the validity of a candidate inference formula is formed as follows. Assume for example that y=ax is a candidate inference formula, the allowable upper limit is expressed by y=ax+b where b>0 and the allowable lower limit is expressed by y=ax−b where b>0. That is to say, +b is the value of the allowable upper limit and −b is the value of the allowable lower limit. In this case, if a difference between the y-distance value given by the candidate inference formula and the y-distance value of the user at a time T is within the range of allowable values, the movement of the user can be inferred as a movement in a direction conforming to the inference formula. Since the inference formula is a quadratic function expressing a relation between the location of a mobile information terminal and the time, the movement speed of the user can also be found with ease.

Assume for example that the user is at locations A0, A1 and A2 at times t0, t1 and t2 respectively. In this case, since the displacements are between allowable upper limit and allowable lower limit of the inference when the user moves from A0→A1→A2, the movement of the user can be inferred as a movement in a direction conforming to the inference formula. As another example, assume that the user is at locations B0, B1, B2 and B3 at times t0, t1, t2 and t3 respectively. In this case, since the displacements are beyond allowable range between the upper limit and the lower limit of the inference when the user moves along a route of B0→B1→B2→B3, the movement of the user cannot be judged to be a movement in a direction conforming to the inference formula. It is to be noted that the user can be inferred to be in a stationary state between in a period between times t2 and t3 since there is no displacement between the locations B2 and B3.

The above description explains an inference mechanism for a case in which a proper inference formula is not stored in the inference-formula master database 234. In order to apply inference appropriate for a circular road or a winding road, a larger number of inference formulas is required. In the inference mechanism shown in FIG. 48, the inference formula is assumed to be a linear equation. In general, however, an ordinary road is a winding road respectively, and has a plurality of points of intersection in some cases. In such a case, it is difficult to find an inference formula in advance. In order to solve this problem, an inference formula is set from locations of the user by using a general inference mechanism shown in FIG. 49. For each of locations Pi located at equal time intervals, location information is reported and recorded.

(i): An inference formula y=a1x+b1 is defined on the basis of positions P0, P1 and P2 at times t0, t1 and t2 respectively. In accordance with a concept taken as a basis for finding the coefficients a1 and b1 of the inference formula y=a1x+b1, the point P0 (0, 0) is taken as a start point and from P1(x1,y1),P2(x2,y2) the inference formula is regarded as an equation representing a linear line passing through the point P0 (0, 0) as well as the middle point ((x1+x2)/2, (y1+y2)/2)) between the points P1 and P2.

(ii): Next, a next inference formula y=a2x+b2 is defined on the basis of positions P1, P2 and P3 at times t1, t2 and t3 respectively in the same way by taking the point P1 as a start point this time. That is to say, by the same token, the coefficients a2 and b2 of the inference formula y=a2x+b2 are found by regarding the inference formula as an equation representing a linear line passing through the point P1 as well as the middle point between the points P2 and P3.

(iii): Subsequently, while shifting the third point Pi, a subsequent inference formula y=aix+bi is defined on the basis of locations $P_{i+1}$, $P_i$ and $P_{i-1}$ where $P_{i+1}$ is the most recent location, $P_i$ is a location preceding the most recent location $P_{i+1}$ and $P_{i-1}$ is a location preceding the point $P_i$.

By defining inference formulas on the basis of information on points being shifted, that is, information obtained from a mobile information terminal as described above, it is possible to predict a location displacement of the mobile information terminal moving through any points on a road or a route.

The inference mechanism shown in FIG. 50 is a mechanism for defining an inference formula by application of a partial derivative. As an example, the figure shows a case in which a road has a grid-like shape. As shown in FIG. 50, inference formulas y=a1x+b1, y=a2x+b2, y=a3x+b3 and y=a4x+b4 are defined in the same way as the inference mechanism shown in FIG. 49.

(i): An inference formula y=anx+bn is defined from $P_{n-1}$, $P_n$ and $P_{n+1}$ where $P_{n+1}$ is the most recent location.

(ii): If there is a drastic variation in "an" value where "an" is the inclination of the defined inference formula, that is, if the inclination of an inference formula defined at a point of time is negative (an<0) while the inclination of an inference formula defined at the following point of time is positive ($a_{n+1}$>0), for example, it is possible to conceive a model wherein the mobile information terminal is moving from location to location along a grid-like road like one shown in FIG. 50. In such a case, by defining an inference formula for each location displacement and, at the same time, by defining the found inference formula by application of a partial derivative and on the basis of all location information stored in the past, it is possible to show the polarity (or the trend) of the location displacements of the mobile information terminal. In the case of the inference mechanism shown in FIG. 50, the inference formula y=aix+bi shows the polarity (or the trend) of the location displacements of the mobile information terminal. It is thus possible to show the polarity (or the trend) of the location displacements by defining an inference formula for each location displacement and, at the same time, by defining the inference formula through application of a partial derivative and on the basis of all past location displacements. By using such means, it is possible to infer that a movement is a movement along a winding road or a grid-like road.

The user-displacement adequacy check processing unit 300 shown in FIG. 9 forms a judgment as to whether or not the user's location displacement stored in the user location displacement database 284 is a displacement based on an inference formula stored in the determined-inference-formula database 288. If the location displacement is not based on an inference formula, the inference-formula-candidate extraction determination processing unit 262 employed in an inference-formula determination processing management unit 250 shown in FIG. 8 is requested to extract a new inference formula for the user. As requested, the inference-formula-candidate extraction determination processing unit 262 extracts a new inference formula and stores the formula in the candidate inference-formula database 286.

Assume for example that inference formulas A and B have been determined. Inference formula A takes a relatively coarse map with a large scale factor as a reference whereas inference formula B takes a relatively fine map with a small scale factor as a reference. In this case, if the user carrying the mobile information terminal is moving at a high speed, it is generally assumed that there is a case in which the location displacement of the user comes off inference formula B used for predicting a location displacement of the user. In this case, an inference formula taking a coarse map with a large scale factor as a reference is determined to be an inference formula for predicting a location displacement of the user.

If the user carrying the mobile information terminal is moving at a low speed, on the other hand, an inference formula taking a fine map with a small scale factor as a reference is determined to be an inference formula for predicting a location displacement of the user. The inference-formula determination processing unit 266 shown in FIG. 8 selects an inference formula among candidates for the inference formula, which are read out from the user location displacement database 284, and stores the selected inference formula in the determined-inference-formula database 288. The validity of this new inference formula is again checked by the user-displacement adequacy check processing unit 300. As described above, the direction of the movement of the user and the movement time are inferred.

(6): Determination of Information on an Information Provider

At a step S56 of the flowchart shown in FIG. 14, the area-information database 32 (the map-information master database 232) and the information-provider database 30 (the information-provider master database 210 and the registration-information category master database 212) are searched for information corresponding to the moving direction and the movement time. The information-provider-location determination processing unit 270 shown in FIG. 8 finds locations of the information provider from the map-information master database 232 and the information-provider master database 210, and stores information on the locations of the information provider in the information-provider location database 290.

The information-provider-candidate extraction determination processing unit 272 extracts information providers on the basis of the user's present location stored in the user present location database 280 and on the basis of an information category desired by the user, locations of information providers and categories of information provided by the information providers, and stores the extracted information providers in the candidate information-provider database 292. The information-provider determination processing unit 274 shown in FIG. 8 determines an information provider in an area surrounding the mobile information terminal's location predicted by an inference formula stored in the determined-inference-formula database 288 among those stored in the candidate information-provider database 292 and stores the determined information provider in the information-provider database 294. A method for determining such an information provider comprises the steps of:

(i): Regarding the inference formula as an equation representing a regression straight line.

(ii): Finding distances (residuals) to the location of each information provider existing in the vicinity of the mobile information terminal's moving destination predicted to be in an allowable range determined for the inference formula by adoption of the least-square method.

(iii): Determining that an information provider is located at the mobile information terminal's moving destination predicted by the reference formula if the residual found by adoption of the least-square method for the information provider is in a range determined for the inference formula.

The distribution-order determination processing unit 302 shown in FIG. 9 determines a distribution priority order of selected information providers and stores the distribution priority order in the distribution information-provider database 312. The distribution priority order is determined on the basis of typically contracts made with the information providers.

(7): Information Display Execution Processing

At a step S58 of the flowchart shown in FIG. 14, the Information-distribution execution processing unit 306 employed in the user management unit 20 and shown in FIG. 9 edits an information menu on the basis of an information category read out from the user-information database 26 (the user registration service category master database 172). Then, at the next step S60, an information menu shown in FIG. 24(*c*) is transmitted as indicated by an arrow (154) of the basic sequence shown in FIG. 32 and an arrow (204) shown in FIG. 33. At a step S320 of the flowchart shown in FIG. 19, the information display execution processing unit 92 shown in FIG. 4 forms a judgment as to whether or not the information menu has been received. If the information menu has been received, the flow of the processing goes on to a step S322. If the information menu has not been received, on the other hand, the flow of the processing goes on to a step S328. At the step S322, the information menu is displayed. The information menu typically includes categories registration by the user. Examples of the categories are information on traffic, information on trains and buses, information on shopping, information on events and information on excursions. Then, at the next step S324, a judgment is formed to determine whether or not selected information has been received. If the selected information has been received, the flow of the processing goes on to a step S326. If the selected information has not been received, on the other hand, the flow of the processing goes on to a step S328. At the step S326, the selected information shown in FIG. 25(*d*) is transmitted to the computer system 2 as indicated by an arrow (156) of the basic sequence shown in FIG. 32 and an arrow (206) of the basic sequence shown in FIG. 33.

At a step S100 of the flowchart shown in FIG. 15, the user service reception processing unit 152 shown in FIG. 5 forms a judgment as to whether or not the selected information has been received from the user-interface processing unit 150. If the selected information has been received, the flow of the processing goes on to a step S102. If the selected information has not been received, on the other hand, the processing is ended. At the step S102, detailed information corresponding to the selected information is extracted from the distribution target information-provider database 312 on the basis of the user's inferred location stored in the target-user database 310.

To be more specific, if the selected information is information on traffic, the detailed information is information on traffic jams for a direction in which the user is moving forward. If the selected information is information on trains and buses, the detailed information includes information on arrival times of a vehicle, on which the user is riding, and information on places for changing trains or buses on which the user is riding. If the selected information is information on resort, the detailed information includes information on parking lots, information on seaside cottage and information on restaurants in a specific area on the way for a direction in which the user is moving forward. At a step S104 of the flowchart shown in FIG. 15, the detailed information shown in FIG. 24(*d*) is transmitted to the user terminal 6#*i* by way of the information-distribution execution processing unit 306 and the user-interface processing unit 150, which are shown in FIG. 9, as indicated by an arrow (158) of the basic sequence shown in FIG. 32 and an arrow (208) of the basic sequence shown in FIG. 33. Then, at the next step S106 of the flowchart shown in FIG. 15, the selected category information, the distribution time and the number of users to which the detailed information is distributed are recorded in the distribution log database 314.

At a step S328 of the flowchart shown in FIG. 19, a judgment is formed to determine whether or not the detailed information has been received. If the detailed information has been received, the flow of the processing goes on to a step S330. If the detailed information has not been received, on the other hand, the processing is ended. At the step S330, the detailed information is displayed. To be more specific, if the selected information is information on traffic, what is displayed as the detailed information is information on traffic jams for a direction in which the user is moving forward. If the selected information is information on trains and buses, what are displayed as the detailed information include information on arrival times of a vehicle, on which the user is riding, and information on places for changing a train or a bus on which the user is riding. If the selected information is information on resort, what are displayed as the detailed information include information on parking lots, information on seaside house and information on restaurants in a specific area on the way for a direction in which the user is moving forward. As an alternative, what are displayed as the detailed information include information on buying at a bargain at a department store or the like existing on the way for a direction in which the user is moving forward, information on by the hour bargains at such a department store and information on bargain coupons issued by such a department store.

If the user further selects a specific item among items of the detailed information, the selected item is transmitted from the user terminal 6#*i* to the computer system 2 and received by the computer system 2. Assume for example that a coupon item is selected from the detailed information. In this case, detailed information corresponding to the coupon item is retrieved from the target distribution information-provider database 312 and transmitted to the user terminal 6#*i* by way of the information-distribution execution processing unit 306 and the user-interface processing unit 150. Typically, the transmitted detailed information is information on coupons.

At a step S8 of the flowchart shown in FIG. 11, the information-distribution management unit 25 carries out the following processing. At a step S106 of the flowchart shown in FIG. 15, the following processing is carried out. The distributed-information user-response reception processing unit 350 saves the user's response to distributed information such as a selected coupon item in the user response result master database 378. The user analysis processing unit 352 shown in FIG. 10 analyzes the user's favorites stored in the target-user database 310 and records a result of the analysis in the user analysis log database 380. The information-provider analysis processing unit 354 analyzes information providers stored in the user response result master database 378 and the distribution target information-provider database 312, being related to the favorites of the user, and records a result of the analysis in the information-provider analysis log database 382.

At a step S108 of the flowchart shown in FIG. 15, the following processing is carried out. The response-attribute analysis processing unit 356 analyzes attributes stored in the user response result master database 378 and the distribution log database 314, and records a result of the analysis in the response-attribute analysis log database 384. The analyzed attributes include the length of time to the user's response to distributed information and next location information that gets a response. The analysis-result edit processing unit 358 finds favorites for improving the effects of notification using priority levels of an information-providing menu and the contents of provided information, and stores a result of the analysis in the analysis result database 386. The priority levels of an information-providing menu and the contents of provided information are stored in the user analysis log database 380, the information-provider analysis log database 382 and the response-attribute analysis log database 384.

The analysis-result-report-writing processing unit 362 creates a report 388 from data stored in the analysis result database 386. At a step S110, on the basis of the report 388, a result of the favorite calculation is reflected in the user information. The analysis-result communication processing unit 360 transmits an analysis result stored in the analysis result database 386 to the information-provider terminal 4#i by way of the information-provider interface processing unit 200.

(8): User's Request for Urgent Providing of Information

Figure 51:
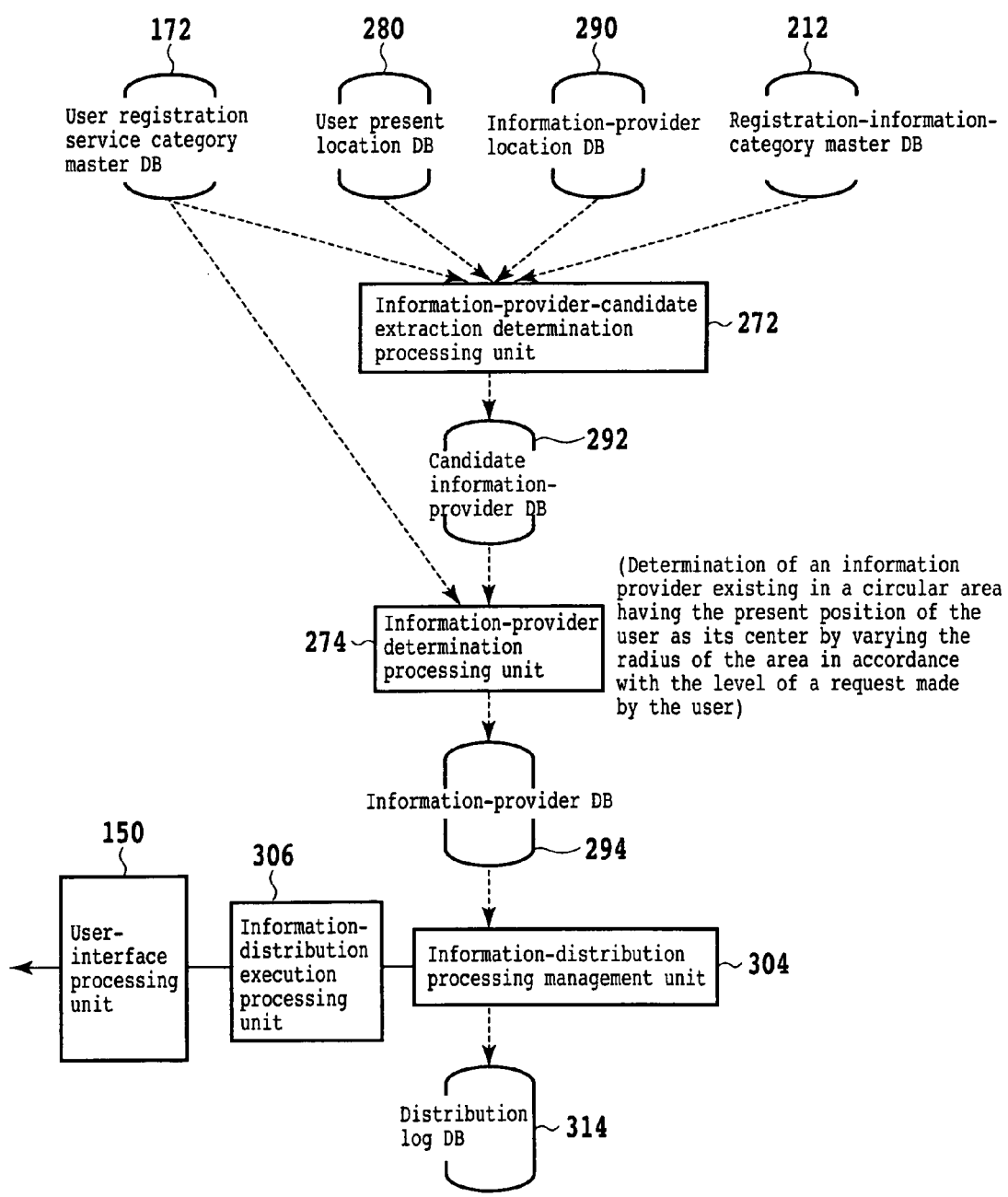
FIG. 51 is a block diagram showing functions, which are carried out when the user makes a request for urgent transmission of information.

FIG. 51 is a block diagram showing functions, which are carried out when the user makes a request for urgent transmission of information. When the user desires information now, the user needs to press the URGENT button appearing on the screen shown in FIG. 34 and enter a special number in order to indicate a level of urgency. The information-provider-candidate extraction determination processing unit 272 determines candidate information providers on the basis of the user's present location stored in the user present location database 280, the user's desired information category stored in the user registration service category master database 172, the information providers' present locations stored in the information-provider location database 290 and provided-information categories stored in the registration-information category master database 212, and stores the candidate information providers in the candidate information-provider database 292. The information-provider determination processing unit 274 determines an information provider proper for the state of urgency, that is, the level of the request made by the user, and stores the determined information provider in the information-provider database 294.

If a condition for information specified in a request made by the user and/or a condition for permissiveness of the request are lenient, the range of allowance for a distance from the present location of the user to the location of a proper information provider can be considered to be a wide range, that is, it is possible to increase a radius of a circle having the present location of the user as a center point and enclosing an area in which candidate information providers are located. If a condition for information specified in a request made by the user and/or a condition for permissiveness of the request are strict, on the other hand, the radius of such a circle is decreased. The Information-distribution processing management unit 304 then reads out information on the determined information provider from the information-provider database 294, transmits the information to the user making the request for distribution of information and stores the record in the distribution log database 314.

(9): Inter-Bank Financial Settlements

Figure 52A:
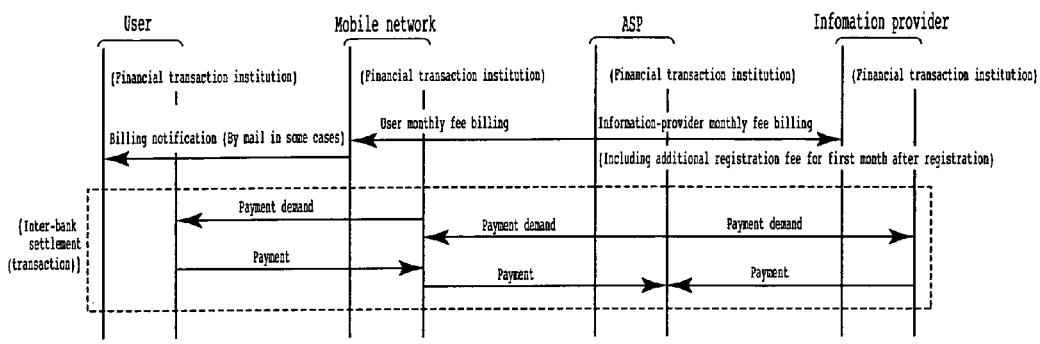
FIGS. 52A–52C are diagrams each showing a sequence of inter-bank financial settlement operations.

FIG. 52 is diagrams each showing a sequence of inter-bank financial settlement operations. To be more specific, FIG. 52(a) is a diagram showing a sequence of inter-bank financial settlement operations for a case in which the information-provider terminal is a non-mobile terminal. In this case, the computer system requests the non-mobile information-provider terminal to pay an information-provider monthly fee. The computer system requests a mobile user terminal to pay a user monthly fee through the mobile-communication operator. In the inter-bank financial settlement, the computer system requests an information provider and a user to pay their monthly fees through their financial-transaction institutions.

Figure 52B:
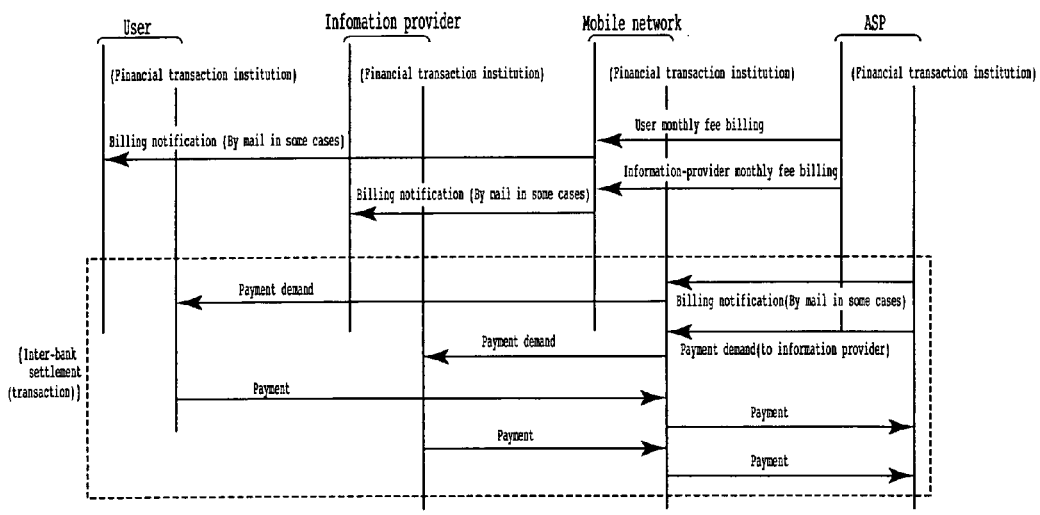

FIG. 52(b) is a diagram showing a sequence of inter-bank financial settlement operations for a case in which the information-provider terminal is a mobile terminal. In this case, the computer system requests the mobile information-provider terminal to pay an information-provider monthly fee through the mobile-communication operator. The computer system requests a mobile user terminal to pay a user monthly fee also through the mobile-communication operator. In the inter-bank financial settlement, the computer system requests an information provider and a user to pay their monthly fees through their financial-transaction institutions.

Figure 52C:
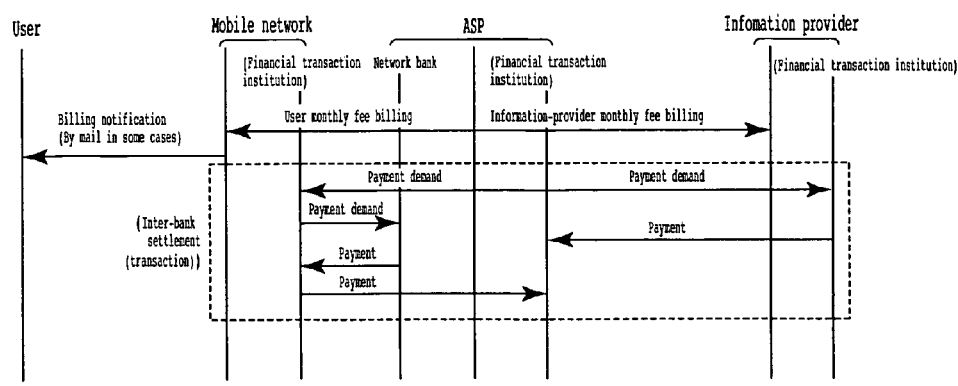

FIG. 52(c) is a diagram showing a sequence of inter-bank financial settlement operations for a case in which the computer system also carries out network banking works and each user has an account in a network bank. In this case, the computer system requests the non-mobile information-provider terminal to pay an information-provider monthly fee. The computer system requests a mobile user terminal to pay a user monthly fee through the mobile-communication operator. In the inter-bank financial settlement, when the financial-transaction institution of a user requests the network bank to make a payment, the network bank makes the payment to the financial-transaction institution and a process to make a payment to the financial-transaction institution of the computer system is carried out.

First Embodiment

Figure 53:
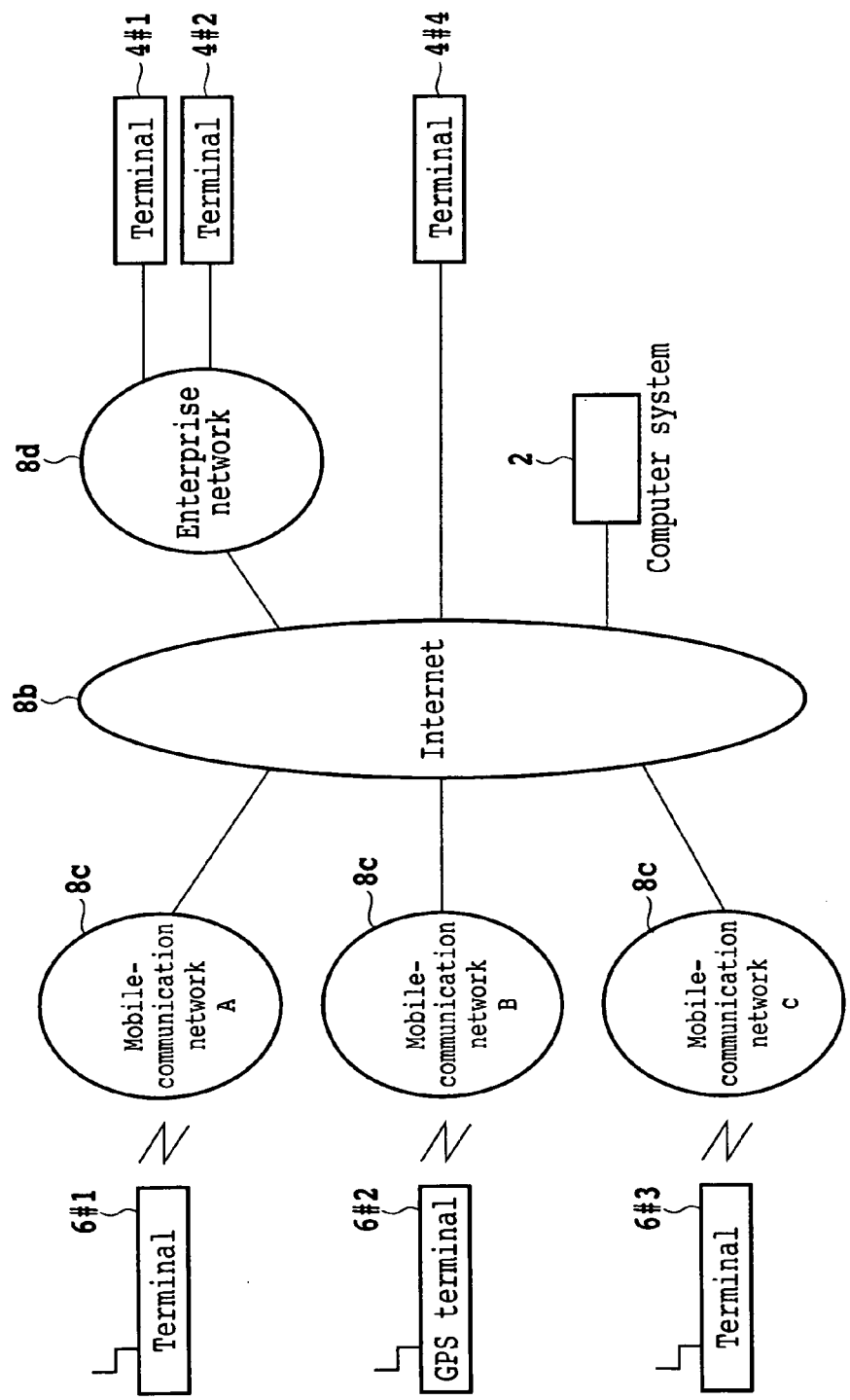
FIG. 53 is a diagram showing the configuration of an information distribution service system implemented by a first embodiment of the present invention.

FIG. 53 is a diagram showing the configuration of an information distribution service system implemented by a first embodiment of the present invention. The configuration elements of the first embodiment essentially identical to those employed in the information distribution system shown in FIG. 1 are denoted by the same reference numerals as their counterparts employed in the information distribution system. In the case of the first embodiment, user terminals 6#1 and 6#3 are each a non-GPS terminal whereas a user terminal 6#2 is a GPS terminal. The user of the user terminal 6#2 desires information on shopping such as restaurants and supermarkets. On the other hand, the user of the user terminal 6#1 desires information on areas such as information on traffic and information on accidents. The information on shopping is stored in the information-provider database 30 included in the computer system 2 as shown in FIG. 29 in the basic sequence of operations carried out between a information-provider terminal 4#i owned by the information provider and the computer system 2 as shown in FIG. 29. In the basic sequence shown in FIG. 29, a recommended information such as information on locations, the information on shopping and information on coupons is transmitted to the computer system 2.

On the other hand, the computer system 2 acquires area information such as traffic information and accident information, which vary from time to time, from a traffic center, and stores the information on areas in the area-information database 32. In the case of the information on areas, the locations of the areas and the contents of the information reflect the location of the information provider and information provided by the information provider. Thus, the information on areas is virtually the same as the information provided by the information provider.

(1): GPS User Terminal 6#2

In the case of a GPS user terminal, a service is rendered in accordance with the sequence shown in FIG. 32. The user of the GPS user terminal 6#2 desires presentation of information on shopping. The computer system 2 derives an inference formula for predicting a moving destination from location information of the GPS user terminal 6#2 by adoption of the inference mechanism described earlier.

FIG. 54 is a diagram showing a screen displaying detailed information. The computer system 2 finds out a proper information provider by adoption of the least-square method described above and in accordance with from the location of the GPS user terminal 6#2. Then, pieces of detailed information for the information category specified by the GPS user terminal 6#2 are transmitted in a distribution order. The detailed information includes the names of department stores, supermarkets and restaurants. The department stores, the supermarkets and the restaurants pertain to the information category, which is the shopping-information category in this case. The GPS user terminal 6#2 displays the detailed information on a screen like one shown in FIG. 54. In the case of a department store, a supermarket or the like, information on a coupon and information on buying at a bargain are also distributed as well.

(2): Non-GPS User Terminal 6#1

In the case of a non-GPS user terminal, a service is rendered in accordance with the sequence shown in FIG. 33. The user of the non-GPS user terminal 6#1 desires presentation of information on areas such as information on traffic and information on accidents. The computer system 2 acquires the area information such as the traffic information and the accident information, which vary from time to time, from a traffic center, and stores the information on areas in the area-information database 32.

FIG. 55 is a diagram showing a screen displaying detailed information. The computer system 2 derives an inference formula for predicting a moving destination from location information of the non-GPS user terminal 6#1, which is location information received via the mobile-communication operator. The computer system 2 transmits information on an area such as information on traffic and information on accidents in accordance with the information category desired by the non-GPS user terminal 6#1. The area is an area surrounding the location of the non-GPS user terminal 6#1. The location of the non-GPS user terminal 6#1 is predicted by using the enterprise formula. The non-GPS user terminal 6#1 displays the detailed area information on a screen like the one shown in FIG. 55.

In accordance with the first embodiment described above, it is possible to easily obtain information on an area existing on the way in the moving direction without specifying a destination of the movement. In addition, even in the case of mobile information terminals existing in the same region, information on an area may or may not be distributed depending on the moving direction. Thus, the amount of distributed information can be reduced.

Second Embodiment

Figure 56:
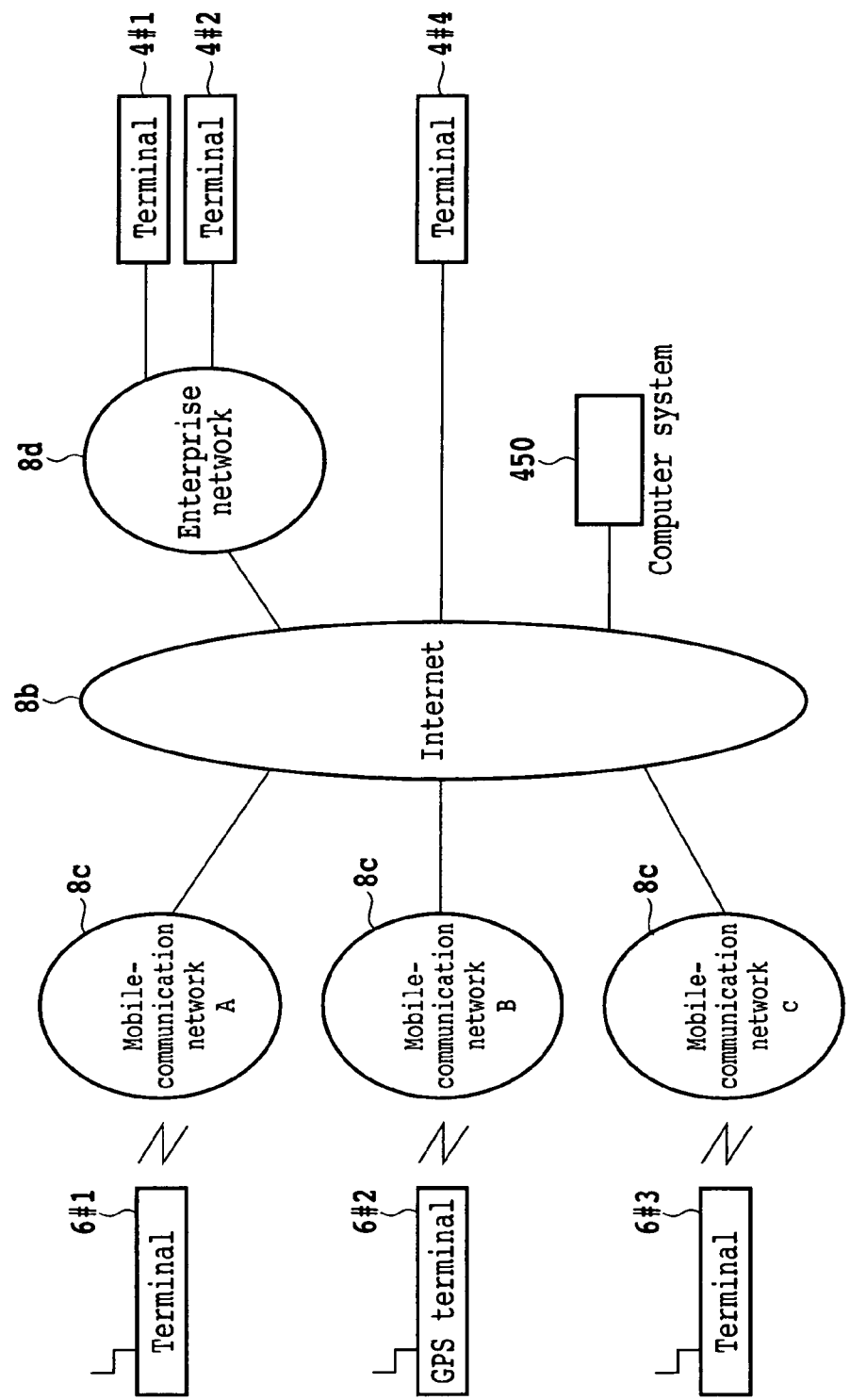
FIG. 56 is a diagram showing the configuration of an information distribution service system implemented by a second embodiment of the present invention.
Figure 57:
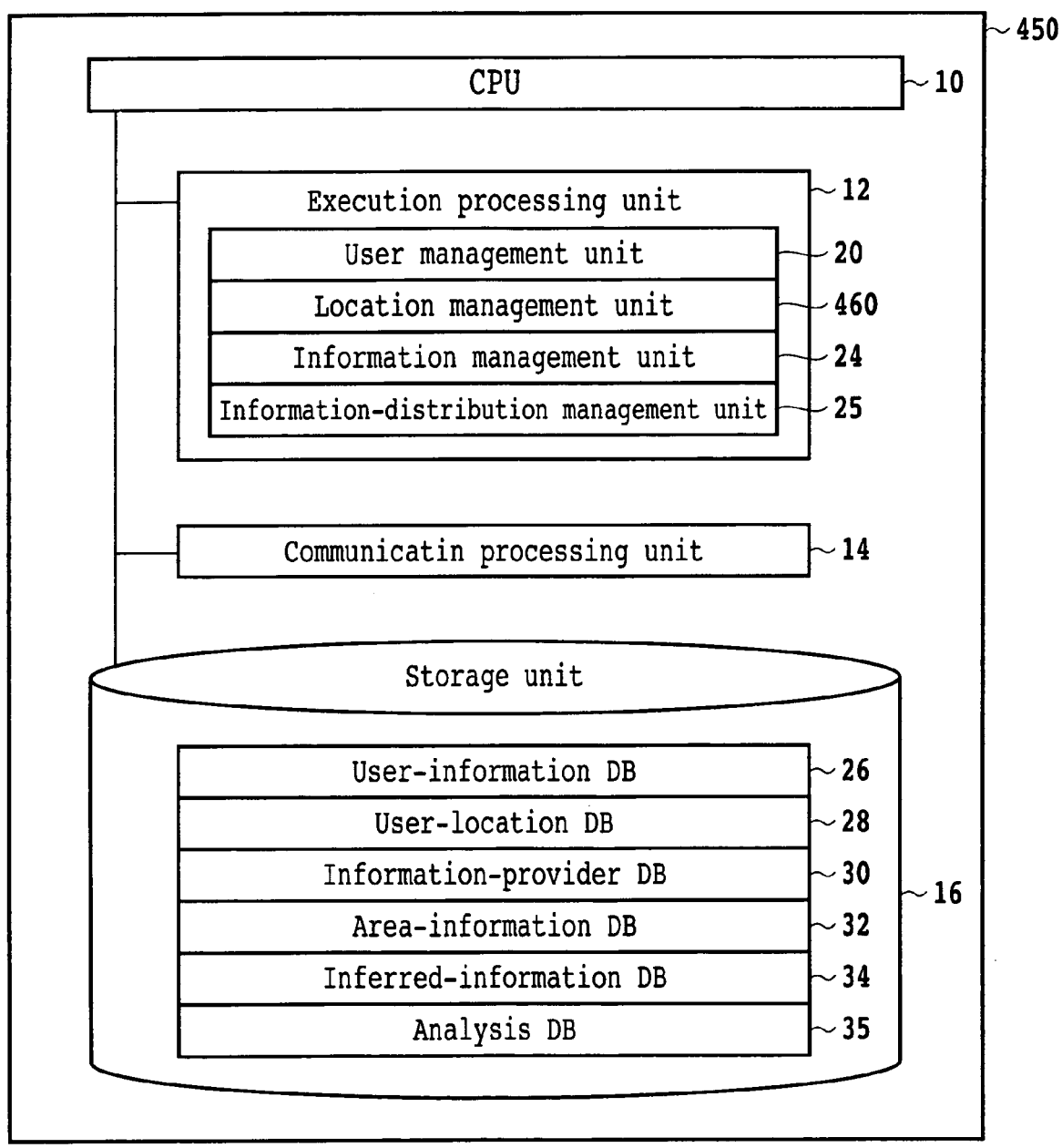
FIG. 57 is a block diagram showing functions of a computer system employed in the information distribution service system shown in FIG. 56.

FIG. 56 is a diagram showing the configuration of an information distribution service system implemented by a second embodiment of the present invention. The configuration elements of the second embodiment essentially identical to those employed in the information distribution system shown in FIG. 1 are denoted by the same reference numerals as their counterparts employed in the information distribution system. FIG. 57 is a block diagram showing functions of a computer system 450 employed in the information distribution service system shown in FIG. 56. Configuration elements of the computer system 450 that are essentially identical to those employed in the computer system 2 shown in FIG. 2 are denoted by the same reference numerals as their counterparts employed in the computer system 2. In addition to the functions of the location management unit 22 employed in the first embodiment, a location management unit 460 has the following additional functions:

(i): Identify an area predicted to be a specific area, toward which users are moving, from predicted moving directions of users, and identify user terminals 6#i moving to the specific area.

(ii): Inform the mobile-communication operator of a map code of the specific area toward which users are intensively moving, that is, information on the specific area and the phone number or the terminal address or each user terminal inferred to be moving toward the specific area.

Since the amount of traffic in the specific area toward which users are moving is predicted to increase, the mobile-communication operator is notified of the fact that the traffic will become heavier so that the mobile-communication operator can take a proactive measure such as a regulation to suppress traffic congestion. For example, the mobile-communication operator can notify users of information on a traffic regulation so that the users avoid moving in the direction toward the area.

Figure 58:
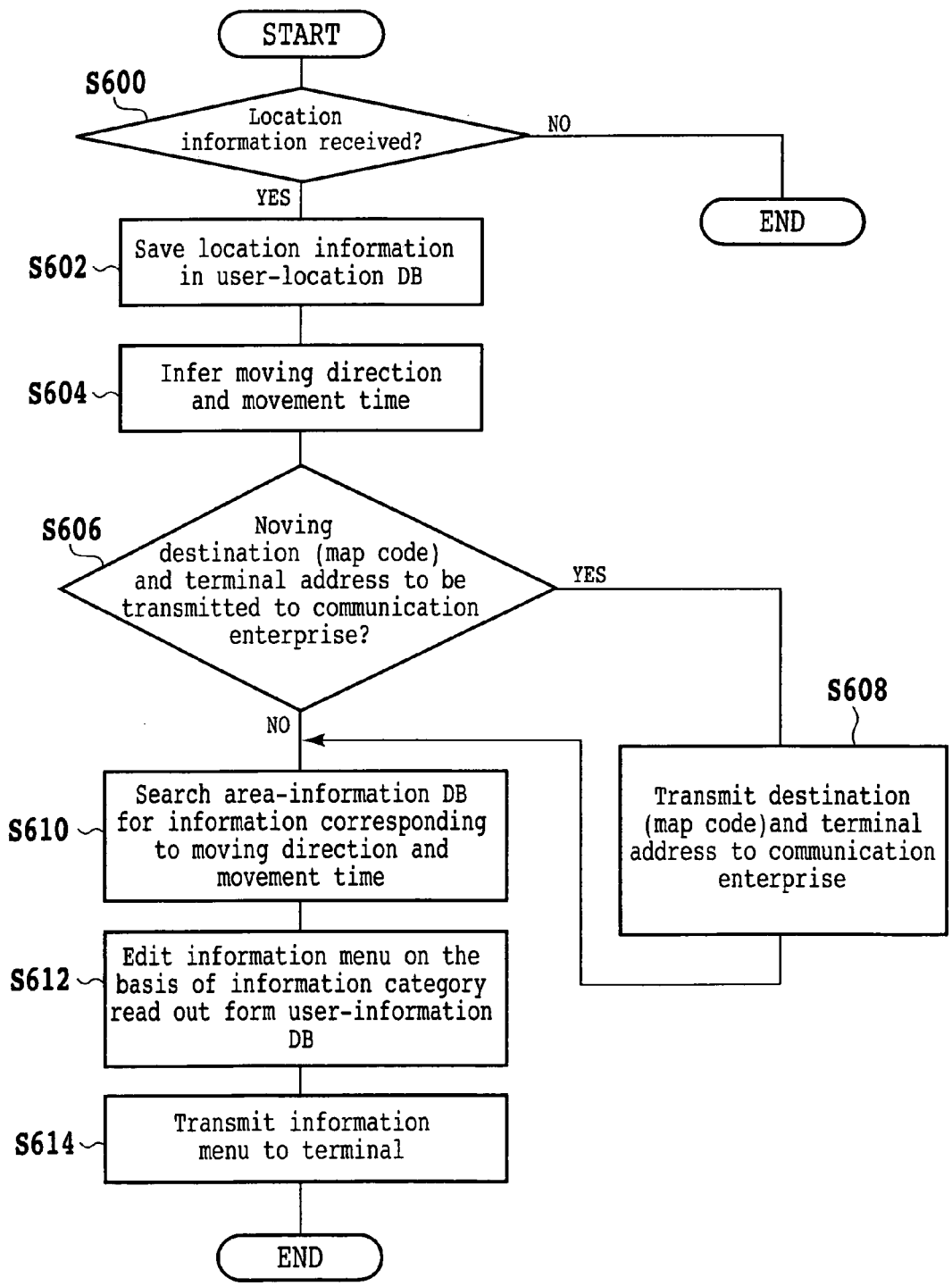
FIG. 58 shows a flowchart representing processing of location management.
Figure 59:
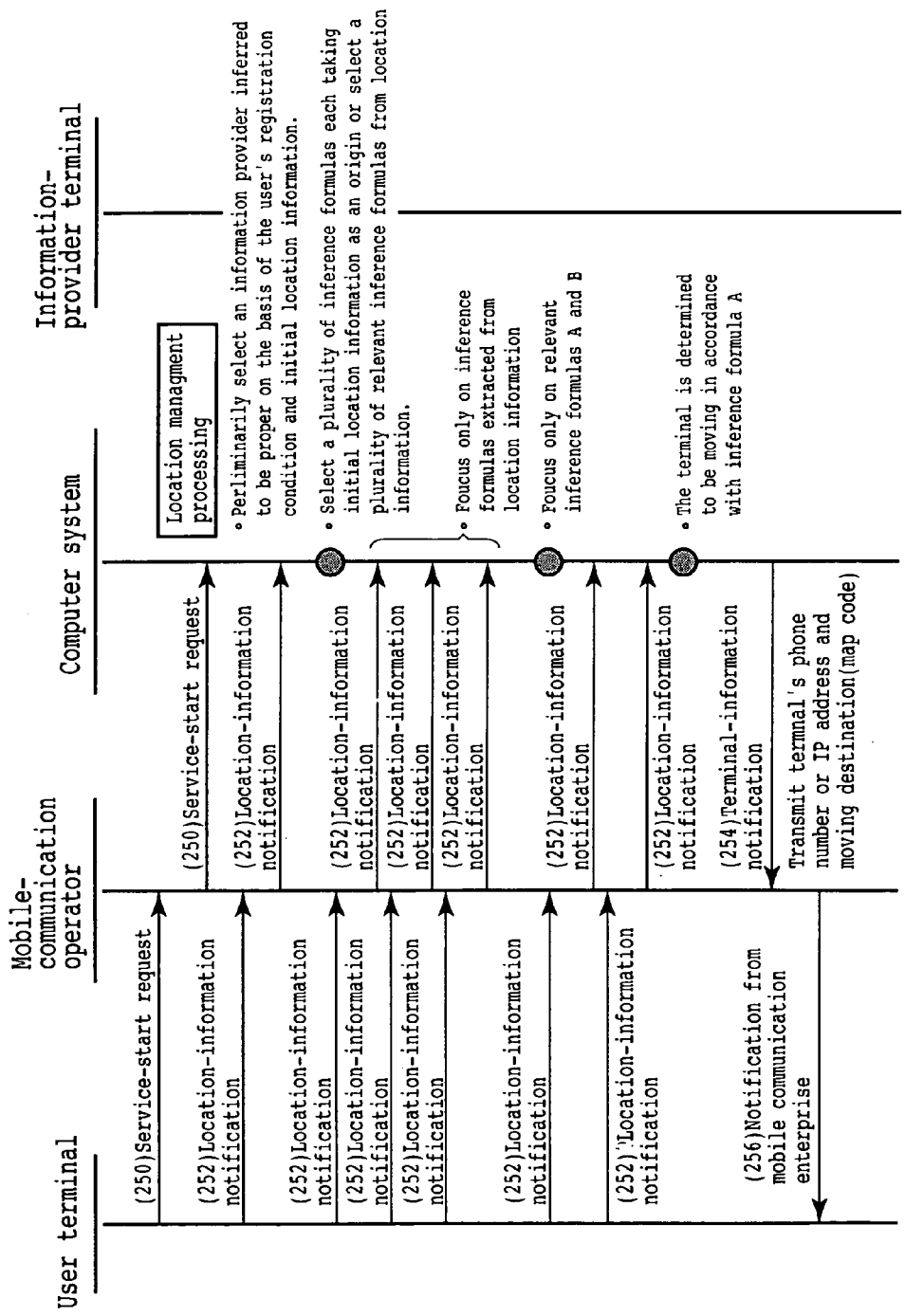
FIG. 59 shows a user sequence chart.

FIG. 58 shows a flowchart representing processing of location management. FIG. 59 shows a user sequence chart. The user terminal 6#i transmits a request to start a service to the computer system 450 as indicated by an arrow (250) of the sequence shown in FIG. 59. The user terminal 6#i transmits a location-registration notification to the computer system 450 as indicated by an arrow (252). At a step S600 of the flowchart shown in FIG. 58, the location management unit 460 employed in the computer system 450 forms a judgment as to whether or not location information has been received. If the location information has been received, the flow of the processing goes on to a step S602. If the location information has not been received, on the other hand, the processing is ended. Then, at the next step S604, a process to infer the user's moving direction and movement time is carried out by adopting the inference method described above.

Subsequently, at the next step S606, a judgment is formed to determine whether or not users the number of which exceeds a predetermined user count are moving in the moving direction toward the same area. If users the number of which exceeds a predetermined user count are moving in the moving direction toward the same area, the flow of the processing goes on to a step S608. If users the number of which exceeds a predetermined user count are not moving in the moving direction toward the same area, on the other hand, the flow of the processing goes on to a step S610. At the step S608, the map code of the area and the terminal address of each of the users are reported to the mobile-communication operator as indicated by an arrow 254 of the sequence shown in FIG. 59.

Since the amount of traffic in the area is predicted to increase, upon reception of the map code, the mobile-communication operator notifies the user terminal through the terminal address that traffic will be regulated by taking a step such as limiting a traffic flow as indicated by an arrow (256) of the sequence shown in FIG. 59. From this notification, the user terminal knows in advance that the amount of traffic at the moving destination will increase. At the step S610, an area information database is searched for information corresponding to the moving direction and the movement time. Then, at the next step S612, an information menu stored in the user database is edited on the basis of the category information. Subsequently, at the next step S614, the information menu is transmitted to the terminal.

In accordance with the second embodiment described above, not only are the same effects as the first embodiment exhibited, but a preventive measure can also be taken in case concentration of traffic in a certain area is predicted in advance.

Third Embodiment

Figure 60:
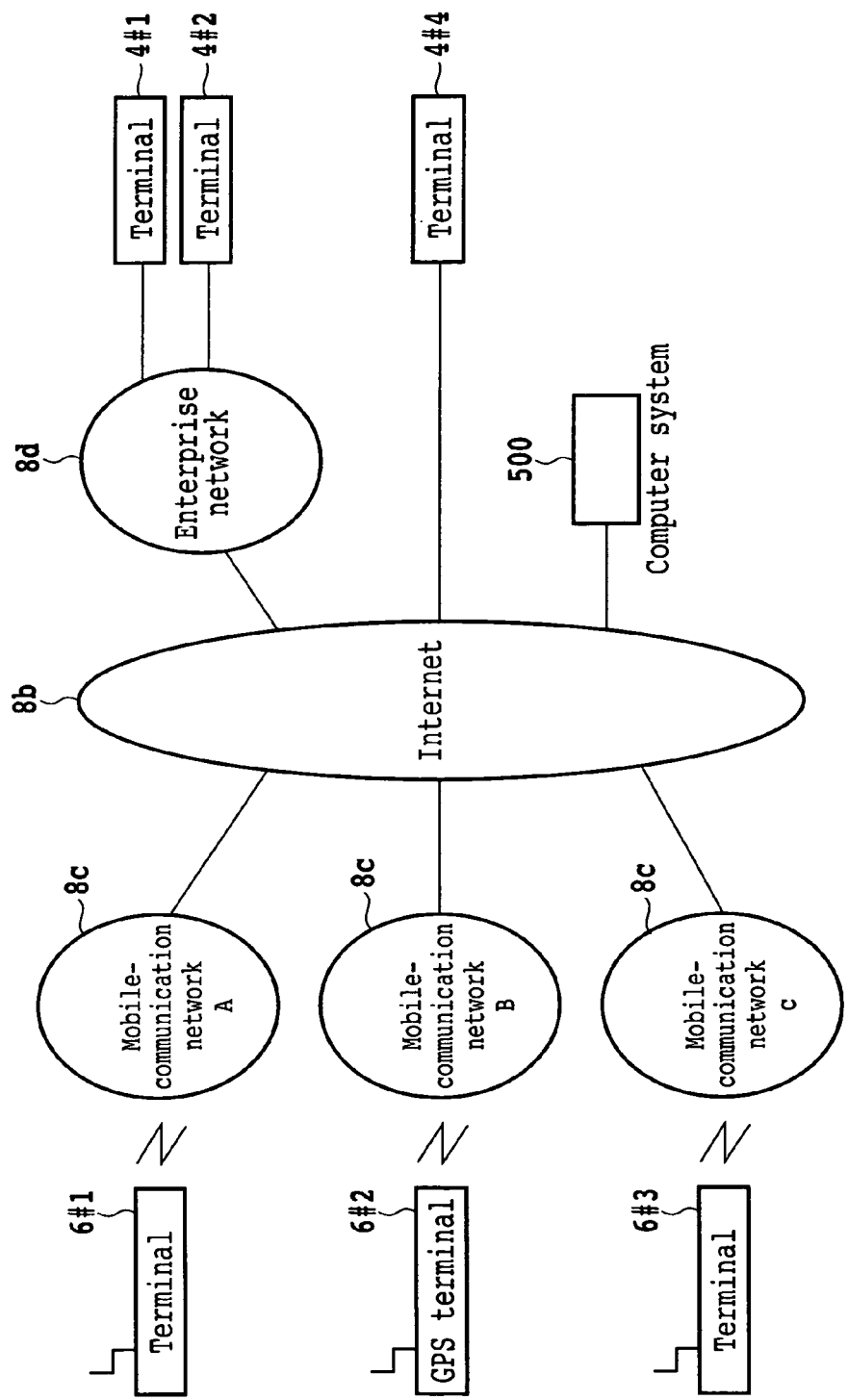
FIG. 60 is a diagram showing the configuration of an information distribution service system implemented by a third embodiment of the present invention.
Figure 61:
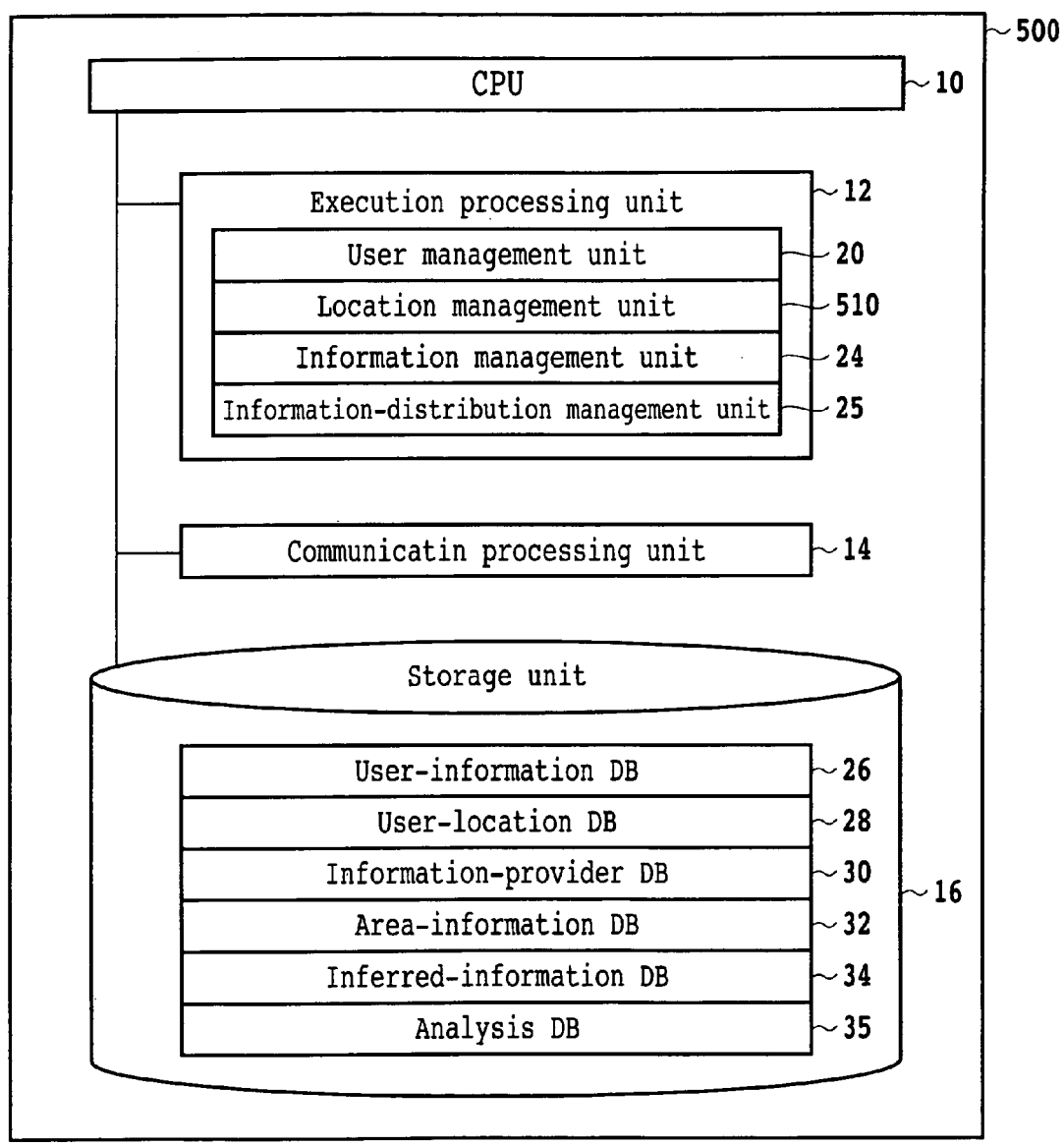
FIG. 61 is a block diagram showing functions of a computer system employed in the information distribution service system shown in FIG. 60.

FIG. 60 is a diagram showing the configuration of an information distribution service system implemented by a third embodiment of the present invention. The configuration elements of the third embodiment essentially identical to those employed in the information distribution system shown in FIG. 1 are denoted by the same reference numerals as their counterparts employed in the information distribution system. FIG. 61 is a block diagram showing functions of a computer system 500 employed in the information distribution service system shown in FIG. 60. Configuration elements of the computer system 500 that are essentially identical to those employed in the computer system 2 shown in FIG. 2 are denoted by the same reference numerals as their counterparts employed in the computer system 2. In addition to the functions of the location-management unit employed in the first embodiment, a location management unit 510 has the following additional functions:

(i): Form a judgment as to whether or not a user is riding on a vehicle such as a train or a bus on the basis of data stored in a vehicle operation information database included in the area-information database 32, a moving direction and a movement time, and identify what kind of vehicle is used if the user is riding on a vehicle.

(ii): Identify what vehicle the user is riding on, on the basis of data stored in a vehicle operation information database.

(iii): Edit an information menu including an arrival time of the identified vehicle and information on an area in which a destination station of the vehicle is located.

The vehicle operation information database included in the area-information database 32 includes route information showing operation routes and an operation time table of each route. The route information is information on locations located on a contiguous line and information on allowable displacements. Examples of the contiguous line are a trunk road, a highway and a rail road. Provided for each vehicle running through a route, operation information for the route includes the name of each place at which the vehicle will arrive and the geographical location of such a place as well as an operation time, that is, a time of arrival at the place.

Figure 62:
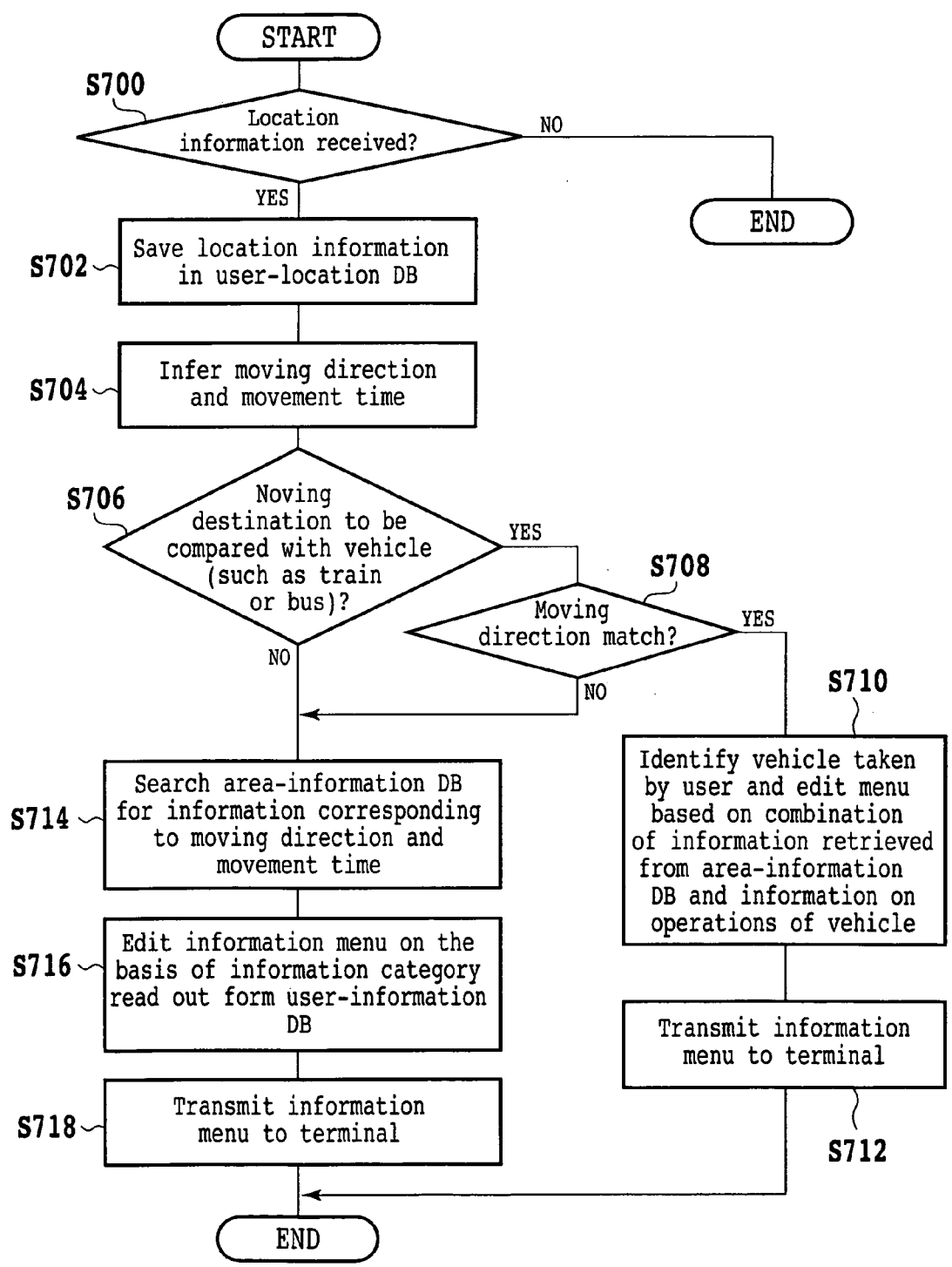
FIG. 62 shows a flowchart representing processing of location management.

FIG. 62 shows a flowchart representing a processing of location management. FIG. 63 is a diagram showing a screen displaying detailed information. At a step S700 of the flowchart shown in FIG. 62, the location management unit 510 forms a judgment as to whether or not location information has been received. If the location information has been received, the flow of the processing goes on to a step S702. If the location information has not been received, on the other hand, the processing is ended. Then, at the next step S704, a process to infer the user's moving direction and movement time is carried out by adopting the inference mechanism described above. Subsequently, at the next step S706, a judgment is formed to determine whether or not the moving direction is to be compared with the operation route of a vehicle. If the moving direction is to be compared with the operation route of a vehicle, the flow of the processing goes on to a step S708. If the moving direction is not to be compared with the operation route of a vehicle, on the other hand, the flow of the processing goes on to a step S714. At the step S708, the moving direction is compared with the operation route of a vehicle to determine whether or not the moving direction coincides with the operation route of a vehicle. If the moving direction coincides with the operation route of a vehicle, the flow of the processing goes on to a step S710. If the moving direction does not coincide with the operation route of a vehicle, on the other hand, the flow of the processing goes on to the step S714. This is because a vehicle cannot be identified.

At the step S710, the vehicle, which the user is riding on, is identified, and the vehicle-operation data base is searched for information on vehicle operations and information on areas. The pieces of information are then combined to be used in a work to edit an information menu. Assume for example that the vehicle is a train. In this case, the vehicle-operation database is searched for information on stations on the way to the destination and a time of arrival at the terminal station, guiding information showing transfer stations as well as information on delays caused by an accident or the like. These pieces of information are included in the information menu. In addition, the area-information database 32 is also searched for information on an area surrounding each of the stations. Such information can also be included in the information menu.

The above description for a train is applicable to a public bus used as a vehicle. Then, at a step S712, the information menu is transmitted to the terminal. At the step S714, the area-information database is searched for data for the moving direction and the movement time. Then, at the next step S716, an information menu is edited on the basis of category information retrieved from the user database. Subsequently, at a step S718, the information menu is transmitted to the terminal. As shown in FIG. 63, the screen displays, among others, an item for information on train changes.

In accordance with the third embodiment described above, not only are the same effects as the first embodiment exhibited, but it is also possible to obtain travel-destination information according to operation information of a vehicle the user is riding on.

Fourth Embodiment

Figure 64:
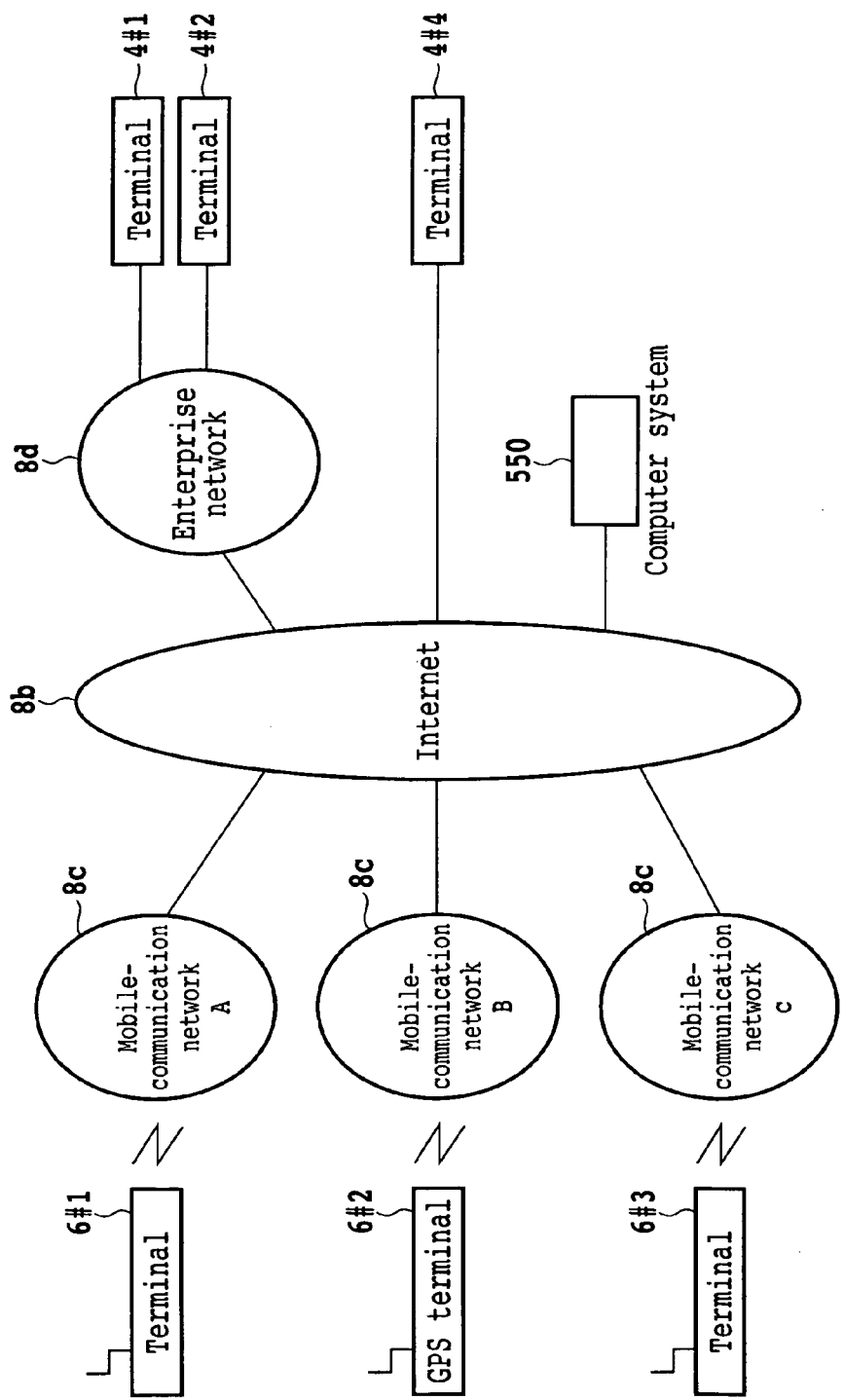
FIG. 64 is a diagram showing the configuration of an information distribution service system implemented by a fourth embodiment of the present invention.
Figure 65:
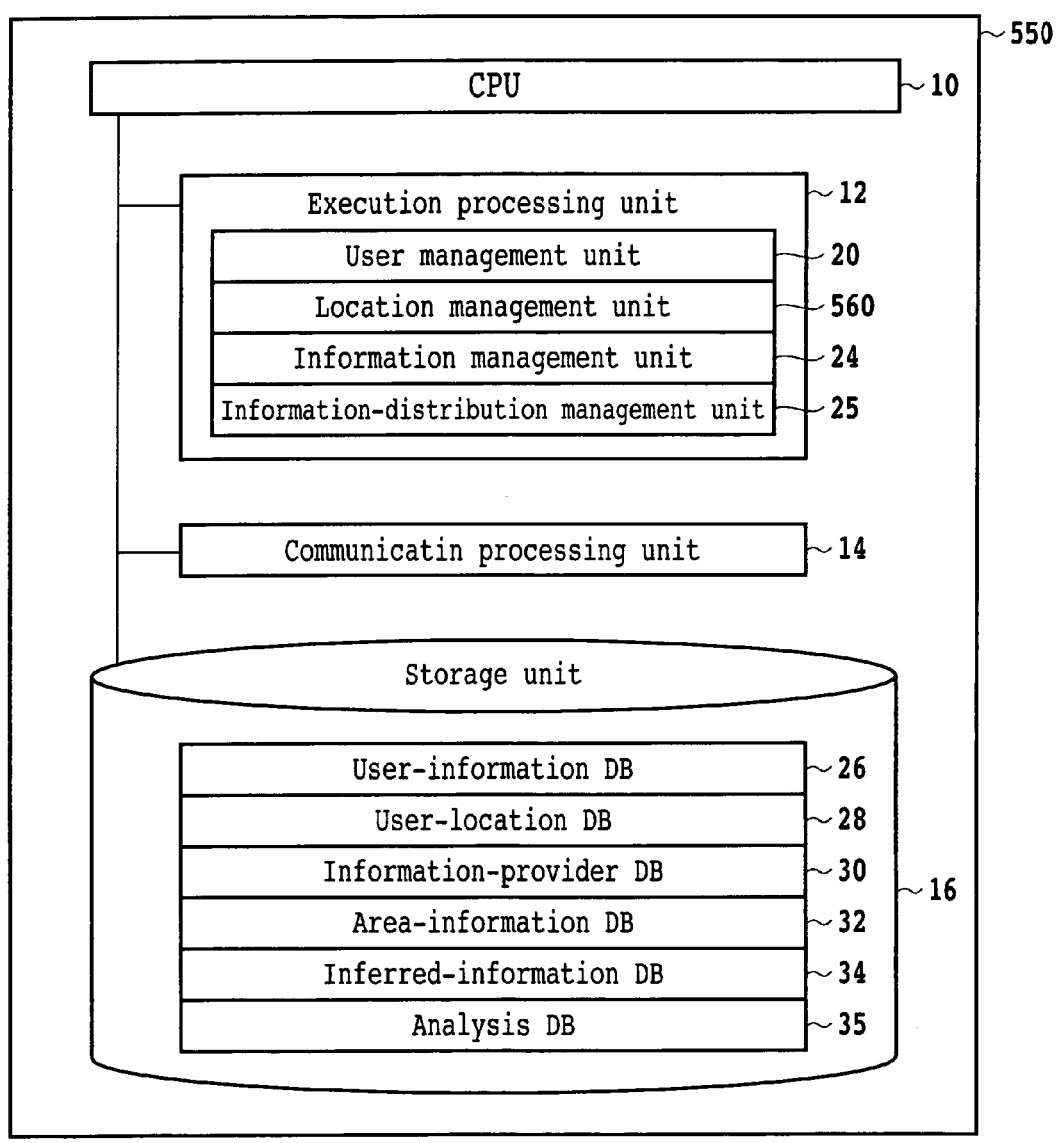
FIG. 65 is a block diagram showing functions of a computer system employed in the information distribution service system shown in FIG. 64.

FIG. 64 is a diagram showing the configuration of an information distribution service system implemented by a fourth embodiment of the present invention. The configuration elements of the fourth embodiment essentially identical to those employed in the information distribution system shown in FIG. 1 are denoted by the same reference numerals as their counterparts employed in the information distribution system. FIG. 65 is a block diagram showing functions of a computer system 550 employed in the information distribution service system shown in FIG. 64. Configuration elements of the computer system 550 that are essentially identical to those employed in the computer system 2 shown in FIG. 2 are denoted by the same reference numerals as their counterparts employed in the computer system 2. In addition to the functions of the location-management unit employed in the first embodiment, a location management unit 560 has the following additional functions:

(i): Find a moving speed from information on locations along the time series and, from the moving speed, determine whether the user is walking or riding on a vehicle moving at a high speed such as an automobile.

(ii): Select candidates for a moving destination on the basis of the moving direction of the user and on the basis of whether or not the user is riding on a vehicle. If the user is riding on a car, for example, the candidates for the moving destination are limited to locations within a distance of not longer than 10 km from the user in the moving direction.

(iii): Edit an information menu including information on the area of each candidate for the moving destination.

Figure 66:
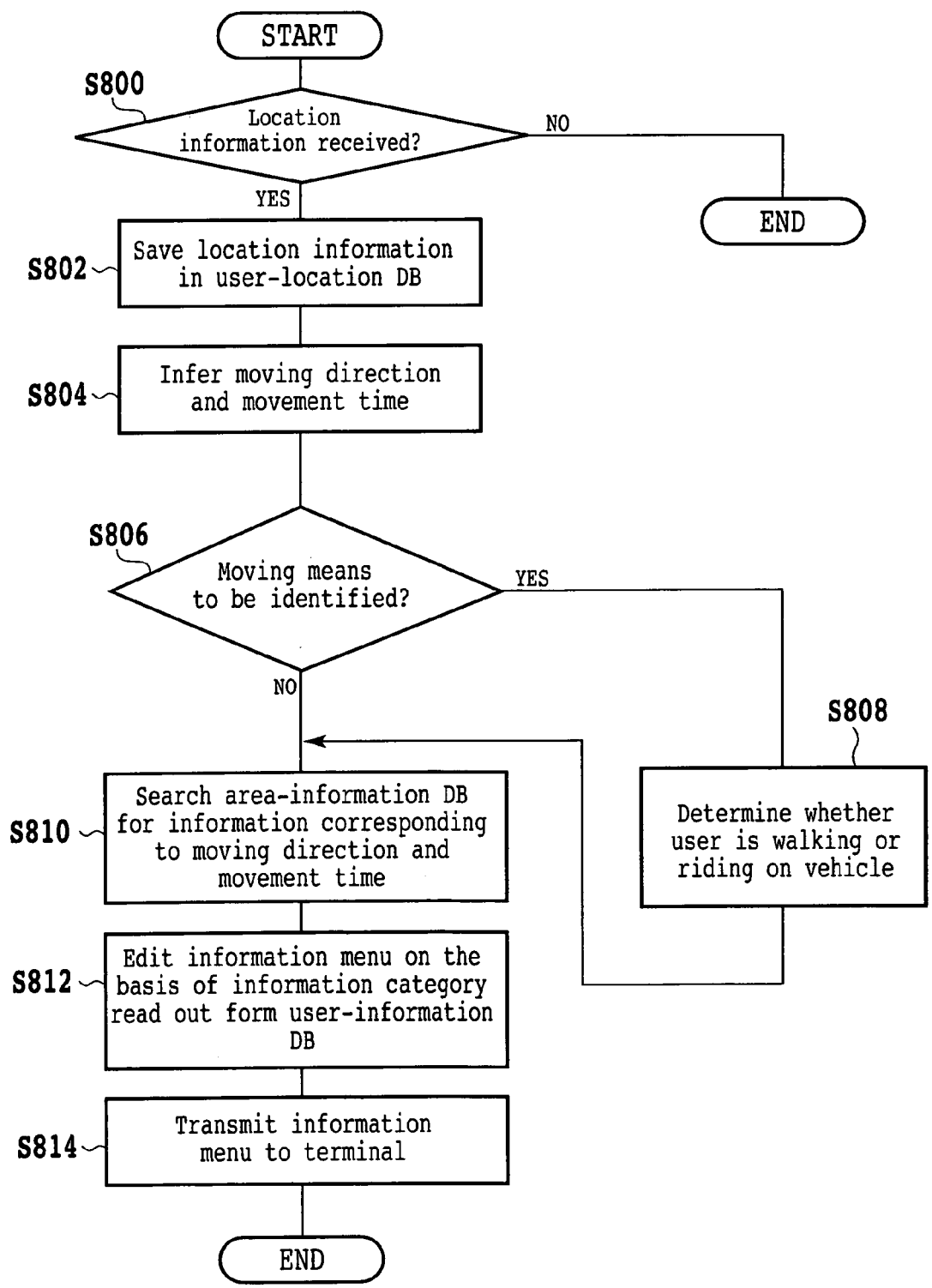
FIG. 66 shows a flowchart representing processing of location management.
Figure 67:
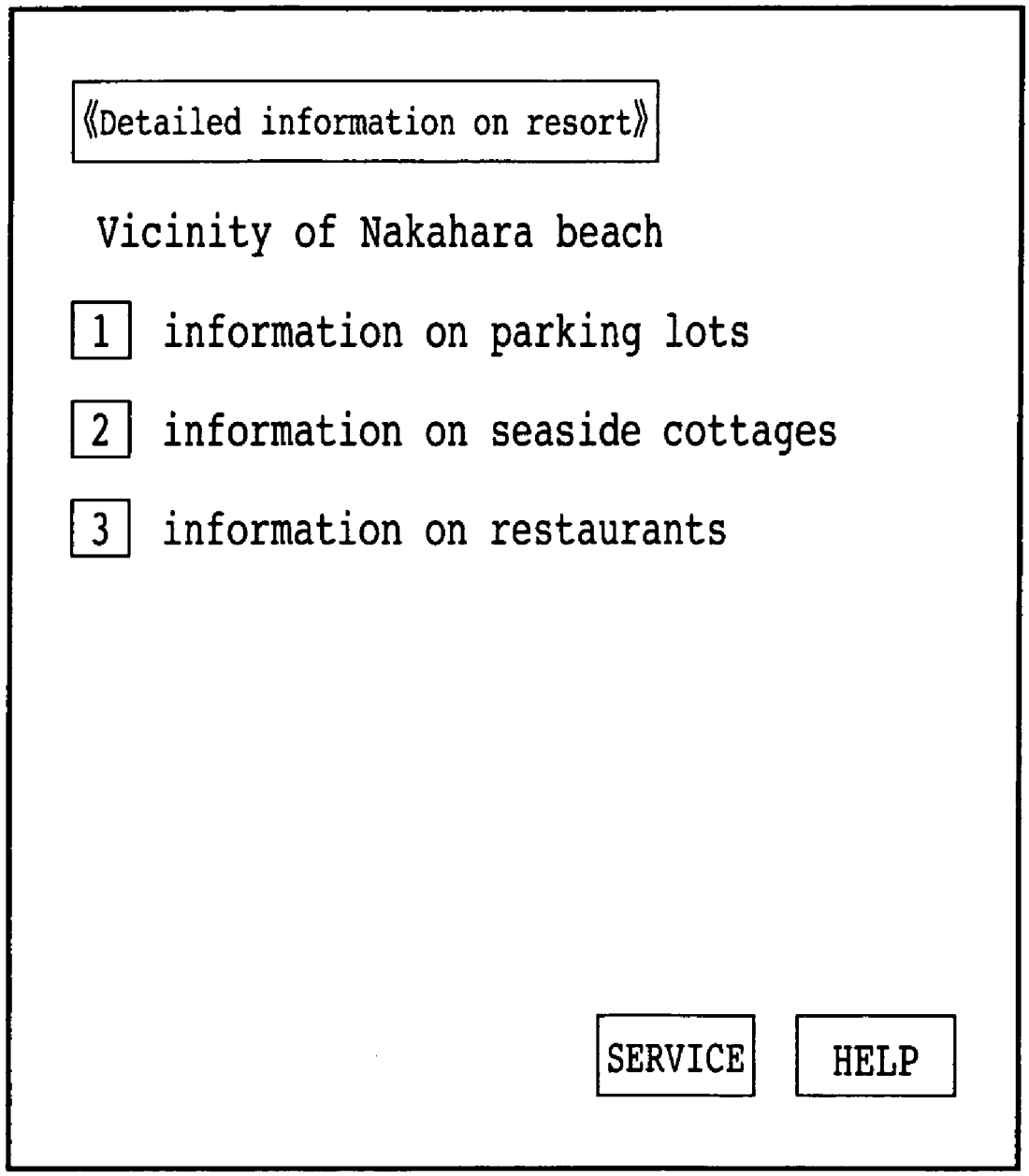
FIG. 67 is a diagram showing a screen displaying detailed information.

FIG. 66 shows a flowchart representing a location-registration process. FIG. 67 is a diagram showing a screen displaying detailed information. At a step S800 of the flowchart shown in FIG. 66, the location management unit 560 forms a judgment as to whether or not information on a location has been received. If information on a location has been received, the flow of the processing goes on to a step S802. If information on a location has not been received, on the other hand, the processing is ended. At a step S804, the user's moving direction and movement time are inferred by using the inference method described earlier. Then, the flow of the processing goes on to the next step S806 to form a judgment as to whether or not the moving speed of the user is to be compared with that of a vehicle. If the moving speed of the user is to be compared with that of a vehicle, the flow of the processing goes on to a step S808. If the moving speed of the user is not to be compared with that of a vehicle, on the other hand, the flow of the processing goes on to a step S810. At the step S808, the moving speed of the user is examined to determine whether the user is walking or riding on a vehicle.

At the step S810, the area-information database 32 is searched for information appropriate for the moving direction and the movement time. If the user is riding on a car, for example, the candidates for the moving destination are limited to locations within a distance of not longer than 10 km from the user in the moving direction. If a bathing beach is selected as a candidate for the moving destination, an expected time of arrival at the bathing beach, the state of road traffic congestion and information on a by-pass are searched for. At a place where the user is further approaching the bathing beach, the amount of additional information is increased. Examples of the additional information include an expected time of arrival at the bathing beach, the state of road traffic congestion, information on a by-pass and information on available parking lots. At a place where the user is further approaching the vicinity of the bathing beach, information on available parking lots, information on the seaside cottage and information on restaurants classified by business hour are searched for as detailed information. In addition, if there is a plurality of available parking lots, a parking lot convenient for parking a car running in the moving direction is selected at a high priority level. FIG. 67 shows information on a bathing beach, information on a parking lot close to the bathing beach, information on seaside cottage and information on restaurants. In the above description, a bathing beach is explained as an example. Conceivable destinations other than a bathing beach include an amusement park, a skiing ground, a golf course and an airport.

If the user is walking, on the other hand, the candidates for the moving destination are limited to locations within a distance of not longer than 1 km from the user in the moving direction. If a department store is selected as a candidate for the destination, an expected time of arrival at the department store and information on bargain sales are searched for as detailed information. At a place where the user is further approaching the department store, additional information is searched for as menu information. The additional information includes an expected time of arrival at the department store and information on seasonal bargain sales during a specified period of time such as a bargain-sale place, commodities sold at a bargain and their bargain prices. At a place where the user is further approaching the vicinity of the department store, information on seasonal bargain sales during a specified period of time and information on coupons are acquired as detailed information.

In accordance with the fourth embodiment described above, not only are the same effects as the first embodiment exhibited, but it is also possible to render a service of distributing detailed information in a range, which varies depending on whether the user is walking or riding on a vehicle.

Fifth Embodiment

Figure 68:
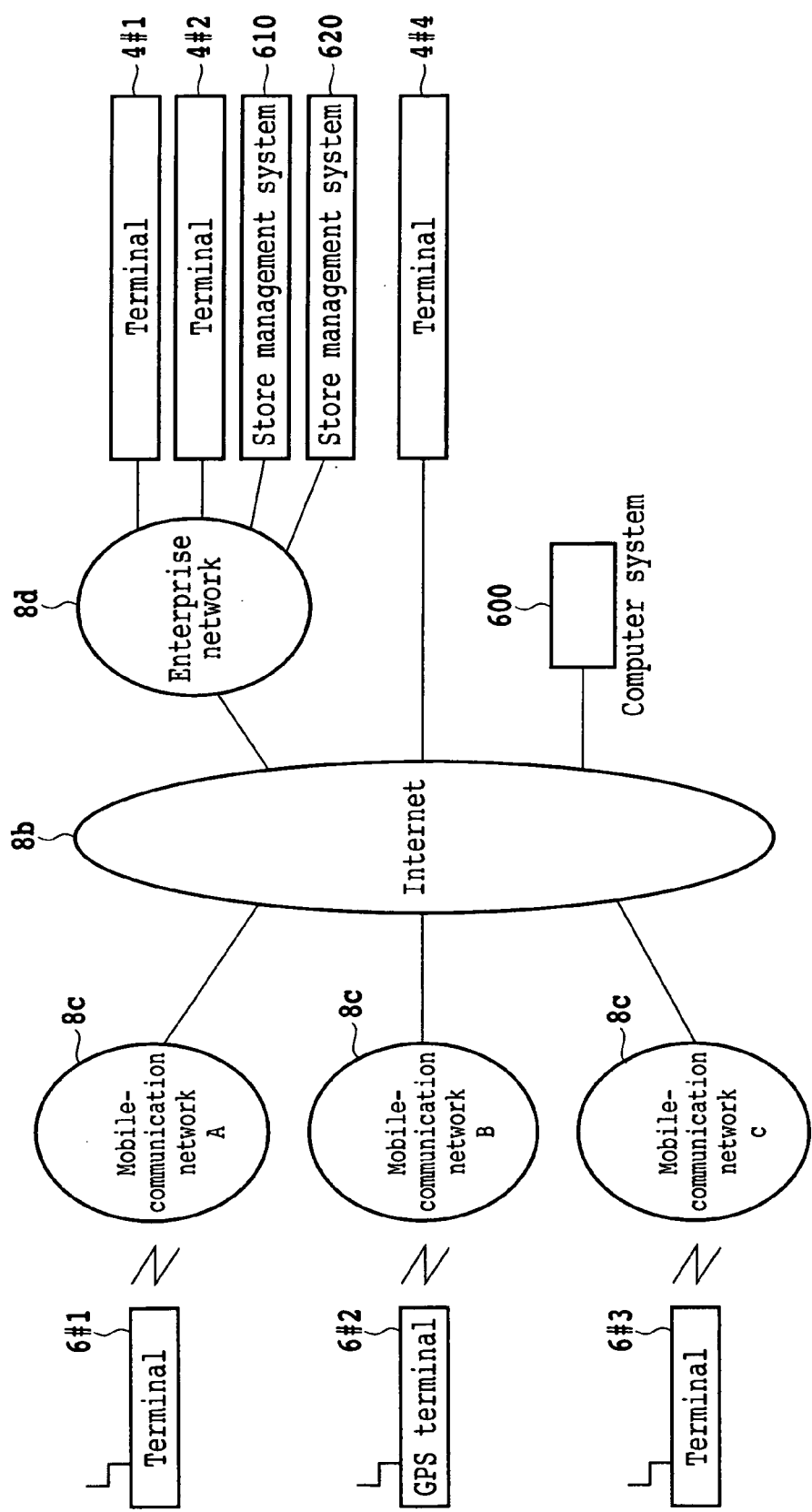
FIG. 68 is a diagram showing the configuration of an information distribution service system implemented by a fifth embodiment of the present invention.
Figure 69:
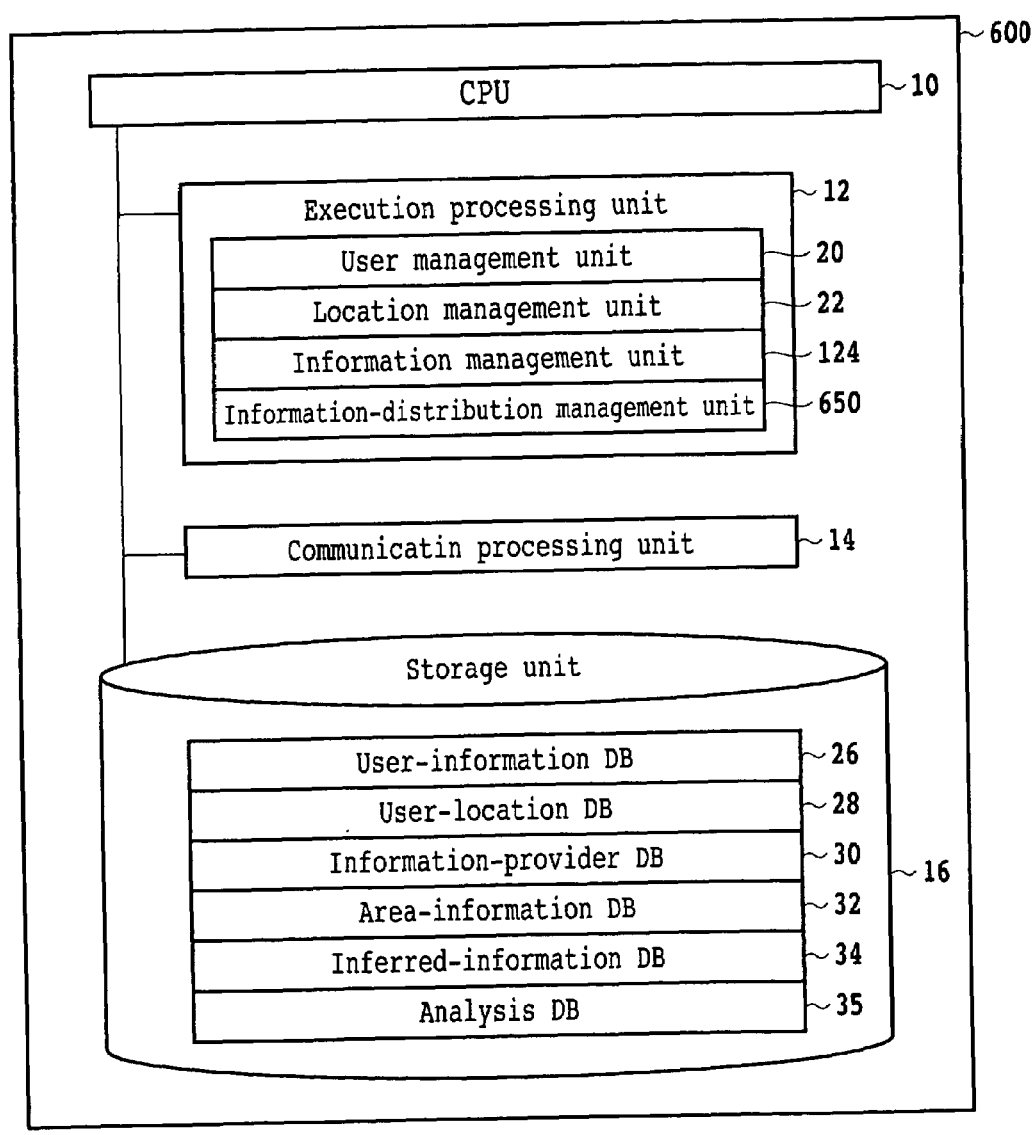
FIG. 69 is a block diagram showing functions of a computer system employed in the information distribution service system shown in FIG. 68.
Figure 70:
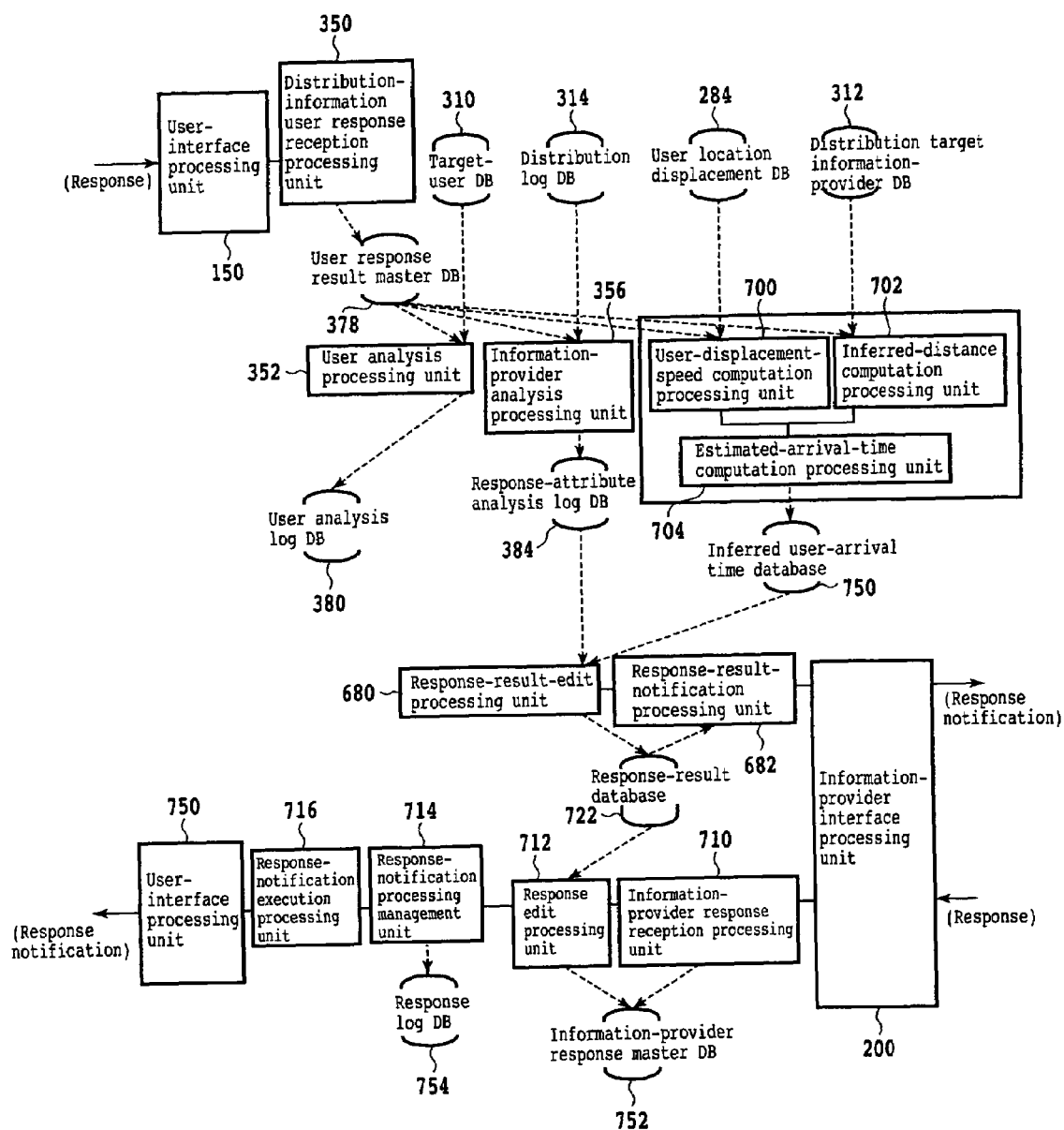
FIG. 70 is a block diagram showing functions of an information-provider management unit employed in the computer system shown in FIG. 69.
Figure 71:
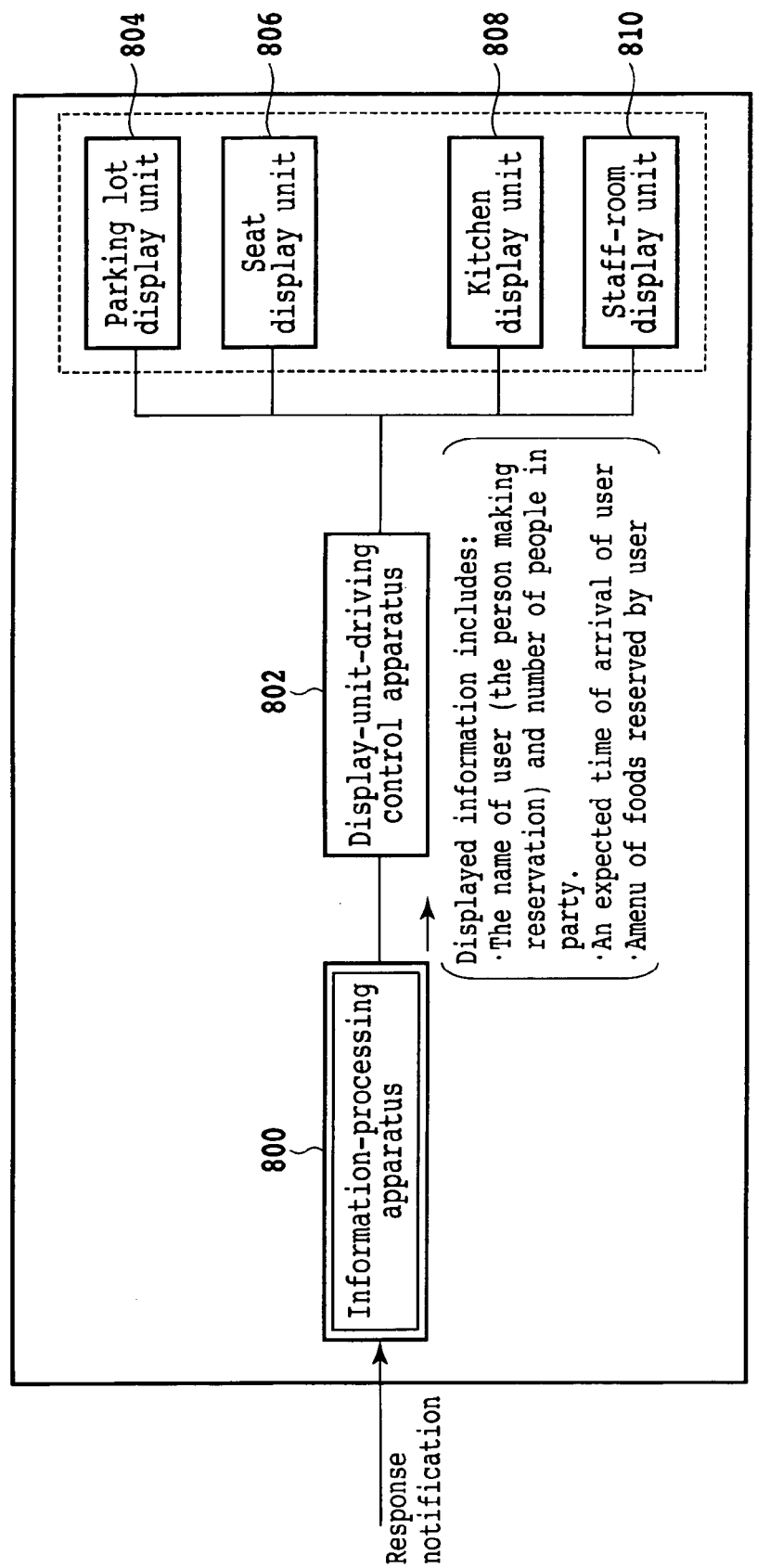
FIG. 71 is a diagram showing the configurations of a store-management system employed in the information distribution service system shown in FIG. 68.
Figure 72:
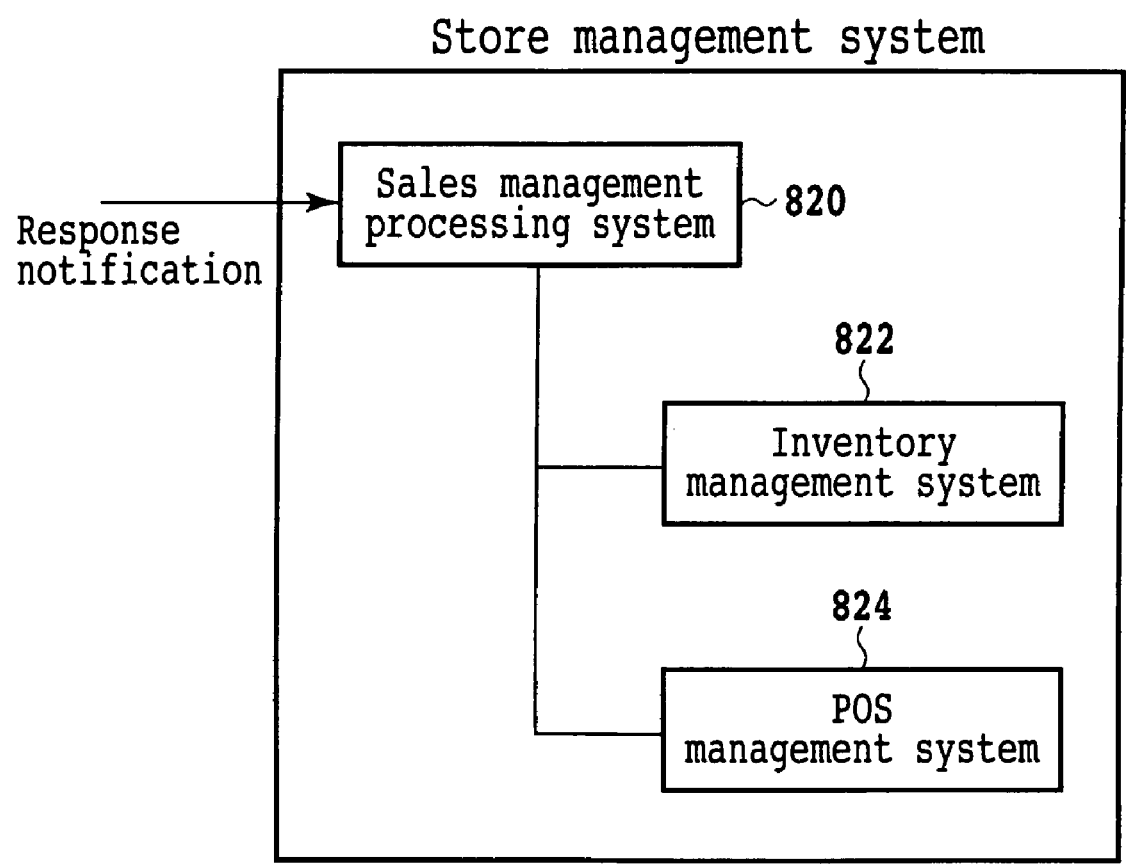
FIG. 72 is a diagram showing the configurations of another store-management system employed in the information distribution service system shown in FIG. 68.

FIG. 68 is a diagram showing the configuration of an information distribution service system implemented by a fifth embodiment of the present invention. The fifth embodiment's configuration elements essentially identical to those employed in the information distribution system shown in FIG. 1 are denoted by the same reference numerals as their counterparts employed in the information distribution system. FIG. 69 is a block diagram showing functions of a computer system 600 employed in the information distribution service system shown in FIG. 68. Configuration elements of the computer system 600 that are essentially identical to those employed in the computer system 2 shown in FIG. 2 are denoted by the same reference numerals as their counterparts employed in the computer system 2. FIG. 70 is a block diagram showing functions of a information-provider management unit 650 employed in the computer system 600 shown in FIG. 69, which are functions carried out for a response given by the user. FIGS. 71 and 72 are diagrams showing the configurations of store-management systems 610 and 620 respectively, employed in the information distribution service system shown in FIG. 68.

Figure 73:
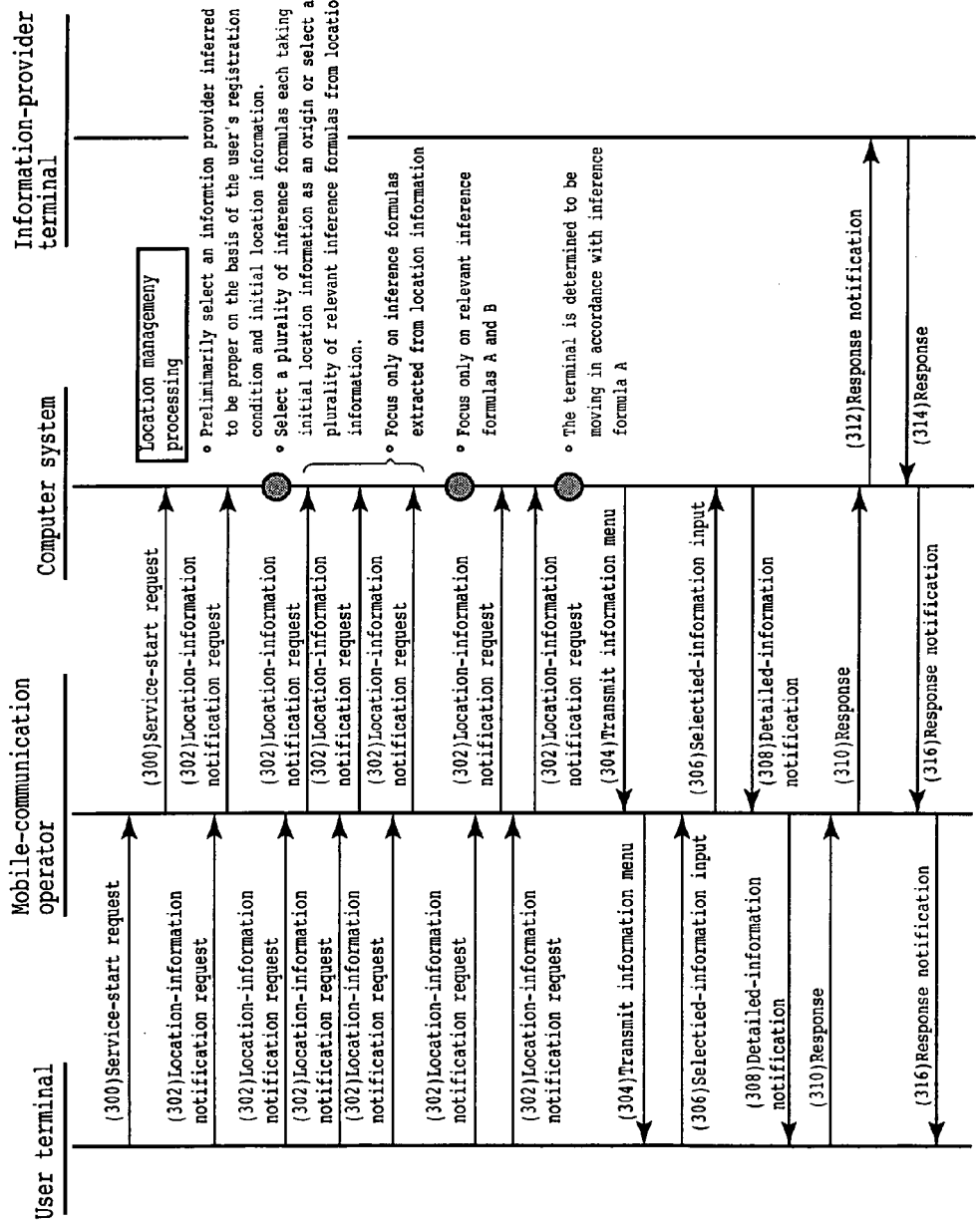
FIG. 73 shows a sequence of operations carried out by the user.

FIG. 73 shows a sequence of operations carried out by the user. As indicated by an arrow (300) of the sequence shown in FIG. 73, the user terminal 6#i transmits a request for a start of a service to the computer system 600. As indicated by an arrow (304), the computer system 600 transmits an information menu to the user terminal 6#i. As indicated by an arrow (306), the user terminal 6#i transmits selected information to the computer system 600. As indicated by an arrow (308), the computer system 600 transmits detailed information to the user terminal 6#i. As indicated by an arrow (310), the user terminal 6#i transmits a response to the information notification. In this case, the distributed-information user-response reception processing unit 350 shown in FIG. 70 receives the response from the user-interface processing unit 150 and stores the response in the user response result master database 378. The response includes a result of the user's response to the distributed information.

A user analysis processing unit 352 analyzes a user on the basis of information stored in the user response result master database 378 and information stored in the target-user database 310, and stores a result of the analysis in the user analysis log database 380. A user-displacement-speed computation processing unit 700 searches the user location displacement database 284 for location displacements of the responding user, the response given by which is stored in the user response result master database 378. The location displacements are used as a basis for finding the moving speed of the user. An inferred-distance computation processing unit 702 computes an estimated distance to the location of an information provider responded by the user, the response given by which is stored in the user response result master database 378, from information stored in the distribution target information-provider database 312. An estimated-arrival-time computation processing unit 704 finds an expected time of arrival from the moving speed of the user and the estimated distance and stores the expected time of arrival in the inferred-user-arrival-time database 750.

A response-result-edit processing unit 680 finds an accurate expected time of arrival to the information provider from information stored in an inferred-user-arrival-time database 750 and a response-attribute analysis log database 384 particularly used for storing, among other data, a time at which the user responds. The response-result-edit processing unit 680 then edits items to be reported to other information providers and stores the edited item in a response-result database 722. A response-result-notification processing unit 682 transmits the response result stored in the response-result database 722 to the information provider by way of the information-provider interface processing unit 200 as indicated by an arrow (312) of a sequence shown in FIG. 73. The store management system 610 or 620 of the information provider receives the response result.

(a): Restaurant Serving as an Information Provider of the Store Management System 610

If the information provider is a restaurant, the provided information includes a recommended menu, a seat reservation and a parking lot reservation. On the other hand, responses shown by the user are food orders. A response notification given by the computer system 600 includes a time at which the user reacted, the user's registered name or ID and an expected time of arrival at the restaurant in addition to the user's response itself. An information-processing apparatus 800 employed in the store management system 610 shown in FIG. 71 displays a parking lot reservation and a seat reservation on a parking lot display unit 804 and a seat display unit 806 respectively, the user's expected time of arrival and ordered food on a kitchen display unit 808 and information such as the name of the user, the number of the people in the party, the expected time of arrival and a menu of foods for reservation on a staff-room display unit 810 through a display-unit-driving control apparatus 802.

Receiving the response notification, the store management system 610 gives a response, which shows that the response notification has been received, as indicated by an arrow (314) of the sequence shown in FIG. 73. The computer system 600 passes on the reception response received from the store management system 610 (the information provider) to the user terminal 6#i as a response notification as indicated by arrows (316). As such, the information provider allows restaurant kitchen staffs to know the user's reserved food menu and expected time of arrival. In this case, by the information provider, collaboration between a job management system and the present invention is realized. Thus, the aim of the preparation work becomes obvious, and since the user's expected time of arrival is known, service staffs can render a service to serve customers smoothly. That is to say, the work efficiency of the restaurant business can be improved and the profit can hence be increased. In addition, the user no longer worries about the availability of a parking lot and the availability of a seat and can expect that the time to wait for the foods to become ready is reduced substantially.

(b): A Retailer/Distributor Serving as the Information Provider of the Store Management System 620

If the information provider is a vendor, the provided information is a message saying: "A discount rate varying depending on a time between the user's expected time of arrival at the store and a commodity-purchasing time is applied." For example, "a discount rate of 50%, 40% or 30% is applied if a time between the user's expected time of arrival at the store and a commodity-purchasing time is no more than 10 minutes, 20 minutes or 30 minutes respectively," or a message saying: "If this is clicked, an expected time of arrival at the store and an electronic coupon to be submitted to the cashier are displayed. So, submit the coupon to the cashier when you make a purchase payment." As the user's response to such provided information, the user clicks a predetermined portion of the screen. A response notification issued by the computer system 600 includes a time at which the user reacted and an expected time of arrival at the store in addition to the user's response itself. A sales management processing system 820 employed in the store management system 620 shown in FIG. 72 informs an inventory management system 822 and a POS management system 824 of a commodity to which a discount rate is applicable as indicated in the response notification.

Receiving the response notification, the store management system 620 gives a response, which shows that the response notification has been received, as indicated by an arrow (314) of the sequence shown in FIG. 73. The computer system 600 passes on the reception response received from the store management system 620 (the information provider) to the user terminal 6#i as a response notification as indicated by arrows (316). For example, assume that the expected time of arrival at the store is 00:00 to 00:00. In this case, if the time of a payment for a purchased commodity B to the cashier is within 10 minutes, 20 minutes or 30 minutes from the expected time of arrival at the store, a discount rate of 50%, 40% or 30% respectively is applied. When making the payment, submit what is displayed this time to the cashier.

In addition, a technique of selling commodities in accordance with a weather forecast and/or a road condition can increase the efficiency. For example, tire chains are required due to a fall of snow in a certain area and areas in the north of the certain area. In this case, a store selling tire chains distributes information urging the user moving to those areas to make a reservation for purchasing tire chains. For a user making such a reservation, tire chains are then reserved separately from those displayed at the shop.

As described above, the present invention specifies an enterprise, which provides information desired by a user to the user, by predicting a moving direction of the user through adoption of an inference mechanism and identifying information providers existing in an area in the predicted moving direction. Examples of the enterprise providing information are a food and drink enterprise, a parking-lot enterprise, a retailing enterprise and a distribution enterprise. By collaboration between the present invention and a job management system, the information provider is capable of discovering a new selling technique that cannot be adopted with the conventional system and, at the same time, the management efficiency can be improved and the profit can hence be increased. That is to say, the effect of the present invention on industries is profound.

In accordance with the present invention described above, it is possible to easily obtain information on an area existing on the way in the moving direction without specifying a destination of the movement. In addition, even in the case of mobile information terminals existing in the same region, information on an area may or may not be distributed depending on the moving direction. Thus, the amount of distributed information can be reduced. Furthermore, distribution of information and mobile information terminals can be controlled in conjunction with a mobile-communication operator.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An information distribution service system comprising a plurality of mobile information terminals, a computer system and a plurality of information-provider terminals wherein said mobile information terminals, said computer system and said information-provider terminals are connected to each other by a communication network,
   wherein said computer system finds a moving speed of a mobile information terminal from location information accumulated in the past, and predicts the mobile information terminal's moving destination, moving direction, and an expected time of arrival of said mobile information terminal at the moving destination by inferring said mobile-information terminal's location displacements along a time series on the basis of information on the moving speed and locations of said mobile information terminal including a pre-registered information category whose information distribution service, distribution and notification are desired, and on the basis of an inference formula provided in advance with said mobile information terminal's moving direction and location;
   said computer system determines an information-provider terminal predicted to exist at said predicted moving destination of said mobile information terminal on the basis of locations of information-provider terminals pre-recording plans to distribute information as a notification, and determines distributed and reported information corresponding to an information category registered in advance by said mobile information terminal among pieces of information to be provided by said selected information-provider terminal on the basis of the expected time of rival of said mobile information terminal at the moving destination, and distributes and reports said distributed and reported information among pieces of information to be provided by said selected information-provider terminal to said mobile information terminal;
   said mobile information terminal responds to said distributed and reported information by said computer system; and
   said computer system notifies said selected information-provider terminal of response information to said distributed and reported information from said mobile information terminal.

2. An information distribution service system according to claim 1, wherein said computer system is provided with an inference formula for predicting a moving direction for each geographical position with said geographical position taken as an origin on the basis of map information; and
   said computer system, if existence at an origin to which an inference formula is applied is confirmed on the basis of information on locations of said mobile information terminal, infers prediction of said mobile information terminal's moving destination and moving direction on the basis of said inference formula.

3. An information distribution service system according to claim 1, wherein each of a plurality of said inference formulas is defined on the basis of map information having a plurality of scale factors.

4. An information distribution service system according to claim 1, wherein said computer system executes the steps of:
   regarding said defined inference formula as an equation representing a regression straight line;
   finding a distance between a location represented by said inference formula and the location of said information-provider terminal by adoption of a least-square method; and
   determining that an information-provider terminal exists in the vicinity of said predicted moving destination of said mobile information terminal if said distance is within an allowable range determined for said defined inference formula.

5. An information distribution service system according to claim 1, wherein said computer system forms a judgment as to whether or not an inference formula defined on the basis of information on locations of said mobile information terminal is proper and, if said defined inference formula is found improper, a new inference formula is defined.

6. An information distribution service system comprising a plurality of mobile information terminals, a computer system and a plurality of information-provider terminals wherein said mobile information terminals, said computer system and said information-provider terminals are connected to each other by a communication network, wherein
   said computer system predicts a mobile information terminal's moving destination and moving direction by infering said mobile-information terminal's location displacements along a time series on the basis of information on locations of said mobile information terminal including a pre-registered information category whose information distribution service, distribution and notification are desired, and on the basis of an inference formula provided in advance with said mobile information terminal's moving direction and location, said computer system determines an information-provider terminal predicted to exist at said predicted moving destination of said mobile information terminal on the basis of locations of information-provider terminals pre-recording plans to distribute information as a notification, and determines distributed and reported information corresponding to an information category registered in advance by said mobile information terminal among pieces of information to be provided by said selected information-provider terminal, and if it is impossible to determine an inference formula for predicting said mobile information terminal's moving direction and location from location displacements of said mobile information terminal with each geographical position used as an origin on the basis of map information, said computer system finds an inference formula for predicting said mobile information terminal's most recent moving destination and most recent moving direction each time most recent information on a location of said mobile information terminal is obtained.

7. An information distribution service system according to claim 1, wherein if an inference formula, which is found as an equation for predicting said mobile information tenruinal's moving destination and moving direction each time most recent information on a location of said mobile information terminal is obtained, changes very frequently in a time series, said computer system predicts a polarity of a movement of said mobile information terminal by application of a partial derivative and on the basis of said mobile information terminal's location information accumulated in the past.

8. An information distribution service system according to claim 1, wherein if said mobile information terminal makes an urgent request for information on a place in an area at which said mobile information terminal is currently located, said computer system transmits said information based on most recent information on a location of said mobile information terminal.

9. An information distribution service system comprising a plurality of mobile information terminals, a computer system and a plurality of information-provider terminals wherein said mobile information terminals, said computer system and said information-provider terminals are connected to each other by a communication network, wherein said computer system predicts a mobile information terminal's moving destination and moving direction by inferring said mobile-information terminal's location displacements along a time series on the basis of information on locations of said mobile information terminal including a pre-registered information category whose information distribution service, distribution and notification are desired, and on the basis of an inference formula provided in advance with said mobile information terminal's moving direction and location, said computer system determines an information-provider terminal predicted to exist at said predicted moving destination of said mobile information terminal on the basis of locations of information-provider terminals pre-recording plans to distribute information as a notification, and determines distributed and reported information corresponding to an information category registered in advance by said mobile information terminal among pieces of information to be provided by said selected information-provider terminal, and said computor system executes the steps of:

informing a mobile-communication operator of information on a mobile information terminal moving to a location at a place in an area at and/or in said mobile information terminal's moving destination and/or moving direction predicted on the basis of an inference formula defined from information on locations of said mobile information terminal;

finding a moving speed of said mobile information terminal from location information accumulated in the past;

informing an information-provider terminal inferred to be a terminal located at said mobile information terminal's moving destination of an expected time of arrival of said mobile information terminal at said moving destination where said expected time of arrival is a time predicted by using an inference formula based on a present location of said mobile information terminal;

determining moving means, on which a user of said mobile information terminal is riding, from a combination of said mobile information terminal's moving speed and displacements in location information; and informing said mobile-information terminal of operational information obtained from an enterprise managing operations of said moving means.

10. An information distribution service system according to claim 1, wherein said computer system receives said response information to said distributed and reported information from said mobile information terminal and records, separates as well as analyzes said response information.

11. An information distribution service system according to claim 10, wherein said computer system informs said information-provider terminal of a result of an analysis of said response information from said mobile information terminal.

12. An information distribution service system comprising a plurality of mobile information terminals, a computer system and a plurality of information-provider terminals wherein said mobile information terminals, said computer system and said information-provider terminals are connected to each other by a communication network, wherein said computer system predicts mobile information terminal's moving destination and moving direction by inferring said mobile-information terminal's location displacements along a time series on the basis of information on locations of said mobile information terminal including a pre-registered information category whose information distribution service, distribution and notification are desired, and on the basis of an inference formula provided in advance with said mobile information terminal's moving direction and location, said computer system determines an information-provider terminal predicted to exist at said predicted moving destination of said mobile information terminal on the basis of locations of information-provider terminals pre-recording plans to distribute information as a notification, and determines distributed and reported information corresponding to an information category registered in advance by said mobile information terminal among pieces of information to be provided by said selected information-provider terminal, and said computer system carries out a statistical analysis to improve a priority order of distributed notifications, contents of information and inference precision on the basis of a response by said mobile information terminal, attributes and category information, which have been registered by the user, and contents of a notification distributed by said information-provider terminal.

13. An information distribution service system according to claim 1, wherein said information-provider terminal provides service for said mobile information terminal based on said response information from said mobile information terminal notified by said computer system.

* * * * *